(12) United States Patent
Yuki

(10) Patent No.: US 8,499,243 B2
(45) Date of Patent: Jul. 30, 2013

(54) INFORMATION PROCESSING DEVICE, INFORMATION PROCESSING METHOD, RECORDING MEDIUM, AND INTEGRATED CIRCUIT

(75) Inventor: Yasuhiro Yuki, Osaka (JP)

(73) Assignee: Panasonic Corporation, Osaka (JP)

( * ) Notice: Subject to any disclaimer, the term of this patent is extended or adjusted under 35 U.S.C. 154(b) by 278 days.

(21) Appl. No.: 12/993,159

(22) PCT Filed: Mar. 23, 2010

(86) PCT No.: PCT/JP2010/002042
§ 371 (c)(1),
(2), (4) Date: Nov. 17, 2010

(87) PCT Pub. No.: WO2010/109849
PCT Pub. Date: Sep. 30, 2010

(65) Prior Publication Data
US 2011/0072373 A1 Mar. 24, 2011

(30) Foreign Application Priority Data
Mar. 23, 2009 (JP) ................................. 2009-070437

(51) Int. Cl.
*G06F 15/177* (2006.01)
(52) U.S. Cl.
USPC .......................... 715/735; 715/764; 715/765
(58) Field of Classification Search
USPC .......................... 715/735, 762, 765, 825, 826
See application file for complete search history.

(56) References Cited

U.S. PATENT DOCUMENTS 5,602,997 A * 2/1997 Carpenter et al. ............ 715/764
5,742,286 A 4/1998 Kung et al.
(Continued)

FOREIGN PATENT DOCUMENTS

| CN | 1936504 | 3/2007 |
| JP | 09-244848 | 9/1997 |

(Continued)

OTHER PUBLICATIONS

Cs4tuts, How to add image or color in spry menu bar in dreamweaver cs4 (Aug. 28, 2009 ) http://www.youtube.com/watch?v=zC39_r9uqtl;bcsi-ac-2160f1cfec5c399f=1EA310B400000102CijuGwgxr2vvORgHXao/hRgjcsYBRgAAAgEAANDrBgGEAwAAAAAAB5PeAA=.*

(Continued)

*Primary Examiner* — Ramsey Refai
*Assistant Examiner* — Di Xiao
(74) *Attorney, Agent, or Firm* — Wenderoth, Lind & Ponack, L.L.P.

(57) ABSTRACT

An information processing device (100) includes a command management unit (101) storing a command in association with a parameter, an instruction receiving unit (104) receiving a user operation performed on an icon displayed on a display screen, a display control unit (10) causing an object icon identifying an object to be displayed in a first display area of the display screen, and an instruction generation unit (115) generating an instruction which is a group of the command and the parameter. The display control unit (10) further causes a command icon identifying a command executable on an operation target object to be displayed in a second display area, and causes a parameter icon identifying a parameter associated with the selected command to be displayed in a third display area. When at least two command icons are selected, the instruction generation unit (115) generates an instruction such that at least two commands identified by these two command icons respectively are executed in order of selection.

12 Claims, 47 Drawing Sheets

U.S. PATENT DOCUMENTS

| | | | |
|---|---|---|---|
| 6,983,424 B1 * | 1/2006 | Dutta | 715/800 |
| 7,546,543 B2 * | 6/2009 | Louch et al. | 715/762 |
| 7,774,295 B2 * | 8/2010 | Middelfart et al. | 1/1 |
| 7,978,176 B2 * | 7/2011 | Forstall et al. | 345/158 |
| 2005/0066280 A1 * | 3/2005 | Austin et al. | 715/733 |
| 2005/0216841 A1 * | 9/2005 | Acker et al. | 715/730 |
| 2006/0020970 A1 * | 1/2006 | Utsuki et al. | 725/39 |
| 2006/0158838 A1 | 7/2006 | Kinoshita et al. | |
| 2007/0067739 A1 | 3/2007 | Atarashi | |

FOREIGN PATENT DOCUMENTS

| | | |
|---|---|---|
| JP | 10-293676 | 11/1998 |
| JP | 11-045281 | 2/1999 |
| JP | 11-045283 | 2/1999 |
| JP | 11-205671 | 7/1999 |
| JP | 2001-325602 | 11/2001 |
| JP | 2003-235086 | 8/2003 |
| JP | 2005-149279 | 6/2005 |
| JP | 2005-260643 | 9/2005 |
| JP | 2006-164058 | 6/2006 |
| JP | 2006-203356 | 8/2006 |
| JP | 2007-48161 | 2/2007 |
| JP | 2008-129700 | 6/2008 |

OTHER PUBLICATIONS

Tom Negrino, Review: Adobe Dreamweaver CS4 (Oct. 27, 2008), http://www.creativepro.com/article/review-adobe-dreamweaver-cs4.*

International Search Report issued Jul. 6, 2010 in International (PCT) Application No. PCT/JP2010/002042.

* cited by examiner

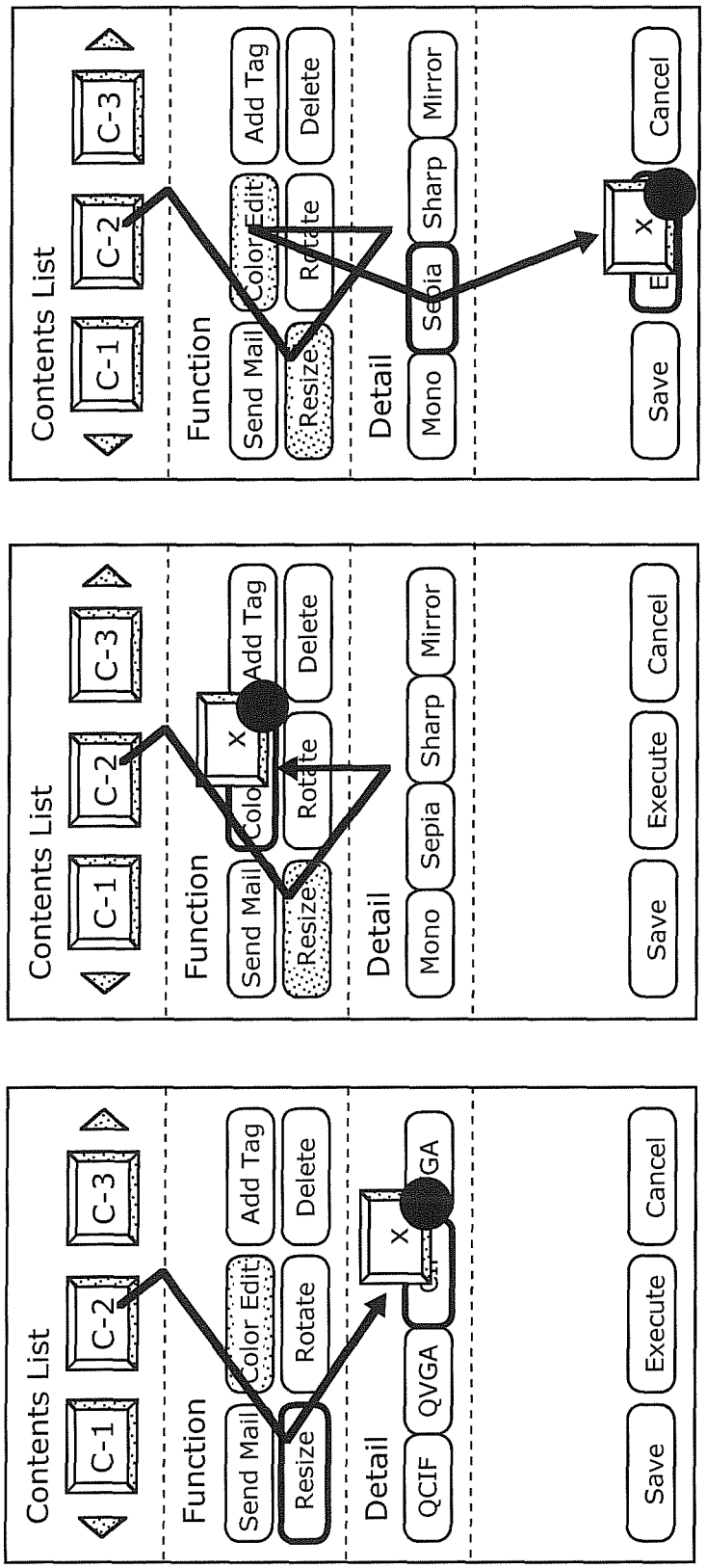

FIG. 4A

| ID | Object | Function | Detail |
|----|--------|----------|--------|
| 1  |        |          |        |
| 2  |        |          |        |
| 3  |        |          |        |
| ... |       |          |        |
| n  |        |          |        |

FIG. 4B

| ID | Object | Function | Detail |
|----|--------|----------|--------|
| 1  | C-2    | —        | —      |
| 2  |        |          |        |
| 3  |        |          |        |
| ... |       |          |        |
| n  |        |          |        |

FIG. 4C

| ID | Object | Function | Detail |
|----|--------|----------|--------|
| 1  | C-2    | Resize   | —      |
| 2  |        |          |        |
| 3  |        |          |        |
| ... |       |          |        |
| n  |        |          |        |

FIG. 4D

| ID | Object | Function | Detail |
|---|---|---|---|
| 1 | C-2 | Resize | CIF |
| 2 | | | |
| 3 | | | |
| ... | | | |
| n | | | |

FIG. 4E

| ID | Object | Function | Detail |
|---|---|---|---|
| 1 | C-2 | Resize | CIF |
| 2 | C-2 | Color Edit | – |
| 3 | | | |
| ... | | | |
| n | | | |

FIG. 4F

| ID | Object | Function | Detail |
|---|---|---|---|
| 1 | C-2 | Resize | CIF |
| 2 | C-2 | Color Edit | Sepia |
| 3 | | | |
| ... | | | |
| n | | | |

FIG. 6A

| ID | Object | Function | Detail |
|---|---|---|---|
| 1 | C-2 | Resize | CIF |
| 2 | C-2 | Color Edit | Sepia |
| 3 | | | |
| ... | | | |
| n | | | |

FIG. 6B

| Pattern ID | R1 | | |
|---|---|---|---|
| Pattern Name | Small Image with Sepia | | |
| Date | 2003/11/1 | | |
| ExecuteTime | Not Defined | | |
| Recurring | Not Defined | | |
| ID | Type | Function | Detail |
| 1 | Image | Resize | CIF |
| 2 | Image | Color Edit | Sepia |

FIG. 6C

| Pattern ID | R1 | | |
|---|---|---|---|
| Pattern Name | Small Image with Sepia | | |
| Date | 2003/11/1 | | |
| ExecuteTime | Not Defined | | |
| Recurring | Not Defined | | |
| ID | Type | Function | Detail |
| 1 | Image | Resize | CIF |
| 2 | Image | Color Edit | Sepia |

| Pattern ID | R2 | | |
|---|---|---|---|
| Pattern Name | Send Mobile blog | | |
| Date | 2003/10/3 | | |
| ExecuteTime | Not Defined | | |
| Recurring | Not Defined | | |
| ID | Type | Function | Detail |
| 1 | Image | Resize | QCIF |
| 2 | Image | Add Tag | 'Food' |
| 3 | Image | Add Tag | Geo (Lat, lng) |
| 4 | Image | Send Mail | Address 1 |

FIG. 9

| Profile | ID | Command | Reference Data | Rate |
|---|---|---|---|---|
| Image | 1 | Send Mail | Address Book | 45 |
| | 2 | Color Edit | Retouch Filter | 33 |
| | 3 | Add Mark | Mark Table | 3 |
| | 4 | Add Frame | Frame Table | 7 |
| | 5 | Add Tag | TagDB , Geo Info | 28 |
| | 6 | Resize | Size Table | 21 |
| | 7 | Rotate | Rotate Table | 17 |
| | 8 | Trimming | Size Table | 0 |
| | 9 | Copy | Size Table | 4 |
| | 10 | Delete | — | 16 |
| Video | 1 | Send Mail | Address Book | 2 |
| | 2 | Add Tag | Tag DB | 0 |
| | 3 | Resize | Size Table | 2 |
| | 4 | Trimming | Size Table | 0 |
| | 5 | Copy | Size Table | 0 |
| | 6 | Delete | — | 10 |

FIG. 10A

| ID | Name | Address |
|---|---|---|
| 1 | Tom | tom@abc.com |
| 2 | Mike | mike@abc.com |
| 3 | John | john@abc.com |
| 4 | Julia | julia@abc.com |
| 5 | Blog | blog@abc.com |
| ... | ... | ... |

FIG. 10B

| ID | Name | Range | Default |
|---|---|---|---|
| 1 | Mono | – | – |
| 2 | Sepia | 1-15 | 3 |
| 3 | Sharp | 1-10 | 5 |
| 4 | Mirror | – | – |
| 5 | Shadow | 1-5 | 3 |
| ... | | | |

FIG. 10C

| ID | Name | Path |
|---|---|---|
| 1 | Happy | ./ img/happy.gif |
| 2 | Heart | ./ img/heart.gif |
| 3 | Star | ./ img/star.gif |
| 4 | Dog | ./ img/dog1.gif |
| 5 | Flower | ./ img/flower.gif |
| ... | ... | ... |

FIG. 10D

| ID | Name | Path |
|---|---|---|
| 1 | Aqua | ./ fr/aqua.gif |
| 2 | Monkey | ./ fr/monkey.gif |
| 3 | Wanted | ./ fr/wanted.gif |
| 4 | Wedding | ./ fr/wedding.gif |
| 5 | tropical | ./ fr/tropical.gif |
| ... | ... | ... |

FIG. 10E

| ID | Type | Category | Tag |
|---|---|---|---|
| 1 | White | Message | Enjoy !! |
| 2 | Red | Emotion | Great !! |
| 3 | Blue | Emotion | Sorry... |
| 4 | White | Info | To Do |
| 5 | Yellow | User | From Tom |
| ... | ... | ... | ... |

FIG. 10F

| ID | Name | Order |
|---|---|---|
| 1 | QCIF | 176 x 144 |
| 2 | QVGA | 320 x 240 |
| 3 | CIF | 352 x 288 |
| 4 | VGA | 640 x 480 |
| 5 | XGA | 1024 x 768 |
| ... | ... | ... |

FIG. 10G

| ID | Degree | Path |
|---|---|---|
| 1 | +90 | ./Rt/p90.gif |
| 2 | -90 | ./Rt/m90.gif |
| 3 | +180 | ./Rt/p180.gif |

FIG. 11

| ID | Command | Rate | Com |
|---|---|---|---|
| 1 | Send Mail | 45 | 1 |
| 2 | Color Edit | 33 | 1 |
| 3 | Add Tag | 28 | 1 |
| 4 | Resize | 21 | 1 |
| 5 | Rotate | 17 | 1 |
| 6 | Delete | 16 | 1 |
| 7 | Add Frame | 7 | 1 |
| 8 | Copy | 4 | 1 |
| 9 | Add Mark | 3 | 1 |
| 10 | Trimming | 0 | 1 |

FIG. 12

| ID | Name | Type | Type | CID |
|---|---|---|---|---|
| 1 | IMG_0001 | jpg | Image | C-1 |
| 2 | IMG_0002 | jpg | Image | C-2 |
| 3 | IMG_0003 | jpg | Image | C-3 |
| ... | ... | ... | ... | ... |
| n | IMG_000n | * | * | * |

FIG. 15B

```
<Device>
  <Device Info>
    <Device Profile> TV </Device Profile>        ⎫
    <Device Name> TV1 </Device Name>             ⎪
    <Model> IPTV </Model>                        ⎪
    <Model Name> GIGA VISION </Model Name>       ⎬ 1501
    <Serial Number> SN0123456789 </Serial Number>⎪
    <Unique ID> uuid : giga001_0123456789 </Unique ID> ⎪
    <Power State> ON </Power State>              ⎭
  </Device Info>
  <Device Services>
    <Service>                                    ⎫
      <Type> Tuner </Type>                       ⎪
      <Type Detail> Digital High-vision Broadcasting </Type Detail>  ⎬ 1502
      <ID> TV1-T1 </ID>                          ⎪
      <State> D-081 </State>                     ⎭
    </Service>
    <Service>                                    ⎫
      <Type> Tunner </Type>                      ⎪
      <Type Detail> BS High-vision Broadcasting </Type Detail>  ⎬ 1503
      <ID> TV1-T2 </ID>                          ⎪
      <State> BS-05 </State>                     ⎭
    </Service>
    <Service>                                    ⎫
      <Type> EPG </Type>                         ⎪
      <ID> TV1-EPG </ID>                         ⎬ 1504
      <State> ready </State>                     ⎪
    </Service>                                   ⎭
  </Device Services>
  <Control List>
      <Action>                                   ⎫
        <Action Name> Channel Up </Action Name>  ⎪
        <Target> Tuner </Target>                 ⎬ 1505
        <From> Button : Up </From>               ⎪
        <URL> /control/ch?prop=up </URL>         ⎭
      </Action>
      <Action>                                   ⎫
        <Action Name> Channel Down </Action Name>⎪
        <Target> Tuner </Target>                 ⎬ 1506
        <From> Button : Down </From>             ⎪
        <URL> /control/ch?prop=down </URL>       ⎭
      </Action>
      <Action>                                   ⎫
        <Action Name> Dual Display </Action Name>⎪
        <From> Button </From>                    ⎪
        <Property name="Rate List" url="property/RateList_xml">  ⎬ 1507
        <URL> /control/dual_display?ch1=*&ch2=*&Rate=*;* </URL> ⎪
      </Action>                                  ⎭
  </Control List>
</Device>
```

FIG. 16A

```
<Device>
  <Device Info>
    <Device Profile> TV </Device Profile>
    <Device Name> TV2 </Device Name>
    <Model> CATV </Model>                                    }-1508
    <Model Name> STB for Town Cable </Model Name>
    <Serial Number> STB-0123456789 </Serial Number>
    <Unique ID> uuid : STB_001_0123456789 </Unique ID>
  </Device Info>
  <Device Services>
    <Service>
      <Type> Tuner </Type>
      <Type Detail> CATV Program </Type Detail>              }-1509
      <ID> TV2-T1 </ID>
      <State> CATV 102 </State>
    </Service>
    <Service>
      <Type> NET </Type>
      <Type Detail> Internet Browser </Type Detail>          }-1510
      <ID> TV2-NET </ID>
      <State> ready </State>
    </Service>
    <Service>
      <Type> VOD </Type>
      <ID> TV2-VOD </ID>                                     }-1511
      <State> ready </State>
    </Service>
  </Device Services>
  <Control List>
      <Action>
        <Action Name> Channel Up </Action Name>
        <Target> Tuner </Target>                             }-1512
        <From> Button : Up </From>
        <URL> /control/ch?prop=up </URL>
      </Action>
      <Action>
        <Action Name> Channel Down </Action Name>
        <Target> Tuner </Target>                             }-1513
        <From> Button : Down </From>
        <URL> /control/ch?prop=down </URL>
      </Action>
      <Action>
        <Action Name> Dual Display </Action Name>
        <From> Button </From>                                }-1514
        <Property name="Rate List" url="property/RateList_xml">
        <URL> /control/dual_display?ch1=*&ch2=*&Rate=*;* </URL>
      </Action>
  </Control List>
</Device>
```

FIG. 18

| Profile | ID | Command | Reference Data | Rate |
|---|---|---|---|---|
| Image | 1 | Send Mail | Address Book | 45 |
| | 2 | Color Edit | Retouch Filter | 33 |
| | 3 | Add Mark | Mark Table | 3 |
| | 4 | Add Frame | Frame Table | 7 |
| | 5 | Add Tag | TagDB , Geo Info | 28 |
| | 6 | Resize | Size Table | 21 |
| | 7 | Rotate | Rotate Table | 17 |
| | 8 | Trimming | Size Table | 0 |
| | 9 | Copy | Size Table | 4 |
| | 10 | Delete | — | 16 |
| Video | 1 | Send Mail | Address Book | 2 |
| | 2 | Add Tag | Tag DB | 0 |
| | 3 | Resize | Size Table | 2 |
| | 4 | Trimming | Size Table | 0 |
| | 5 | Copy | Size Table | 0 |
| | 6 | Delete | — | 10 |
| AV | 1 | Power | Power Table | 60 |
| | 2 | Volume | — | 21 |
| | 3 | Mute | Mute Table | 5 |
| | 4 | Timer | Timer Set Table | 3 |
| TV | 1 | Channel UP | — | 30 |
| | 2 | Channel Down | — | 32 |
| | 3 | Dual Display | TV :: RateList.xml | 1 |
| PVR | 1 | Recording it | — | 3 |
| Appliance | 1 | Power | Power Table | 17 |
| | 2 | Timer | Timer Set Table | 9 |
| | 3 | Up | — | 21 |
| | 4 | Down | — | 23 |

FIG. 20

| ID | Command | Rate | Com. |
|----|---------|------|------|
| 1 | Power | 77 | 2 |
| 2 | Volume | 21 | 1 |
| 3 | Mute | 5 | 1 |
| 4 | Timer | 12 | 2 |
| 5 | Channel UP | 30 | 1 |
| 6 | Channel Down | 32 | 1 |
| 7 | Dual Display | 1 | 1 |
| 8 | Up | 21 | 1 |
| 9 | Down | 23 | 1 |
| 10 | | | |

FIG. 21A

| ID | Name | Address |
|---|---|---|
| 1 | Tom | tom@abc.com |
| 2 | Mike | mike@abc.com |
| 3 | John | john@abc.com |
| 4 | Julia | julia@abc.com |
| 5 | Blog | blog@abc.com |
| ... | ... | ... |

FIG. 21B

| ID | Name | Range | Default |
|---|---|---|---|
| 1 | Mono | - | - |
| 2 | Sepia | 1-15 | 3 |
| 3 | Sharp | 1-10 | 5 |
| 4 | Mirror | - | - |
| 5 | Shadow | 1-5 | 3 |
| ... | | | |

FIG. 21C

| ID | Name | Path |
|---|---|---|
| 1 | Happy | ./ img/happy.gif |
| 2 | Heart | ./ img/heart.gif |
| 3 | Star | ./ img/star.gif |
| 4 | Dog | ./ img/dog1.gif |
| 5 | Flower | ./ img/flower.gif |
| ... | ... | ... |

FIG. 21D

| ID | Name | Path |
|----|------|------|
| 1 | Aqua | ./ fr/aqua.gif |
| 2 | Monkey | ./ fr/monkey.gif |
| 3 | Wanted | ./ fr/wanted.gif |
| 4 | Wedding | ./ fr/wedding.gif |
| 5 | tropical | ./ fr/tropical.gif |
| ... | ... | ... |

FIG. 21E

| ID | Type | Category | Tag |
|----|------|----------|-----|
| 1 | White | Message | Enjoy !! |
| 2 | Red | Emotion | Great !! |
| 3 | Blue | Emotion | Sorry... |
| 4 | White | Info | To Do |
| 5 | Yellow | User | From Tom |
| ... | ... | ... | ... |

FIG. 21F

| ID | Name | Order |
|----|------|-------|
| 1 | QCIF | 176 x 144 |
| 2 | QVGA | 320 x 240 |
| 3 | CIF | 352 x 288 |
| 4 | VGA | 640 x 480 |
| 5 | XGA | 1024 x 768 |
| ... | ... | ... |

FIG. 21G

| ID | Degree | Path |
|---|---|---|
| 1 | +90 | ./Rt/p90.gif |
| 2 | -90 | ./Rt/m90.gif |
| 3 | +180 | ./Rt/p180.gif |

FIG. 21H

| ID | State | Exec | Path |
|---|---|---|---|
| 1 | off | ON | ./pw/ on.gif |
| 2 | on | OFF | ./pw/ off.gif |
| 3 | resume | ON | ./pw/ on.gif |

FIG. 21I

| ID | State | Exec | Path |
|---|---|---|---|
| 1 | active | Mute | ./mt/mt.gif |
| 2 | mute | Active | ./mt/act.gif |

FIG. 21J

| ID | Name | Time | Flag |
|----|------|------|------|
| 1 | 30min | 00:30 | false |
| 2 | 1hour | 01:00 | false |
| 3 | 2hour | 02:00 | false |
| 4 | Wake - up | 06:30 | true |
| 5 | Sleep time | 22:00 | true |
| ... | ... | ... | ... |

FIG. 21K

| ID | Name | Day |
|----|------|-----|
| 1 | tomorrow | +1 day only |
| 2 | daily | +1 day |
| 3 | weekly | +7 days |
| 4 | monthly | +28 - 31 days |
| 5 | yearly | +365 days |
| ... | ... | ... |

FIG. 22B

| Pattern ID | R3 | |
|---|---|---|
| Pattern Name | Morning Bell | |
| Date | 2003/10/5 | |
| ExecuteTime | 07:30 | |
| Recurring | OFF | |
| ID | Object | Function | Detail |
| 1 | TV | Power | ON |
| 2 | TV | Volume | 50 |
| 3 | Air Cor. | Power | ON |
| 4 | Pot | Power | ON |
| 5 | — | Timer | 07:30 |

FIG. 22C

| Pattern ID | R3 | |
|---|---|---|
| Pattern Name | Morning Bell | |
| Date | 2003/10/5 | |
| ExecuteTime | 07:30 | |
| Recurring | ON:Daily | |
| ID | Object | Function | Detail |
| 1 | TV | Power | ON |
| 2 | TV | Volume | 80 |
| 3 | Air Cor. | Power | ON |
| 4 | Pot | Power | ON |
| 5 | — | Timer | 07:30 |

FIG. 27A

|  |  | Source Device | | Target Device | |
|---|---|---|---|---|---|
|  |  | Full Screen | Virtual Screen | Full Screen | Rate |
| Size | Width | 320 | 320 | 960 | 33% |
|  | Height | 480 | 180 | 540 | 33% |
| Position | x | 0 | 0 | 0 | — |
|  | y | 0 | 300 | 0 | — |

FIG. 29A

| | | Source Device | | | | Target Device | | |
|---|---|---|---|---|---|---|---|---|
| | | Vertical | | Horizontal | | Full Screen | Rate | |
| | | Full Screen | Virtual Screen | Full Screen | Virtual Screen | | Vertical | Horizontal |
| Size | Width | 320 | 320 | 480 | 420 | 960 | — | — |
| Size | Height | 480 | 180 | 320 | 236 | 540 | — | — |
| Position | x | 0 | 0 | 0 | 30 | 0 | — | — |
| Position | y | 0 | 300 | 0 | 42 | 0 | — | — |
| Layout | Area 1 | true | | false | | — | 33% | 43% |
| Layout | Area 2 | true | | false | | — | 33% | 43% |
| Layout | Area 3 | true | | false | | — | — | — |
| Layout | Area 4 | true | | false | | — | — | — |

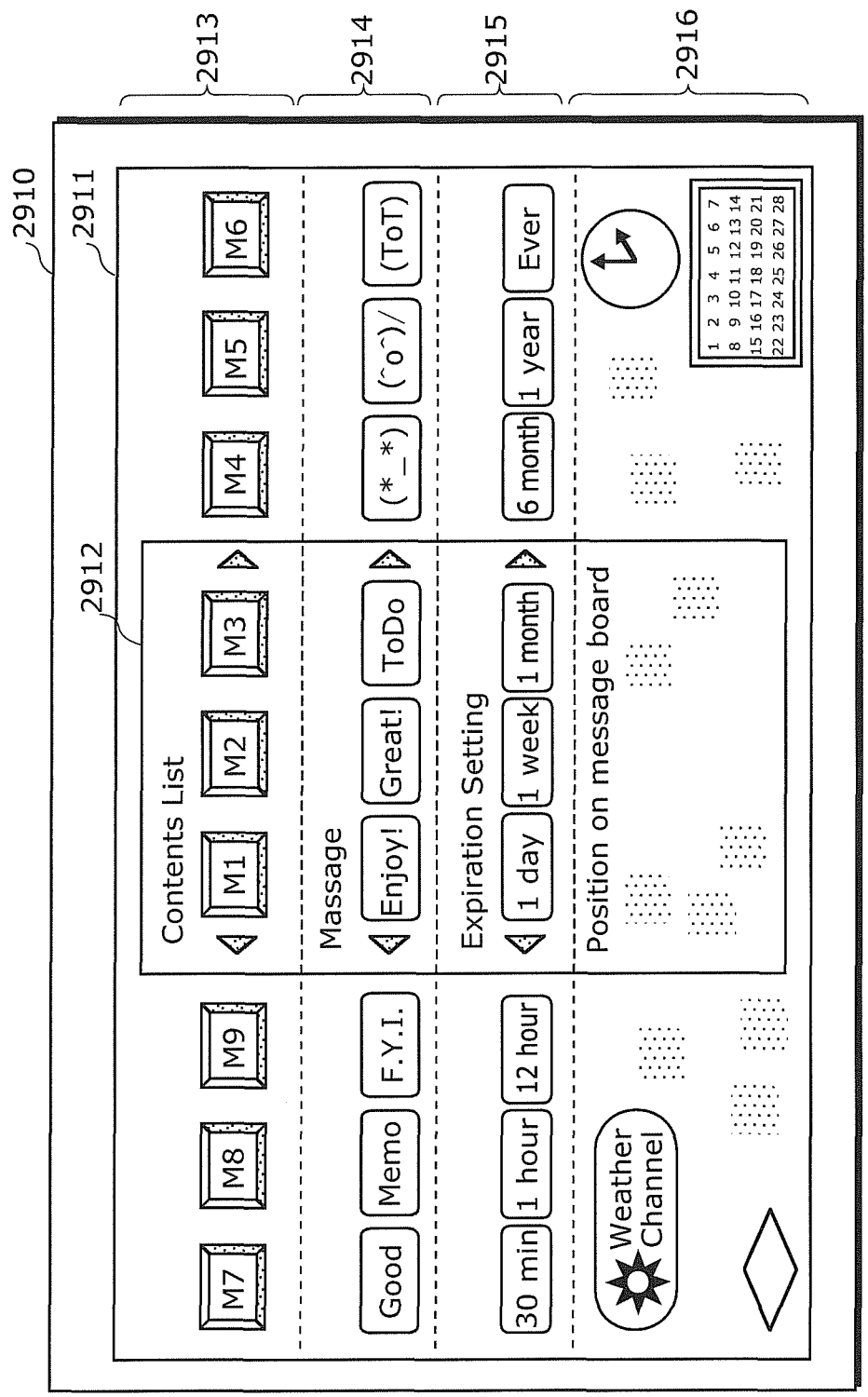

INFORMATION PROCESSING DEVICE, INFORMATION PROCESSING METHOD, RECORDING MEDIUM, AND INTEGRATED CIRCUIT

TECHNICAL FIELD

The present invention relates to information processing devices, and particularly to an information processing device which generates an instruction specifying an operation of a device in response to a user operation performed on an icon displayed on a display screen.

BACKGROUND ART

In recent years, display screens with touch panels have been introduced not only into public facilities such as ticket-vending machines, but also into various kinds of information devices used by individual users including a personal computer, a PDA (Personal Digital Assistant), a remote control of a home electrical appliance such as a TV, and a high-functionality mobile terminal called a smartphone. Many of these information devices have sensors on or near their screens. A user performs an operation by directly touching a link or button represented by characters or an image displayed on the screen of the information device. Using the sensor, the information device detects an operation request from the user. Thus, the user can cause the information device to execute a desired process through an intuitive operation.

Processes performed by the user using the information device include, as a first example, posting an article on a personal blog site from a mobile terminal. This posting process includes changing the size of an image captured using a camera function of the mobile terminal, changing the color of the image such as turning the image into a sepia tone, editing such as assigning a tag which is a keyword, and sending an email message with the edited image attached.

Here, a mobile terminal with a general touch panel is provided with a hierarchical menu designed for touch-panel use, so as to receive a user operation. The user touches a menu icon, that is displayed on the touch panel, for activating a menu screen. Or, the user presses a button, provided on the body of the mobile terminal, for activating the menu screen. As a result of this, the mobile terminal displays the menu screen. Moreover, when the user touches an icon for activating the camera function that is displayed on the menu screen, the camera function is activated.

Next, image capturing is started by means of a shutter icon displayed on the touch panel or a shutter button provided on the body of the mobile terminal, and the captured image is recorded. After this, the following processes are sequentially performed on the captured image which is an operation target object. The user selects "Image Edit" from "Submenu". Then, after selecting "Resize" from "Submenu" that is displayed again, the user selects "Desired Size". Accordingly, the mobile terminal makes a size adjustment to the image. Then, after selecting a color change menu such as "Retouch Photo" from "Submenu", the user selects "Sepia Tone".

As a result, the mobile terminal performs the color change process on the image. Next, after selecting "Assign Keyword" from "Submenu", the user enters a keyword which the user desires to assign or selects a keyword from among candidates. Then, after selecting "Send Email with Attachment" from "Submenu", the user performs processes to, for example, "Select Destination Address" and "Enter Title and Text" through touch operations (or operations by means of button keys). In this way, in order to accomplish one purpose, that is, posting an article to a blog site, plural touch operations are performed in a repetitive manner.

Such operations are routinely performed by the user with full knowledge about the operations of the mobile terminal. However, since the menu screens are hierarchically structured, the screens to be displayed are large in number regardless of the introduction of the touch panel. As the depth of the hierarchy increases, the number of touches on the touch panel (or, the number of operations performed on the operation keys) by the user tends to increase proportionately. That is to say, the increased depth of the hierarchy may have an opposite effect on convenience to the user.

When wishing to sequentially execute the processes which are based on plural non-sequential functions, the user needs to know in advance, after selecting a menu icon, about a submenu from which a next item is to be selected. Thus, in fact, the hierarchical structure of the menu screens may result in inconvenience to a user who is not good at operating the device or who has less knowledge about the terminal functions. In addition, even a skilled user has to repeat the same operations routinely due to this hierarchical structure of the menu screens.

A first method to solve the stated problem in the first example is disclosed in Patent Literature 1. To be more specific, a predetermined icon of a processing-command execution area is displayed on a screen display unit. By manipulating a cursor using a touch panel or mouse, the user drags an operation target object (i.e., an icon) representing data such as an image which is to be an operation target, through the processing-command execution area. As a result, the mobile terminal can perform the process corresponding to this processing-command execution area on the data represented by the operation target object.

Moreover, parameter candidates (for example, image zoom ranges) may be set in advance for each processing-command execution area. With this, near the area through which the operation target object (i.e., the icon) passes, the corresponding parameter candidates can be displayed. Then, the user can select a desired value from among the displayed plural parameter candidates.

Also, a method of executing a process by means of a script or batch file is widely known. When using this method, the user describes in advance plural processes in order, which the user wishes the computer to sequentially execute, in one description file according to a description rule. Accordingly, the plural processes are executed in order.

CITATION LIST

Patent Literature

[PTL 1]
Japanese Unexamined Patent Application Publication No. 2005-149279

SUMMARY OF INVENTION

Technical Problem

However, using the method disclosed in Patent Literature 1 explained above, the operation target object is limited to contents such as images and audio. Also, it is assumed that the process to be performed on the content is one at a time.

Here, it is possible to apply the above-explained method of executing the plural processes. However, with this method of executing the plural processes, the user has to voluntarily describe in advance the processes, which are to be executed on the computer, in a computer-interpretable language according to the description rule. On this account, this method cannot be considered highly convenient to the user who is not good at operating the device or who does not have enough knowledge about the terminal functions.

The present invention is conceived in view of the aforementioned problem, and has an object to provide an information processing device which is capable of executing a plurality of processes with intuitive operability.

Solution to Problem

The information processing device in an aspect of the present invention generates an instruction specifying an operation of a device, in response to a user operation performed on an icon displayed on a display screen. To be more specific, the information processing device includes: a storage unit including a command management unit which stores at least one command in association with at least one parameter, the command indicating a process to be executed on an object and the parameter specifying a detail of the process; an instruction receiving unit which receives the user operation performed on the icon displayed on the display screen; a display control unit which causes at least one object icon identifying the object to be displayed in a first display area of the display screen; and an instruction generation unit which generates an instruction that is a group of the command and the parameter stored in the command management unit, according to the user operation received by the instruction receiving unit. When the instruction receiving unit receives an operation in which at least one of the at least one object icon displayed in the first display area is selected, the display control unit extracts, from the command management unit, the command executable on an operation target object identified by the selected object icon and causes at least one command icon identifying the extracted command to be displayed in a second display area different from the first display area, without changing a detail displayed in the first display area of the display screen. When the instruction receiving unit receives an operation in which at least one of the at least one command icon displayed in the second display area is selected, the display control unit extracts, from the command management unit, the parameter associated with the command identified by the selected command icon and causes at least one parameter icon identifying the extracted parameter to be displayed in a third display area different from the first and second display areas, without changing details displayed in the first and second display areas of the display screen. When at least two command icons are selected, the instruction generation unit generates an instruction such that at least two commands identified by the at least two command icons respectively are executed in an order in which the at least two command icons are selected.

With this configuration, the object icon, the command icon, and the parameter icon are displayed on the same screen at the same time. Thus, the user can execute the instruction on the operation target object, through an intuitive operation.

Also, when the operation target object is selected, only the command icons representing the commands executable on the operation target object are displayed. Moreover, when the command is selected, only the parameter icons representing the parameters associated with the present command are displayed. Furthermore, a plurality of commands to be executed on the operation target object can be selected at one time. This results in improved convenience to the user.

Moreover, the information processing may further include an instruction execution unit which executes the instruction generated by the instruction generation unit on the operation target object. With this, the instruction generated for the content (i.e., the substantial data) held by the information processing device can be executed.

Furthermore, when at least two operation target objects are selected, the display control unit may extract the command that is executable on and common to the at least two operation target objects.

Also, the display control unit may correct spaces between a plurality of icons displayed on the display screen, according to a size of an area that remains unused for displaying an icon on the display screen. With this, a display area for an icon which is to be newly displayed and to be selected by the user is secured. This further improves the operability.

The instruction generation unit may register the generated instruction as a processing pattern into a pattern management unit included in the storage unit. The display control unit may extract, from the pattern management unit, the processing pattern executable on the object identified by the selected object icon and cause a processing pattern icon identifying the extracted processing pattern to be displayed in a pattern display area different from the first, second, and third display areas. This improves convenience to the user in a case, for example, where the same process is repeatedly executed.

Also, the information processing device may include: the display screen; and a detection unit which detects an orientation of the display screen. The display control unit may change a position at which the icon is displayed on the display screen, according to the orientation of the display screen detected by the detection unit. With this, the icons can be displayed in an appropriate layout, depending on the orientation of the display screen.

Moreover, the object may be an external device connected to the information processing device. Furthermore, the information processing device may include a communication unit which sends the instruction generated by the instruction generation unit to the external device that is the operation target object. With this, the information processing device at hand can generate an instruction and cause the external device to execute the instruction.

Also, the communication unit may receive, from the operation target object, state information indicating a current operating state of the operation target object. The display control unit may extract, so from the command management unit, the command that is executable on the operation target object in the current operating state indicated by the state information. With this, according to the operating state of the operation target device, only the icons of the executable commands are displayed. This can improve the efficiency of the user operation.

Also, when the operation target object includes a display screen: the communication unit may receive, from the operation target object, display layout information indicating a detail displayed on the display screen of the operation target object; and the display control unit may cause the detail indicated by the display layout information to be displayed in a virtual screen display area different from the first, second, and third display areas of the display screen. With this, the operation can be performed while the display screen of the operation target object and the virtual screen display area are used in cooperation. Accordingly, the operability is further improved.

An information processing method in an aspect of the present invention is a method of an information processing device which generates an instruction specifying an operation of a device in response to a user operation performed on an icon displayed on a display screen and which includes a storage unit having a command management unit that stores at least one command in association with at least one parameter, the command indicating a process to be executed on an object and the parameter specifying a detail of the process. To be more specific, the information processing method includes: receiving the user operation performed on the icon displayed on the display screen; performing control to cause at least one object icon identifying the object to be displayed in a first display area of the display screen; and generating an instruction which is a group of the command and the parameter stored in the command management unit, according to the user operation received in the receiving. In the performing control: when an operation in which at least one of the at least one object icon displayed in the first display area is selected is received in the receiving, the command executable on an operation target object identified by the selected object icon is extracted from the command management unit and at least one command icon identifying the extracted command is caused to be displayed in a second display area different from the first display area, without changing a detail displayed in the first display area of the display screen; and when an operation in which at least one of the at least one command icon displayed in the second display area is selected is received in the receiving, the parameter associated with the command identified by the selected command icon is extracted from the command management unit and at least one parameter icon identifying the extracted parameter is caused to be displayed in a third display area different from the first and second display areas, without changing details displayed in the first and second display areas of the display screen. In the generating, when at least two command icons are selected, an instruction is generated such that at least two commands identified by the at least two command icons respectively are executed in an order in which the at least two command icons are selected.

A non-transitory computer-readable recording medium in an aspect of the present invention is a medium having a program recorded thereon for causing an information processing device to generate an instruction specifying an operation of a device in response to a user operation performed on an icon displayed on a display screen, the information processing device including a storage unit having a command management unit that stores at least one command in association with at least one parameter, the command indicating a process to be executed on an object, and the parameter specifying a detail of the process. The program causes the information processing device to execute: receiving the user operation performed on the icon displayed on the display screen; performing control to cause at least one object icon identifying the object to be displayed in a first display area of the display screen; and generating an instruction which is a group of the command and the parameter stored in the command management unit, according to the user operation received in the receiving. In the performing control: when an operation in which at least one of the at least one object icon displayed in the first display area is selected is received in the receiving, the command executable on an operation target object identified by the selected object icon is extracted from the command management unit and at least one command icon identifying the extracted command is caused to be displayed in a second display area different from the first display area, without changing a detail displayed in the first display area of the display screen; and when an operation in which at least one of the at least one command icon displayed in the second display area is selected is received in the receiving, the parameter associated with the command identified by the selected command icon is extracted from the command management unit and at least one parameter icon identifying the extracted parameter is caused to be displayed in a third display area different from the first and second display areas, without changing details displayed in the first and second display areas of the display screen. In the generating, when at least two command icons are selected, an instruction is generated such that at least two commands identified by the at least two command icons respectively are executed in an order in which the at least two command icons are selected.

An integrated circuit in an aspect of the present invention is implemented on an information processing device which generates an instruction specifying an operation of a device in response to a user operation performed on an icon displayed on a display screen and which includes a storage unit having a command management unit that stores at least one command in association with at least one parameter, the command indicating a process to be executed on an object and the parameter specifying a detail of the process. To be more specific, the integrated circuit includes: an instruction receiving unit which receives the user operation performed on the icon displayed on the display screen; a display control unit which causes at least one object icon identifying the object to be displayed in a first display area of the display screen; and an instruction generation unit which generates an instruction which is a group of the command and the parameter stored in the command management unit, according to the user operation received by the instruction receiving unit. When the instruction receiving unit receives an operation in which at least one of the at least one object icon displayed in the first display area is selected, the display control unit extracts, from the command management unit, the command executable on an operation target object identified by the selected object icon and causes at least one command icon identifying the extracted command to be displayed in a second display area different from the first display area, without changing a detail displayed in the first display area of the display screen. When the instruction receiving unit receives an operation in which at least one of the at least one command icon displayed in the second display area is selected, the display control unit extracts, from the command management unit, the parameter associated with the command identified by the selected command icon and causes at least one parameter icon identifying the extracted parameter to be displayed in a third display area different from the first and second display areas, without changing details displayed in the first and second display areas of the display screen. When at least two command icons are selected, the instruction generation unit generates an instruction such that at least two commands identified by the at least two command icons respectively are executed in an order in which the at least two command icons are selected.

Advantageous Effects of Invention

The present invention can provide an information processing device which is capable of executing a plurality of processes with intuitive operability.

BRIEF DESCRIPTION OF DRAWINGS

FIG. 3D is a diagram showing that a parameter is selected.

FIG. 3E is a diagram showing that, in response to the selection of a second command, parameters associated with this command are displayed.

FIG. 3F is a diagram showing that the generated instruction is to be executed.

FIG. 4A is a diagram showing descriptions in an operation history table in the state shown in FIG. 3A.

FIG. 4B is a diagram showing descriptions in the operation history table in the state shown in FIG. 3B.

FIG. 4C is a diagram showing descriptions in the operation history table in the state shown in FIG. 3C.

FIG. 4D is a diagram showing descriptions in the operation history table in the state shown in FIG. 3D.

FIG. 4E is a diagram showing descriptions in the operation history table in the state shown in FIG. 3E.

FIG. 4F is a diagram showing descriptions in the operation history table in the state shown in FIG. 3F.

FIG. 6A is a diagram showing descriptions in the operation history table in the state shown in FIG. 5A.

FIG. 6B is a diagram showing an example of a data format of a pattern management table.

FIG. 6C is a diagram showing an example where a plurality of processing patterns are registered in the pattern management table.

FIG. 9 is a diagram showing an example of a command management table in the first embodiment.

FIG. 10A is a diagram showing "Address Book" which is an example of a command reference table.

FIG. 10B is a diagram showing "Retouch Filter" which is an example of the command reference table.

FIG. 10C is a diagram showing "Mark Table" which is an example of the command reference table.

FIG. 10D is a diagram showing "Frame Table" which is an example of the command reference table.

FIG. 10E is a diagram showing "Tag DB" which is an example of the command reference table.

FIG. 10F is a diagram showing "Size Table" which is an example of the command reference table.

FIG. 10G is a diagram showing "Rotate Table" which is an example of the command reference table.

FIG. 11 is a diagram showing an example of a command candidate table in the first embodiment.

FIG. 12 is a diagram showing an example of a contents list table in the first embodiment.

FIG. 15B is a diagram showing an example of information obtained from an external device.

FIG. 16A is a diagram showing another example of information obtained from an external device.

FIG. 18 is a diagram showing an example of a command management table in the second embodiment.

FIG. 20 is a diagram showing an example of a command candidate table.

FIG. 21A is a diagram showing "Address Book" which is an example of a command reference table.

FIG. 21B is a diagram showing "Retouch Filter" which is an example of the command reference table.

FIG. 21C is a diagram showing "Mark Table" which is an example of the command reference table.

FIG. 21D is a diagram showing "Frame Table" which is an example of the command reference table.

FIG. 21E is a diagram showing "Tag DB" which is an example of the command reference table.

FIG. 21F is a diagram showing "Size Table" which is an example of the command reference table.

FIG. 21G is a diagram showing "Rotate Table" which is an example of the command reference table.

FIG. 21H is a diagram showing "Power Table" which is an example of the command reference table.

FIG. 21I is a diagram showing "Mute Table" which is an example of the command reference table.

FIG. 21J is a diagram showing "Timer Set Table" which is an example of the command reference table.

FIG. 21K is a diagram showing "Recurring Setting Table" which is an example of the command reference table.

FIG. 22B is a diagram showing an example of the registered state of the processing pattern before the periodic execution is instructed.

FIG. 22C is a diagram showing an example of the registered state of the processing pattern after the periodic execution is instructed.

FIG. 27A is a diagram showing a relation between a display screen of an external device and a virtual screen display area of the information processing device.

FIG. 29A is a diagram showing a relation between a display screen of an external device and a virtual screen display area of the information processing device.

FIG. 30B is a diagram showing an example of a layout of an operation screen displayed on the display unit which is horizontally oriented.

DESCRIPTION OF EMBODIMENTS

Figure 1:
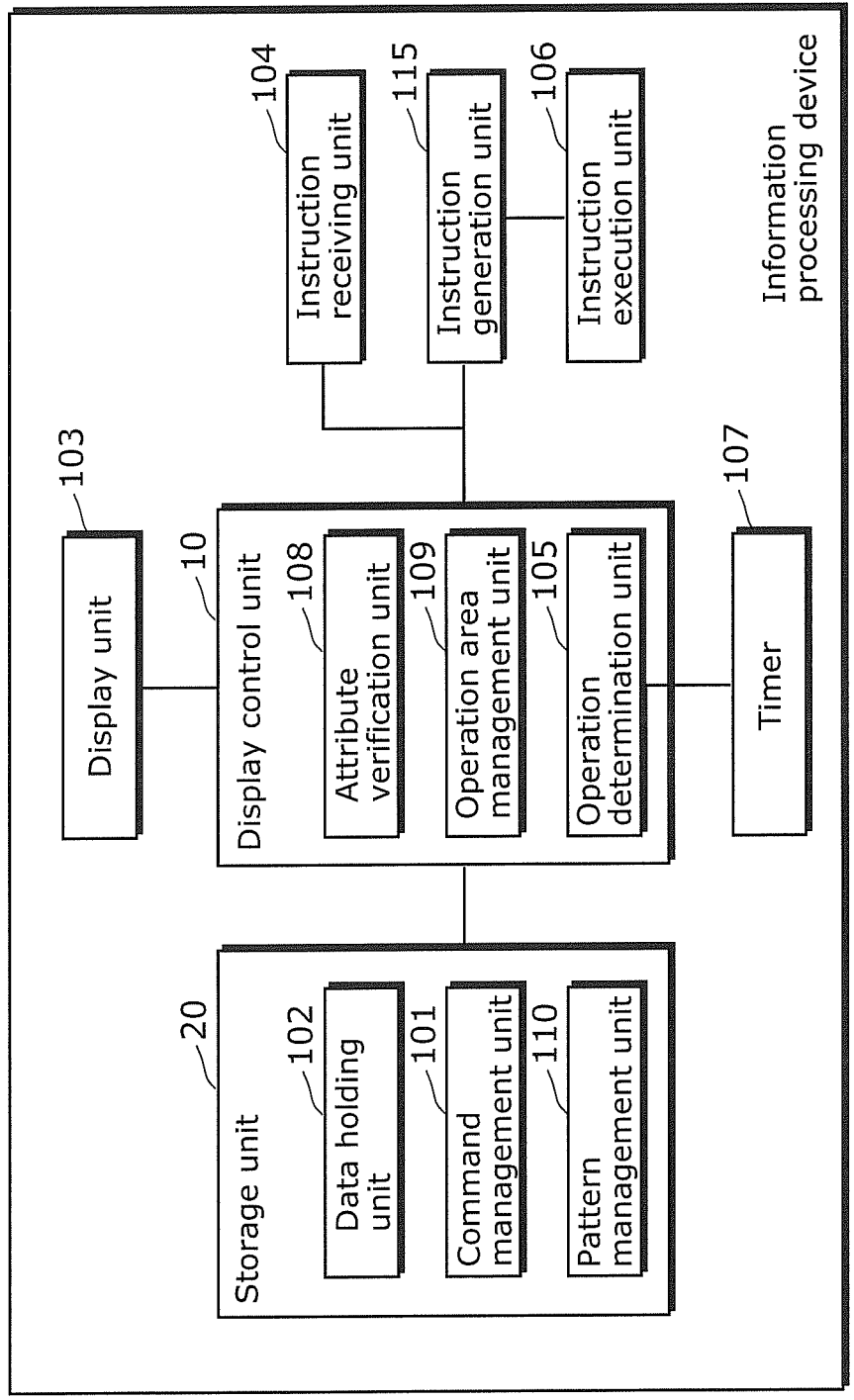
FIG. 1 is a block diagram showing an information processing device in a first embodiment of the present invention.

The following describes embodiments of the present invention in detail, with reference to the drawings. It should be noted that components used in the following embodiments in common are assigned the same reference numerals and their explanations are not repeated.

First Embodiment

FIG. 1 is a block diagram showing a configuration of an information processing device 100 in the first embodiment of the present invention. In FIG. 1, the information processing device 100 includes a display control unit 10, a storage unit 20, a display unit 103, an instruction receiving unit 104, an instruction execution unit 106, a timer 107, and an instruction generation unit 115. This information processing device 100 generates an instruction specifying an operation of a device, in response to a user operation performed on an icon displayed on the display unit 103.

The storage unit 20 includes a command management unit 101 and a data holding unit 102, and a pattern management unit 110. The storage unit 20 is a DB (Database) storing various kinds of data required for the operation performed by the information processing device 100.

The command management unit 101 holds at least one piece of command information. This command information holds a command in association with at least one parameter. The command (also referred to as the "processing command" hereafter) causes a process, corresponding to one of various functions provided for the information processing device 100, to be executed. The parameter specifies a processing detail of the present command. Moreover, the command information holds a command icon identifying the command and a parameter icon identifying the parameter.

The data holding unit 102 holds an object which is to be an operation target, in association with an object icon identifying the present object. It should be noted that the object described in the first embodiment refers to the substantial data that is held by the information processing device 100 typically in the form of files. Specific examples of the substantial data are not particularly limited and may include data in all kinds of formats, such as an image file, a video file, and a text file.

The pattern management unit 110 holds at least one pattern management table in which a group of commands and parameters specified by an operation instruction is registered as a processing pattern. That is to say, the pattern management table includes processing sequence data (namely, the processing pattern).

The display unit 103 displays an operation screen (a graphical user interface) that includes icons representing objects, commands, and parameters. The user selects an operation target object by choosing from among the object icons displayed on the display unit 103. Also, the user selects a command icon and a parameter icon corresponding to a process desired to be performed on the selected operation target object. As a result, the process desired to be performed on the operation target object can be executed.

It should be noted that a specific example of the display unit 103 is not particularly limited. For example, a liquid crystal display, a plasma display, or an organic EL (Electroluminescence) display can be adopted. Or, the information processing device 100 may not include the display unit 103 as a component, and may perform display control over an external display screen.

The instruction receiving unit 104 receives a user operation performed on an icon displayed on the display unit 103. To be more specific, when the user selects an icon displayed on the display unit 103, the instruction receiving unit 104 sends position information of the selected icon, as coordinate information, to an operation determination unit 105. Together with this coordinate information, identification information of the selected icon is also sent to the operation determination unit 105. It should be noted that an input device is a touch-panel input device placed on the display unit 103 that is implemented on the information processing device 100, or a mouse or trackball allowing cursor manipulation.

The display control unit 10 controls a displaying status of the display unit 103 according to the user operation received by the instruction receiving unit 104. More specifically, the display control unit 10 first causes at least one object icon to be displayed in a first display area of the display unit 103.

Next, when the instruction receiving unit 104 receives an operation in which at least one of at least one object icon displayed in the first display area is selected, the display control unit 10 causes at least one command icon to be displayed in a second display area that is different from the first display area. Note that the display control unit 10 extracts, from the command management unit 101, only a command executable on the operation target object identified by the selected object icon, and then causes a command icon identifying the extracted command to be displayed. Here, a detail displayed in the first display area of the display unit 103 is maintained as it is.

Then, when the instruction receiving unit 104 receives an operation in which at least one of at least one command icon displayed in the second display area is selected, the display control unit 10 causes at least one parameter icon to be displayed in a third display area that is different from the first and second display areas. Note that the display control unit 10 extracts, from the command management unit 101, only a parameter associated with the command identified by the selected command icon, and then causes a parameter icon identifying the extracted parameter to be displayed. Here, details displayed in the first and second display areas on the display screen are maintained as they are.

Moreover, the display control unit 10 extracts a processing pattern executable on the operation target object, from the pattern management unit 110. Then, the display control unit 10 causes a processing pattern icon identifying the extracted processing pattern to be displayed in a pattern display area that is different from the first, second, and third display areas of the display unit 103.

In order to execute the above process, the display control unit 10 includes the operation determination unit 105, an attribute verification unit 108, and an operation area management unit 109.

The operation determination unit 105 determines, for example, whether or not coordinates indicated by the coordinate information received from the instruction receiving unit 104 overlap with a command icon representing the corresponding command. More specifically, the operation determination unit 105 determines whether or not the coordinates indicated by the coordinate information received from the instruction receiving unit 104 coincide with the position of the command icon.

This determination is repeated at predetermined time intervals. Then, the operation determination unit 105 sends identification information of the command icon located at a position that is specified by the coordinates indicated by the coordinate information received from the instruction receiving unit 104, to the command management unit 101. The operation determination unit 105 performs likewise when the object icon or the parameter icon is selected.

The attribute verification unit 108 verifies attributes associated with the identification information of the operation target object and the identification information of the processing command that are received from the command management unit 101. Then, the attribute verification unit 108 determines the details to be next displayed on the display unit 103. For example, according to the attribute of the operation target object, the attribute verification unit 108 extracts the processing command executable on the present operation target object from the command management unit 101. Also, according to the attribute of the selected processing command, the attribute verification unit 108 extracts a parameter associated with the present processing command from the command management unit 101.

The operation area management unit 109 defines command icons, as a group, that represent commands having the common attribute. Moreover, the operation area management unit 109 manages an icon display area of the display unit 103.

The timer 107 measures a period of time elapsed from when the operation determination unit 105 determines that the coordinates indicated by the coordinate information received from the instruction receiving unit 104 coincide within the icon to when the operation determination unit 105 determines that the coordinates have moved away from the icon. This elapsed period of time is managed for each icon.

When the duration of stay measured by the timer 107 becomes equal to or longer than a predetermined threshold, the operation determination unit 105 determines that the icon at which the present duration of stay has been measured is selected. Then, the operation determination unit 105 sends the identification information of the selected icon to the attribute verification unit 108 and the instruction generation unit 115. Until receiving an execute instruction (such as execute, pattern save, and cancel) from the user, the operation determination unit 105 sends the identification information pieces of the selected icons one by one in the order in which their durations of stay become equal to or longer than the threshold. Processing sequence data including the identification information pieces of the icons stored in the instruction generation unit 115 is sent to the instruction execution unit 106 when an execute instruction is received from user (that is, when the icon representing the execute instruction is selected).

In this way, the operation determination unit 105 and the timer 107 function as duration-of-stay management units that manage the duration of stay measured from when the dragged object icon overlays a command icon or a parameter icon to when the dragged object icon moves away from the command icon or the parameter icon.

As a specific example of the operation in which a command icon or a parameter icon is selected, an operation of overlaying an object icon on the command icon or the parameter icon (namely, a drag operation) is explained as follows. However, note that the present invention is not limited to this. For example, an icon may be selected by pressing the present icon (through a click operation or a touch operation).

According to the operation of the user received by the instruction receiving unit 104, the instruction generation unit 115 generates an instruction which is a group of commands and parameters stored in the command management unit 101. To be more specific, the instruction generation unit 115 generates the processing sequence data by arranging the identification information pieces of the icons obtained from the operation determination unit 105 in the order in which the icons were selected. Then, when the execute instruction is received from the user, the instruction generation unit 115 sends the present processing sequence data to the instruction execution unit 106.

The instruction execution unit 106 obtains the identification information of the operation target object and the processing sequence data from the instruction generation unit 115. Then, the instruction execution unit 106 executes the commands, corresponding to the command identification information pieces included in the processing sequence data, on the received operation target object in the order in which the commands are stored as mentioned above. Here, the instruction execution unit 106 receives a command corresponding to the command identification information from the command management unit 101, and executes the process on the operation target object using this command.

Next, an operation performed by the information processing device 100 having the above configuration is explained.

Figure 2A:
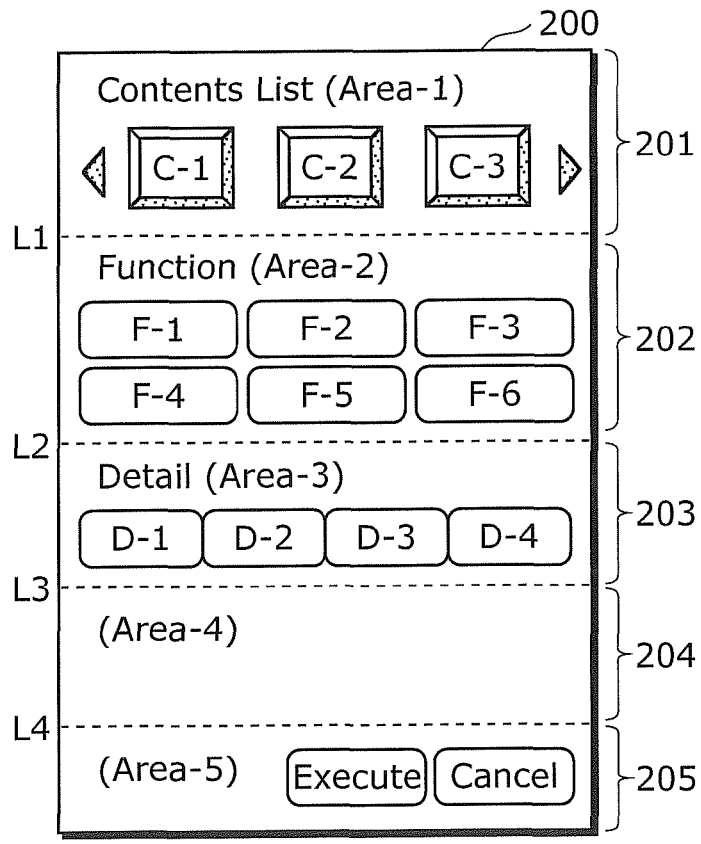
FIG. 2A is a diagram showing an example of a layout of an operation screen displayed on a display unit which is vertically oriented.
Figure 2B:
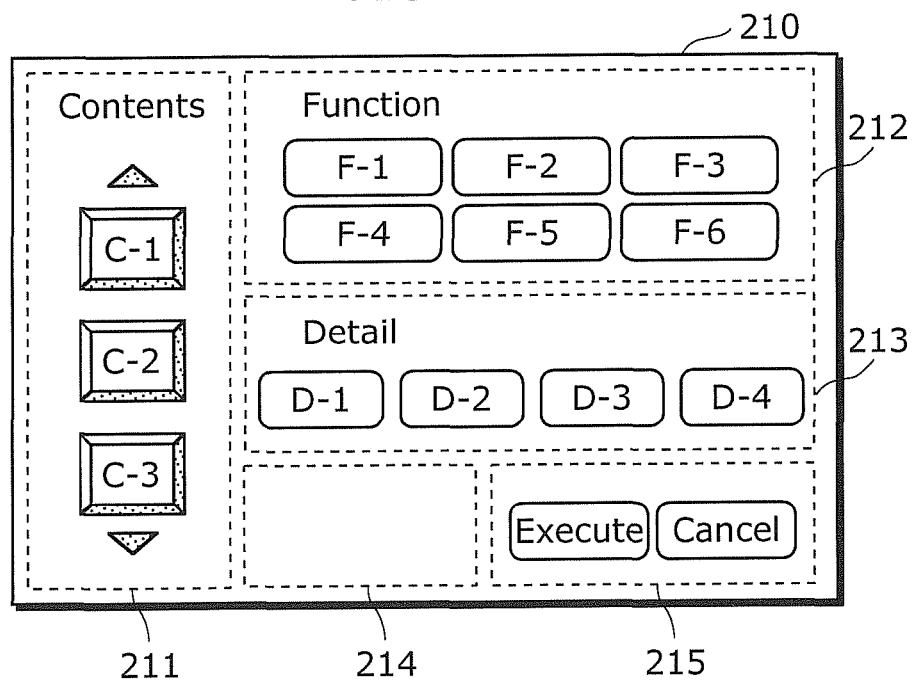
FIG. 2B is a diagram showing an example of a layout of an operation screen displayed on the display unit which is horizontally oriented.

FIGS. 2A and 2B are diagrams, each showing an example of a layout of an operation screen displayed on the display unit 103. In FIG. 2A, an area 201 (Area-1) in an operation screen area 200 included in the information processing device 100 displays a contents list showing at least one object icon that represent a selectable operation target object. In the case where the input device is a touch panel, the user can select an object icon displayed in Area-1 (from among three icons C-1 to C-3 in the present example) by directly touching the screen.

It should be noted that object icons which are not being displayed are managed as, for example, data connected on a continuous chain. Moreover, these other object icons which are not being displayed can be displayed by touching the left or right arrow button area shown in FIG. 2A or by physically tilting the terminal in a direction of arrow. A scrolling display method is employed here, for example.

An area 202 (Area-2) displays a function list showing a command icon that represents a command (or, function) executable on the operation target object selected in the area 201. In the area 202, command icons of up to the maximum number (six icons F1 to F6 in the present example) are displayed according to display layout information managed by the operation area management unit 109.

An area 203 (Area-3) displays a property list showing a parameter icon that represents a parameter associated with the process corresponding to the command icon selected in the area 202. In the area 203, parameter icons of up to the maximum number (four icons D1 to D4 in the present example) are displayed according to the display layout information managed by the operation area management unit 109.

An area 204 (Area-4) refers to an area unused for displaying (or, a blank area), aside from the areas 201 to 203 already used for display and an area 205 (Area-5) serving as a reserved area arranged for a process execute operation (that is, an icon represented by Execute) or a process cancel operation (that is, an icon represented by Cancel).

The operation area management unit 109 manages operation area information that includes a displaying status or an area occupancy rate required for display, for each of the areas 201 to 205. Also, the operation area management unit 109 may manage guides such as dotted lines or frames that allow the operation areas to be recognized as separate groups. The guides include L1 to L4 shown in FIG. 2A that can be visually confirmed by the user.

FIG. 2B shows an operation screen area 210 in the case where the information processing device 100 is turned from the state shown in FIG. 2A by 90 degrees in the left or right direction. In this case, the operation screen area 210 included in the information processing device 100 becomes horizontally long. Thus, the icons are rearranged according to this horizontally-oriented screen. Areas 211 to 215 correspond to the operation areas of the areas 201 to 205, respectively. In FIG. 2B, dotted frames are used as guides.

Figure 3C:
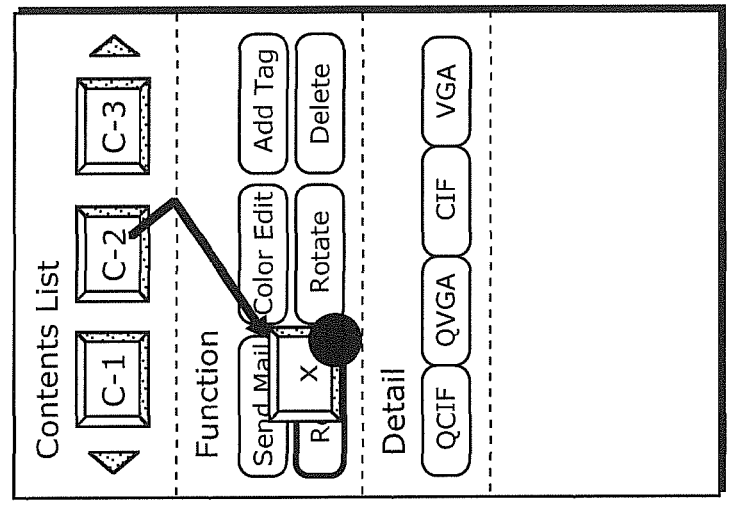
FIG. 3C is a diagram showing that, in response to the selection of a command, parameters associated with the command are displayed.

FIGS. 3A to 3F are diagrams showing, on the operation screen displayed on the display unit 103, that an operation target object is selected, that a command is selected, and that a process is executed. To be more specific, FIGS. 3A to 3F show the following flow. The user selects an image content (C-2) as a process target (FIG. 3A), resizes the image to CIF size (352×288 pixels) through a drag operation (FIGS. 3B to 3D), and changes the color of the same image content (C-2) into a sepia tone (FIGS. 3E and 3F).

FIGS. 4A to 4F are diagrams showing that an operation history table held by the instruction generation unit 115 is rewritten according to the operation procedure shown in FIGS. 3A to 3F. FIGS. 5A to 5F are diagrams showing that the processing pattern is registered, that the operation target object is selected, and that the process based on the registered processing pattern is executed. FIGS. 6A to 6C are diagrams showing that the operation history table held by the instruction generation unit 115 is registered as the processing pattern into the pattern management table of the pattern management unit 110. The processing pattern shown in FIGS. 6A to 6C relates to the procedure for registering the processing pattern shown in FIGS. 5A to 5F.

Figure 7:
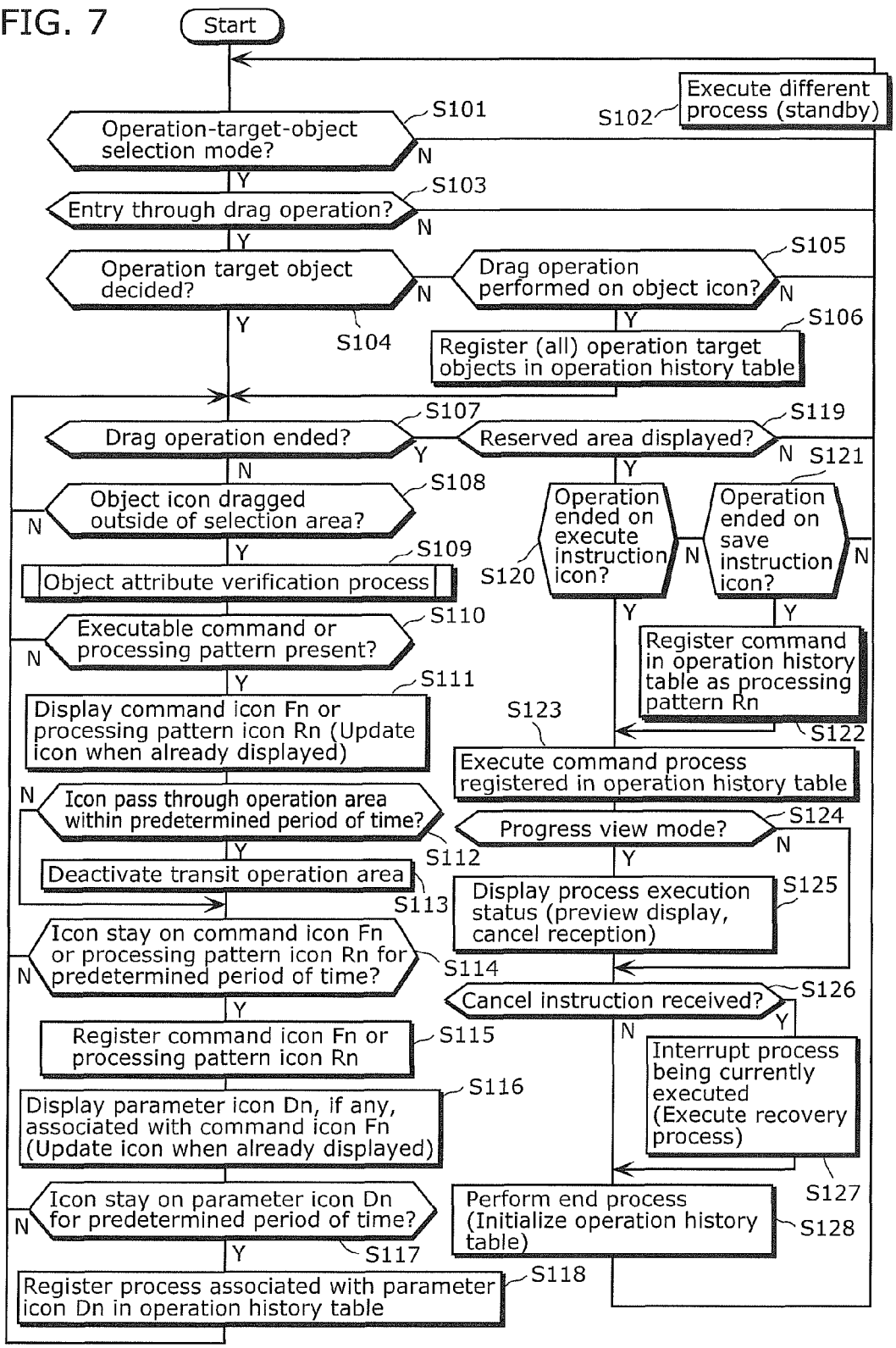
FIG. 7 is a flowchart showing an operation performed by the information processing device in the first embodiment.
Figure 8:
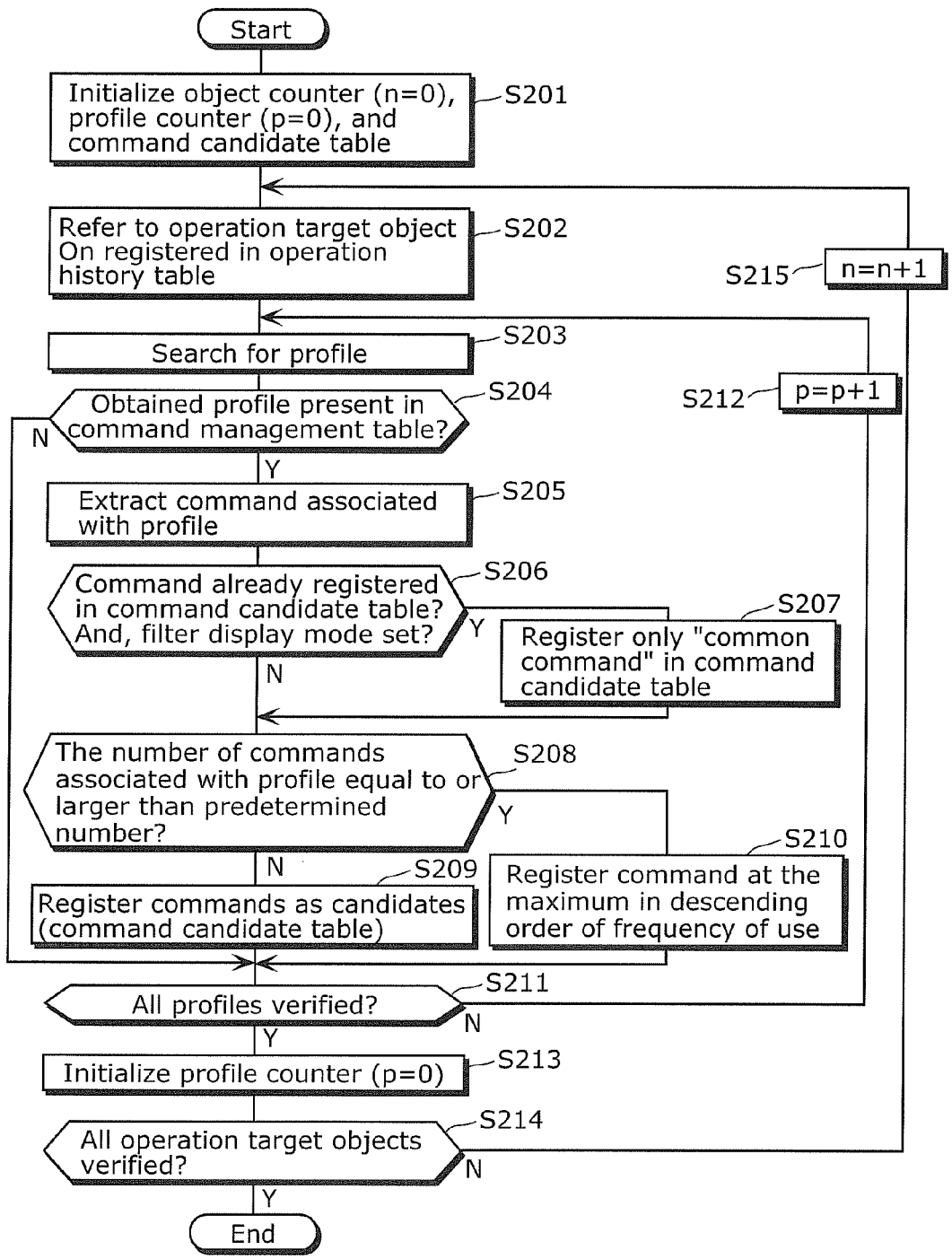
FIG. 8 is a flowchart showing an attribute verification process.

FIG. 7 is a flowchart showing a process in which a plurality of processes are selected and executed. FIG. 8 is a flowchart showing a process for verifying an attribute of the operation target object. FIG. 9 is a diagram showing an example of a command management table held by the command management unit 101 in the first embodiment. FIGS. 10A to 10G are diagrams showing examples of a command reference table held by the command management unit 101.

FIG. 11 is a diagram showing an example of a command candidate table held by the command management unit 101 in the first embodiment. FIG. 12 is a diagram showing an example of a contents list table storing information related to operation target contents (data) held by the data holding unit 102 in the first embodiment.

In the following, an operation performed by the information processing device 100 is explained in detail using FIG. 3A to FIG. 12. Basically, the explanation is given according to the flowcharts shown in FIGS. 7 and 8.

Figure 3B:
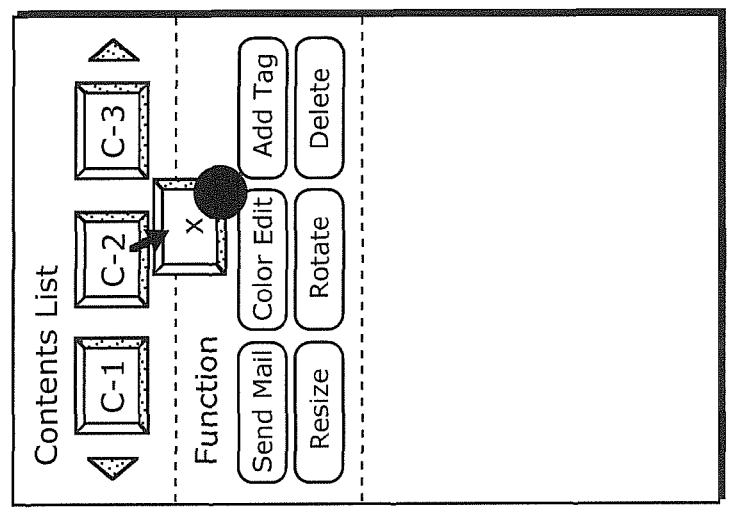
FIG. 3B is a diagram showing that commands executable on the operation target object are displayed.
Figure 3A:
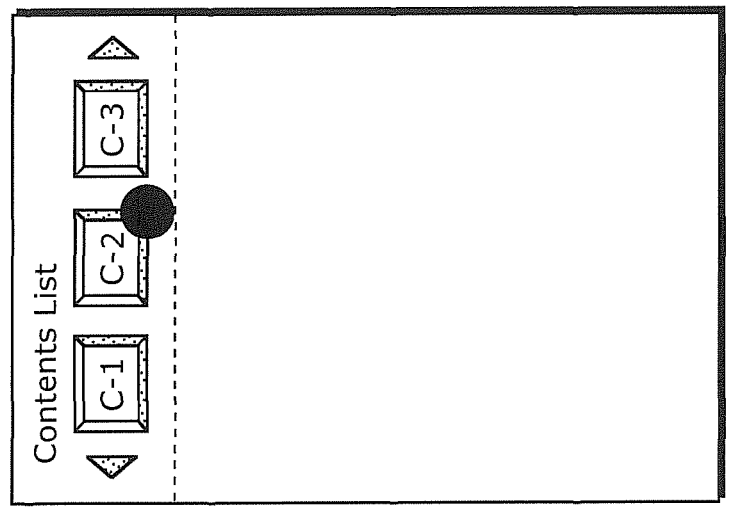
FIG. 3A is a diagram showing that an operation target object is selected.

First, as shown in FIG. 3A, the user can select data which is to be an operation target as an operation target object by touching the corresponding object icon displayed on the display unit 103. Here, the instruction receiving unit 104 detects a touch-operation event performed by the user. Moreover, the operation determination unit 105 determines whether the current mode is a mode of selecting an operation target object (S101). When it is the selection mode (Y in S101), a subsequent process is performed.

On the other hand, when the current mode is not the operation-target-object selection mode (N in S101), the instruction receiving unit 104 stands by until a next touch-operation event is detected (S102). When the current mode is not the operation-target-object selection mode, this means, for example, that an operation lock has been applied for reasons such as that the user has not performed any operation on the operation screen for a predetermined period of time.

Next, the operation determination unit 105 determines whether or not the operation instruction notified by the instruction receiving unit 104 is entered through a drag operation (S103). When it is entered through the drag operation (Y in S103), a subsequent process is performed. On the other hand, when the operation instruction is not entered through the drag operation (N in S103), a different process is executed such as a process of simply selecting the operation target object by a single touch or double click or a process of directly executing a functional process connected to the operation target object (S102).

Next, the operation determination unit 105 determines whether the operation target object is already decided (S104). When the object is already decided (Y in S104), a subsequent process is performed. On the other hand, when the operation target object is yet to be decided (N in S104), the operation determination unit 105 determines whether the drag operation detected in S103 was performed on an object icon representing the operation target object (that is, one of the object icons C-1 to C-3 drawn in the area 201 in FIG. 2A) (S105). When determining that the drag operation was performed on the object icon (Y in S105), the operation determination unit 105 proceeds to the subsequent process.

On the other hand, when it is determined not to be a start of the drag operation performed on an object icon (N in S105), the selection of the operation target object becomes invalid. In this case too, the instruction receiving unit 104 stands by until a next touch-operation event is detected (S102).

When determining that the drag operation was performed on the object icon (Y in S105), the operation determination unit 105 registers at least one selected object icon (C-2 in the present example) into the operation history table held by the instruction generation unit 115 (S106). More specifically, as shown in FIG. 3A, when the user only touches the operation target object, the identification information of the operation target object is not registered into the operation history table.

However, as shown in FIG. 3B, when the user executes the drag operation on the object icon, the identification information of the operation target object (C-2) is registered into the operation history table. The operation history tables corresponding to the states shown in FIGS. 3A and 3B are shown in FIGS. 4A and 4B, respectively. It should be noted that ● in FIGS. 3A to 3F schematically represents a part that the user is touching. Moreover, x shown in the selected object icon represents a center point of this area.

Moreover, the operation determination unit 105 determines whether the drag operation performed by the user is ended (S107). When the drag operation is not ended (N in S107), a subsequent process is performed. The operation determination unit 105 determines whether the center point of the selected object icon is dragged outside the display area (i.e., the area 201 shown in FIG. 2A) (S108).

When the center point of the object icon crosses the guide showing the boundary of the display area (Y in S108) as shown in FIG. 3B, the operation determination unit 105 requests the attribute verification unit 108 to perform an object attribute verification process (S109). This object attribute verification process is explained in detail later. On the other hand, when the center point is not dragged outside the display area (i.e., the area 201 shown in FIG. 2A) (N in S108), the operation determination unit 105 returns to S107 and thus determines whether the drag operation is ended.

Next, based on the result of the object attribute verification process, the attribute verification unit 108 verifies whether there is an executable command or a registered processing pattern associated with the operation target object represented by the object icon that is currently being selected (S110). When there is an executable command or a registered processing pattern (Y in S110), the display control unit 10 displays a command icon "Fn" representing this command or a processing pattern icon "Rn" representing this processing pattern, on the display unit 103 (see FIG. 3B).

When the drag operation performed by the user is relatively long and the attribute of the operation target object changes during the drag operation or when another object icon is selected by multi-touch, the display control unit 10 updates the already-displayed command icon "Fn" or processing pattern icon "Rn".

FIG. 9 is a diagram showing an example of a command management table held by the command management unit 101. When the operation target object (C-2 in the present example) is an image, for example, a command associated with a profile showing an image (Image) corresponds to the command executable on the operation target object. The command management table holds various kinds of information including a command name (Command) with a command identifier (ID), a reference table (Reference Data), and a rate of command usage (Rate) in association with one another, for each profile. FIGS. 10A to 10G show examples of various reference tables referenced from the command management table shown in FIG. 9. That is, FIGS. 10A to 10G show examples of parameters associated with commands. FIG. 11 shows an example of a command candidate table generated through the object attribute verification process.

According to the selected operation target object (C-2), the display unit 103 displays command icons, out of command icons representing the commands shown in FIG. 11. Here, the number of displayed command icons is equal to or smaller than the maximum displayable number indicated by the layout information that is held by the operation area management unit 109. In the example shown in FIG. 3B, the maximum displayable number is six. Thus, in FIG. 3B, the top six command icons are displayed on the display unit 103. Note that the command icons are displayed in the display area different from the area displaying the object icons. Therefore, the object icons and the command icons are displayed on the same screen at the same time, as shown in FIG. 3B.

As described thus far, the user can visually designate a command process by performing the drag operation so as to overlay the object icon representing the operation target object onto the command icon representing the command, as shown in FIG. 3C.

Next, before S112 and S113 are explained, processes performed from S114 are explained. Suppose here that the drag operation is continuously performed by the user on the object icon representing the operation target object as shown in FIG. 3C and thus the object icon stays on the command icon "Fn" or the processing pattern icon "Rn" for a predetermined period of time (for two seconds, for example) (Y in S114). In this case, the operation determination unit 105 registers the command represented by the command icon "Fn" (Resize, in the present example) or the processing pattern represented by the processing pattern icon "Rn" into the operation history table as shown in FIG. 4C (S115).

Also, when there are parameters associated with the selected command icon "Fn", the display control unit 10 displays parameter icons Dn as shown in FIG. 3C, using a reference table referenced from the command management table shown in FIG. 9 (S116). Here, the number of the displayed icons is equal to or smaller than the maximum displayable number indicated by the layout information that is held by the operation area management unit 109. In this example, Size table (see FIG. 10F) associated with Resize command shows the parameters. Note that the parameter icons are displayed in the display area different from the areas displaying the object icons and command icons. Therefore, the object icons, the command icons, and the parameter icons are displayed on the same screen at the same time, as shown in FIG. 3C.

Moreover, suppose here that the drag operation is continuously performed by the user on the object icon representing the operation target object as shown in FIG. 3D and thus the object icon stays on the parameter icon Dn for a predetermined period of time (for two seconds, for example) (Y in S117). In this case, the operation determination unit 105 registers the parameter (CIF in the present example) represented by the parameter icon Dn into the operation history table as shown in FIG. 4D (S118). Then, the processing returns to S107 where whether the drag operation is ended is determined.

Next, as shown in FIG. 3E, when the user selects a next command icon (Color Edit, in the present example) through a continuous drag operation (N in S107), the steps S108 to S118 are repeated according to the selected command icon and the display of the parameter icons are accordingly updated. Also, when the drag operation is performed on the object icon representing the operation target object as shown in FIG. 3F and the object icon stays on the parameter icon (Sepia, in the present example) for the predetermined period of time, the operation history table is updated as shown in FIG. 4F.

Then, when the sequential drag operation by the user is ended (Y in S107) as shown in FIG. 3F, it is determined whether the reserved area (the area 205 in FIG. 2A, that is, Area-5) including the execute instruction icon (Execute) and the save instruction icon (Save) is displayed (S119). When the reserved area is being displayed (Y in S119), a subsequent process is performed. On the other hand, when the reserved area is not being displayed (N in S119), it is determined that, for example, information required to execute the processing command associated with the operation target object currently being selected is insufficient. Accordingly, the operation-target-object selection mode is cancelled and the information processing device 100 enters a standby state (S102).

When it is determined that the reserved area is being displayed (Y in S119), a position of the center point of the object icon on the operation screen at the end of the drag operation is determined (S120). To be more specific, when the center point is located on the execute instruction icon in the reserved area (Y in S120), a subsequent process is performed. On the other hand, when the center point is not located on the execute instruction icon (N in S120) and is on the save instruction icon (Y in S121), a process of S122 is performed.

When the center point is not located on the execute instruction icon nor the save instruction icon (N in S121), it is determined that, for example, information required to execute the processing command associated with the operation target object currently being selected is insufficient. Accordingly, the operation-target-object selection mode is cancelled and the information processing device 100 enters a standby state (S102).

When it is determined that the drag operation performed on the object icon representing the operation target object is ended on the save instruction icon (Y in S121), the instruction generation unit 115 registers the command and parameters held in the operation management table as the processing pattern "Rn" (S122).

Moreover, suppose that it is determined that the center point of the object icon is located on the execute instruction icon in the reserved area at the end of the drag operation (Y in S120) or that the execution of the process in S122 is ended. In this case, the instruction execution unit 106 executes the process corresponding to the command registered in the operation history table, according to a designated parameter (S123).

Here, when "Progress view mode" in which the processing progress can be visually confirmed is set in advance in a setting screen or the like of the information processing device 100 (Y in S124), a process execution status is displayed on the display unit 103 (S125). It should be noted that S125 is explained later using a specific example.

On the other hand, when "Progress view mode" is not set (N in S124), the screen of the display unit 103 does not change.

Moreover, in the case where a clear button used for instructing an interruption or cancel of the process is provided on a part of the body of the information processing device 100, the process currently being executed is cancelled when this clear button is pressed. More specifically, when the user presses the clear button provided on the body (Y in S126), an event notification indicating a cancel instruction is caused in the information processing device 100. Then, the instruction execution unit 106 receives the caused notification indicating the cancel instruction, interrupts the process currently being executed, and executes a process (namely, a recovery process) to recover the process interrupted in midstream (S127).

On the other hand, when the execution of the sequential processes registered in the operation history table is ended without a cancel instruction being caused (N in S126), the instruction execution unit 106 determines that the process execution by the instruction execution unit 106 has normally completed and thus performs an end process (S128). Then, in order to receive a next operation from the user, the information processing device 100 enters the standby state (S102). It should be noted that the end process refers to, for example, a process of deleting the registered details in the operation history table.

In this way, through the processes shown in FIGS. 3A to 3F, the size of the image content (C-2) selected as the operation target object by the user is resized to CIF size (352×288 pixels) and the color of this same image content (C-2) is changed into a sepia tone, by the drag operation.

Next, the object attribute verification process (S109) is explained in detail, using FIGS. 8 to 10G.

As described above, when the center point of the object icon crosses the guide showing the boundary of the display area (Y in S108) as shown in FIG. 3B, the operation determination unit 105 requests the attribute verification unit 108 to perform the object attribute verification process (S109).

In response to the request from the operation determination unit 105, the attribute verification unit 108 initializes an object counter used for counting the number of objects which are currently operation targets and a profile counter used for counting the number of profiles associated with the object (that is, each counter becomes 0) (S201). Moreover, as an initialization process, the attribute verification unit 108 clears all in the command candidate table. It should be noted that the operation target object is data or a command that is designated as a process target by an operation instruction.

Next, the attribute verification unit 108 obtains the identification information (C-2) of the operation target object with reference to an operation target object "On" registered in the operation history table shown in FIG. 4B. Moreover, the attribute verification unit 108 obtains a profile name (Image) of the operation target object from the contents list shown in FIG. 12, in association with the obtained identification information (C-2) of the object.

In this example, the selected operation target object is only the identification information (C-2). On this account, the profile of the operation target object is only the profile "Image" referenced with C-2. On the other hand, suppose that a plurality of object icons are selected using multi-touch. In such a case, a plurality of profiles may be selected from the identification information pieces indicating the plurality of operation target objects. Thus, the attribute verification unit 108 obtains all the profiles (S202).

Next, the attribute verification unit 108 inquires of the command management unit 101 whether there are executable processing commands associated with the obtained profile names. In response to the request from the attribute verification unit 108, the command management unit 101 sends a group of executable commands with reference to the command management table shown in FIG. 9 (S203). In the present example, the command management unit 101 sends processing commands ID1 (Send Mail) to ID10 (Delete) that are associated with the profile name "Image".

Then, when there are processing commands associated with the profile name (Y in S204), the attribute verification unit 108 extracts the processing commands associated with the profile and attempts to store the commands into the command candidate table (S205). Here, suppose that the extracted processing commands are already registered in the command candidate table and also "Filter display mode" in which only shared common functions (processing commands) can be visually confirmed is set in advance in the setting screen of the information processing device 100 (Y in S206). In such a case, only the common processing commands are registered in the command candidate table (S207). Accordingly, even when a plurality of operation target objects are selected, only the command icons representing the common processing commands are displayed in a menu. This can prevent a complicated and redundant menu from being displayed.

Moreover, when the number of processing commands associated with the profile is smaller than the maximum number of commands storable in the command candidate table (ten commands in the present example) (N in S208), the attribute verification unit 108 registers the extracted processing commands as the processing candidates directly into the command candidate table (S209). On the other hand, when the number of processing commands associated with the profile is equal to or larger than the maximum number of commands storable in the command candidate table (Y in S208), the attribute verification unit 108 registers the commands at the maximum in descending order of frequency of use on the basis of the command frequencies indicated by "Rate" in FIG. 9 (S210).

It should be noted that a column indicated by "Com." in FIG. 11 shows the number of extraction times (appearance times) the processing command is extracted for the verification of a profile. This value is incremented and held every time the same processing command is extracted.

When it is determined that there are no processing commands associated with the obtained profile in the command management table (N in S204), the attribute verification unit 108 performs the processes from S209 or from S210.

Next, the attribute verification unit 108 verifies whether the processing commands associated with all the profiles of the operation target object currently being verified are extracted (S211). When not all the profiles are verified (N in S211), the attribute verification unit 108 increments the profile counter (S212) and then returns to S203.

On the other hand, when it is determined that all the profiles corresponding to the selected operation target object are verified (Y in S211), the attribute verification unit 108 initializes the profile counter to 0 (S213).

Furthermore, the attribute verification unit 108 checks whether all the operation target objects other than the operation target object currently being verified have been verified (S214). When not all the objects are verified (N in S214), the attribute verification unit 108 increments the object counter (S215) and then returns to S202.

On the other hand, when determining that all the operation target objects have been verified (Y in S214), the attribute verification unit 108 terminates the object attribute verification process and then returns to S110 in FIG. 7.

The object attribute verification process described above allows the processing commands to be dynamically extracted corresponding to the profile of the operation target object. Accordingly, a processing command area (namely, the menu) can be dynamically changed.

Next, the operation to register a processing pattern and the process execution using the registered processing pattern are explained, with reference to FIGS. 5A to 10G.

Figure 5C:
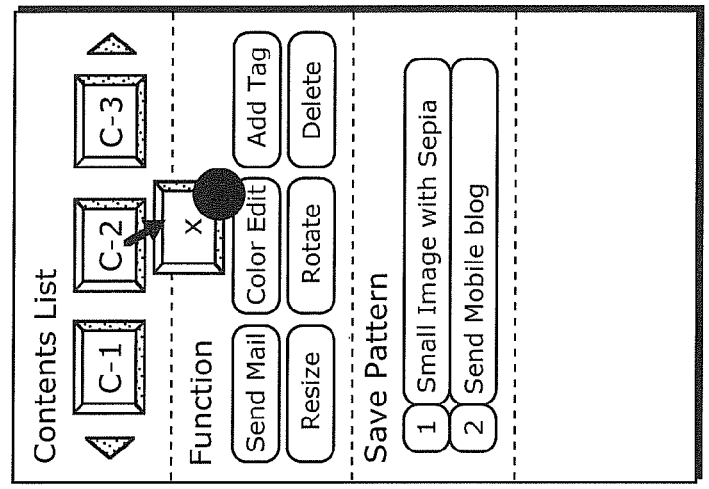
FIG. 5C is a diagram showing an operation target object is selected.
Figure 5B:
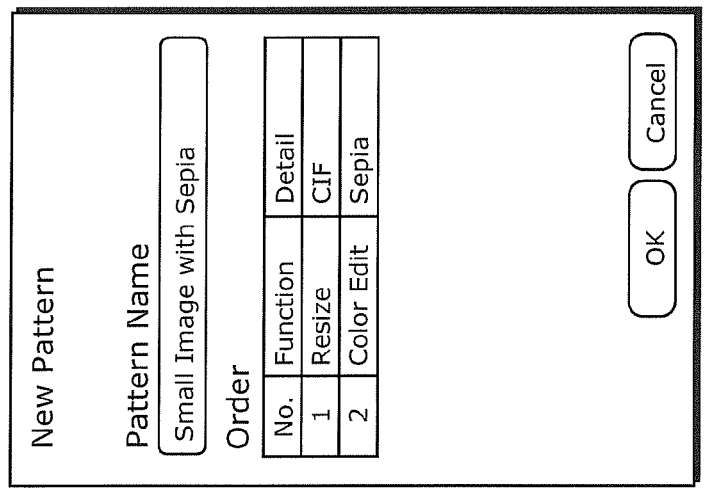
FIG. 5B is a diagram showing that properties of the processing pattern are entered.
Figure 5A:
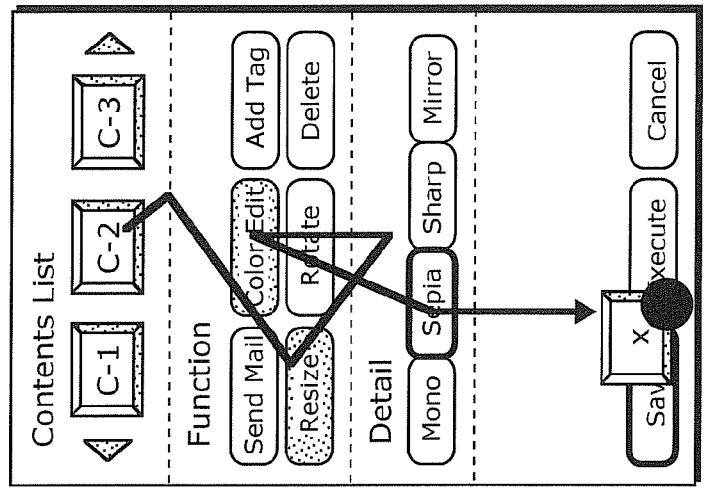
FIG. 5A is a diagram showing that a processing pattern is saved.

FIG. 5A shows that after selecting the operation target object (C-2), the processing command, and then the parameter, the user saves the processing pattern. Note that an arrow shown in this diagram indicates a path taken by the user in the drag operation. This path indicates that the drag operation is eventually ended on the save instruction icon.

When it is determined that the drag operation is ended on the save instruction icon (Y in S121), the operation determination unit 105 requests the pattern management unit 110 to register the processing sequence data registered in the operation history table, as "Processing pattern Rn" (S122). The pattern management unit 110 newly creates a processing pattern with reference to the designated operation history table and then saves the processing pattern into the pattern management table. In the present example, the pattern management unit 110 interprets the operation history table shown in FIG. 4F as the processing pattern shown in FIG. 6A, formats the processing pattern as shown in FIG. 6B, and then saves the formatted processing pattern into the pattern management table.

Here, the information processing unit 100 abstracts the identification information (C-2) of the operation target object and replaces the identification information with the type information (Image) of the operation target object. Thus, when this processing pattern is executed in the future, whether this processing pattern is executable can be determined by determining the type information.

As shown in FIG. 6B, the pattern management unit 110 also save, as properties, supplementary information that is supplementary to the processing pattern. The supplementary information includes: a processing pattern ID (Pattern ID) which identifies the processing pattern; a processing pattern name (Pattern Name); a creation date of the processing pattern (Date); a designated date and time for executing the processing pattern (Execution Time); and a recurrence setting (Recurring). These pieces of information may be automatically supplemented by the information processing device 100 wherever possible. Or, as shown in FIG. 5B, a registration screen of the processing pattern may be presented expressly in order for the user to make an entry or correction via an input device such as a keyboard.

FIG. 6C shows examples of the processing pattern held by the pattern management unit 110. For example, suppose that a processing pattern represented by a pattern ID "R2" as shown in FIG. 6C is registered in addition to the processing pattern created as shown in FIGS. 5A and 5B or FIGS. 6A and 6B. In such a case, the processing pattern names such as "Small Image with Sepia" and "Send Mobile Blog" are displayed as the processing pattern icons in the area (the area 203 in FIG. 2A, that is, Area-3) indicated as "Saved Pattern" on the screen of the display unit 103, as shown in FIG. 5C.

With this, when a next processing command is selected in the future, the user can drag the object icon representing the operation target object onto the processing pattern icon representing the registered processing pattern. As a result, the registered processing pattern can be executed (this corresponds to the processes from S120).

Note that the processing pattern represented by the pattern ID "R2" in FIG. 6C includes processes in which the image size of the operation target object specified by the type information "Image" is converted into a fixed size "QCIF" and a character string "Food" is added as a tag indicating that string processing is available. Also, the processing pattern represented by the pattern ID "R2" includes a process in which geographical information (location information indicating the latitude and longitude or the like) that indicates a location where the processing pattern is designated is added. Moreover, the processing pattern represented by the pattern ID "R2" includes sequential processes in which an email message accompanying an image as an attachment is sent to a specific mail address "Address 1" used for receiving messages posted to a blog or the like managed and owned by an individual.

Figure 5D:
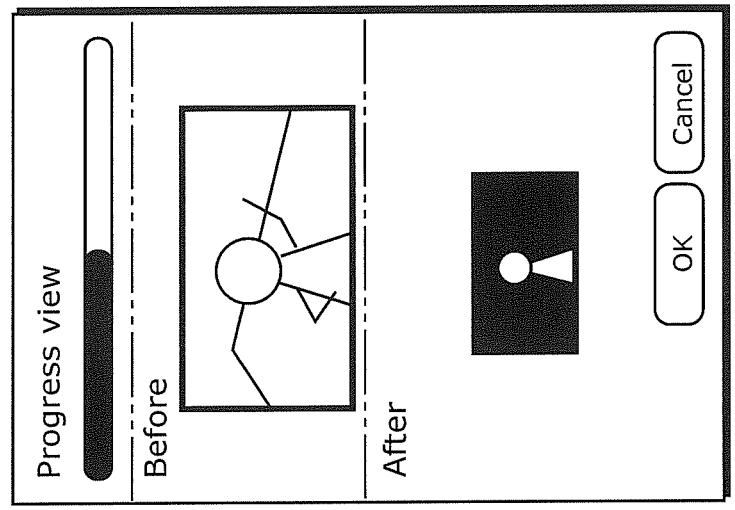
FIG. 5D is a diagram showing that a processing pattern is selected.

FIG. 5D shows that the object icon representing the operation target object is dragged and moved through the area of the function list in a relatively short period of time. Here, the operation determination unit 105 determines whether the object icon passed through the operation area including a command icon "Fn" within a predetermined period of time (two second, for example) (S112). When determining that the object icon passed through the area within the predetermined period of time (Y in S112), the operation determination unit 105 deactivates the icons of the processing command candidates included in this transit operation area (S113). For example, the operation determination unit 105 deletes or grays out the display such that selection is unavailable.

On the other hand, when determining that the object icon did not pass through the area within the predetermined period of time (N in S112), the operation determination unit 105 performs the processes from S114. In this way, it is clearly shown to the user that the command icons included in the operation area through which the object icon passed in a short period of time by the drag operation are not to be actually selected by the user and therefore are not to be selection candidates. Also, the user can be prevented from touching and thus selecting an undesired processing command by mistake during the drag operation.

The present example describes the case where the determination regarding the transit is made based on the fixed predetermined period of time. However, the size of the operation area is not always the same and, for this reason, a period of time in which the selected icon is dragged through the transit area is to be changed. Thus, the predetermined period of time may be changed dynamically according to the size of the entire screen of the display unit 103, the maximum displayable number of processing commands that can be stored in the operation area managed by the operation area management unit 109, or the size of the operation area included in the layout information.

Moreover, when the processing pattern icon is selected as shown in FIG. 5D, the icon "Save" is also deactivated. This is because, when the registered processing pattern is selected, "Save" cannot be an option.

Figure 5E:
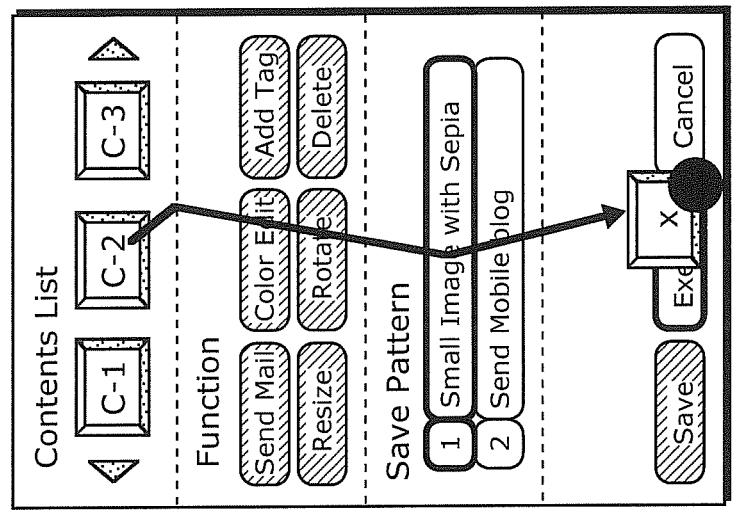
FIG. 5E is a diagram showing that the processing pattern is to be executed on the operation target object.
Figure 5F:
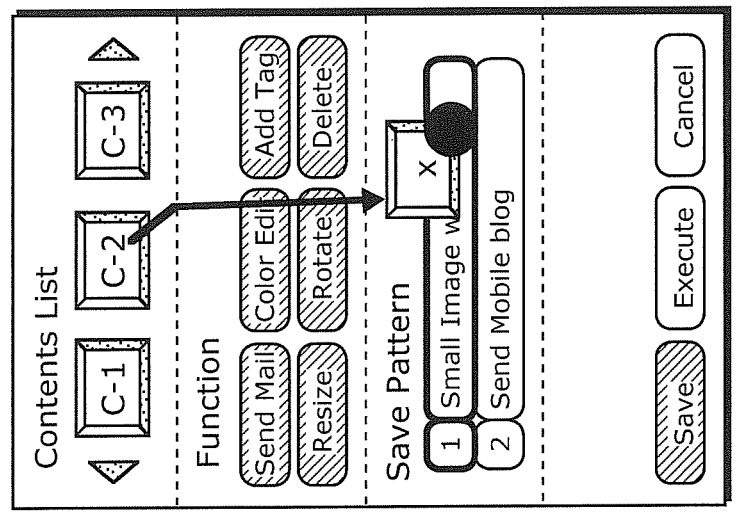
FIG. 5F is a diagram showing a progress view screen.

Furthermore, when the user selects the processing pattern icon and ends the drag operation on the execute instruction icon (S120) as shown in FIG. 5E, sequential processes defined by the selected processing pattern are executed (S123). Then, in the case where "Progress view mode" is set (Y in S124), the progress view screen as shown in FIG. 5F is displayed. In the present example, in addition to a progress notification bar showing the progress of a process, a pre-processed image (Before) and a post-processed image (After) may be displayed at the same time as previews when image processing is to be performed on the operation target object.

According to the first embodiment described thus far, the operation determination unit 105 included in the information processing device 100 detects the operation target object selected on the operation screen by manipulating the cursor, and also detects the processing command to be executed on the selected operation target object. The instruction generation unit 115 generates an operation history table in which an operation target object, a processing command associated with the operation target object, and a parameter associated with the processing command are stored in association with one another. Also, at least one object icon, a command icon identifying a processing command executable on the selected operation target object, and a parameter icon identifying a parameter associated with the processing command are displayed on the same operation screen.

Moreover, the instruction generation unit 115 arranges the identification information pieces of the processing commands in the order of detection that are detected by the operation determination unit 105 during the drag operation. This drag operation is performed in a single movement without a release from an act of selection, from when the operation target object is selected to when a group of processing commands to be executed on the present operation target object is determined. As a result, the processing sequence data is generated. On the basis of the identification information pieces in the processing sequence data, the instruction execution unit 106 executes the processing commands on the selected operation target object.

With this, the information processing device 100 can display only a menu that is available to the selected operation target object and a subordinate menu that is available after the execution of the process corresponding to the menu item selected from the present available menu. Moreover, the information processing device 100 allows a plurality of desired processes to be designated and executed only by tracing on the display menu through a drag operation. In other words, this can implement the information processing device 100 which is capable of executing a plurality of processes with intuitive operability.

The operation determination unit 105 and the timer 107 serving as the duration-of-stay management units manage the duration of stay from when the object icon representing the selected operation target object is partially overlaid on the command icon to when this object icon is moved away from the command icon. Then, only when the duration of stay on this icon exceeds the predetermined threshold, the operation determination unit 105 detects the command represented by the command icon as the selected command.

With this, even when the user touches an undesired menu item for a moment due to an unintentional hand movement or an operational mistake during the drag operation, this menu item is not considered to be selected. This can prevent a menu item that is not desired by the user from being executed.

The pattern management unit 110 manages the processing sequence data generated in the past, as the processing pattern. With this, when the same processes are to be executed, the corresponding commands do not need to be selected. This results in improved convenience to the user.

It should be noted that even when there is no duration between the process designation and the process execution, the display control unit 10 may display the processing sequence data on the screen in order for the user to check whether there is no mistake in the displayed processing sequence data, and the process may be executed after the execute instruction is received from the user. This can prevent a process which is not desired by the user from being executed. Also, this can prevent degradation from occurring to the operational performance (or, response) in the continuous drag operation. Here, the degradation may occur due to an increased load on the terminal that executes a background process to achieve immediate execution.

Moreover, when two operation target objects are selected at the same time, the display control unit 10 displays only the commands common to both of these operation target objects. Note that the display control unit 10 performs likewise when more than two operation target objects are selected at the same time.

Since the menu items which cannot be executed on the two operation target objects at the same time are not displayed, the user can be prevented from making, for example, an operational mistake. This results in improved convenience to the user.

The operation area management unit 109 manages group areas in which operation target objects, commands, and parameters are separately arranged as groups respectively, and displays boundaries between adjacent areas as guides.

Thus, the user can intuitively determine whether the menu includes a common attribute, meaning that convenience to the user can be improved.

It should be noted that the operation determination unit 105 may determine the aforementioned predetermined threshold according to the size or width of a group area. With this, for the individual information processing devices 100 each having a different screen size, a flexible threshold can be set according to a moving distance in a required drag operation, in consideration with the sizes of the menu display areas that vary depending on the screen size. Therefore, operational mistakes can be reduced, and the operability can be improved.

Second Embodiment

The second embodiment relates to a system which executes a process in cooperation with external devices connected to an information processing device via a network.

Figure 13:
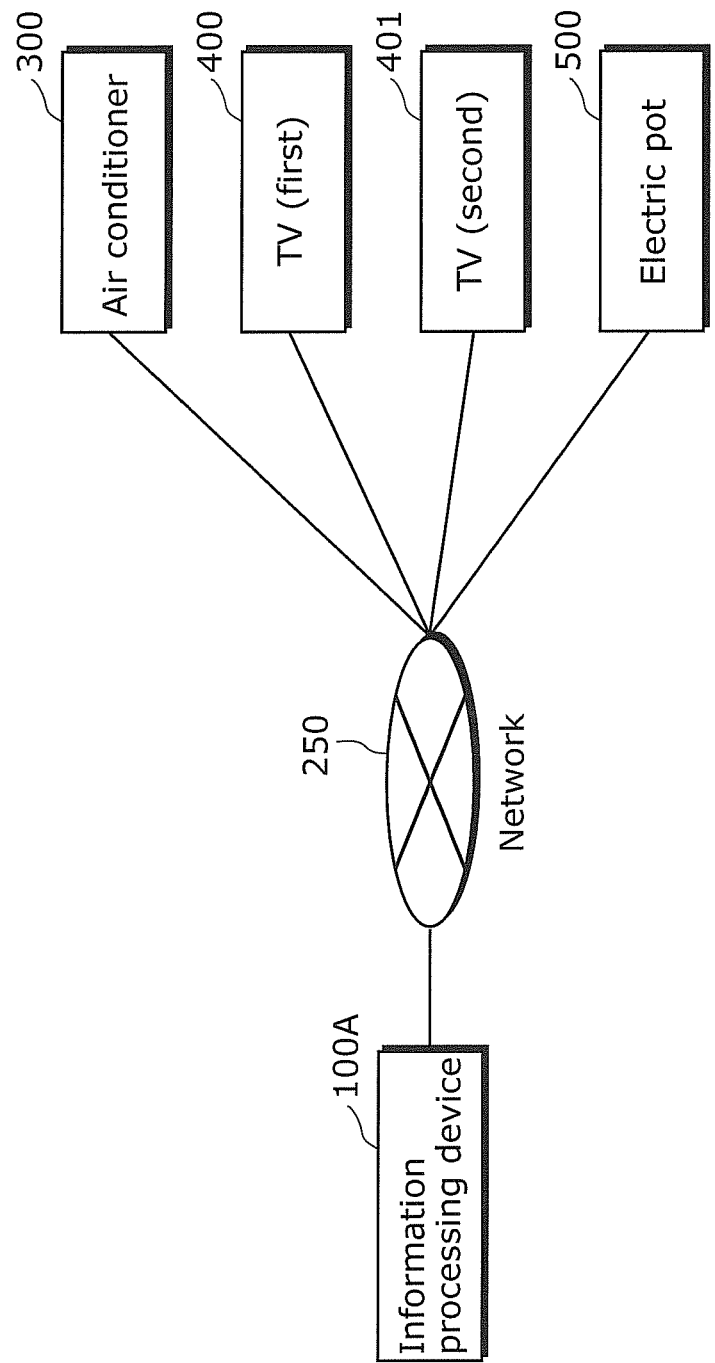
FIG. 13 is a diagram showing a configuration of a system in a second embodiment of the present invention.

FIG. 13 is a diagram showing a configuration of the system in the second embodiment of the present invention. In the system shown in FIG. 13, an information processing device 100A, an air conditioner 300, first and second TVs 400 and 401, and an electric pot 500 are interconnected via a network 250 so as to be communicatable with one another. The air conditioner 300, the first and second TVs 400 and 401, and the electric pot 500 are the aforementioned external devices.

Figure 14:
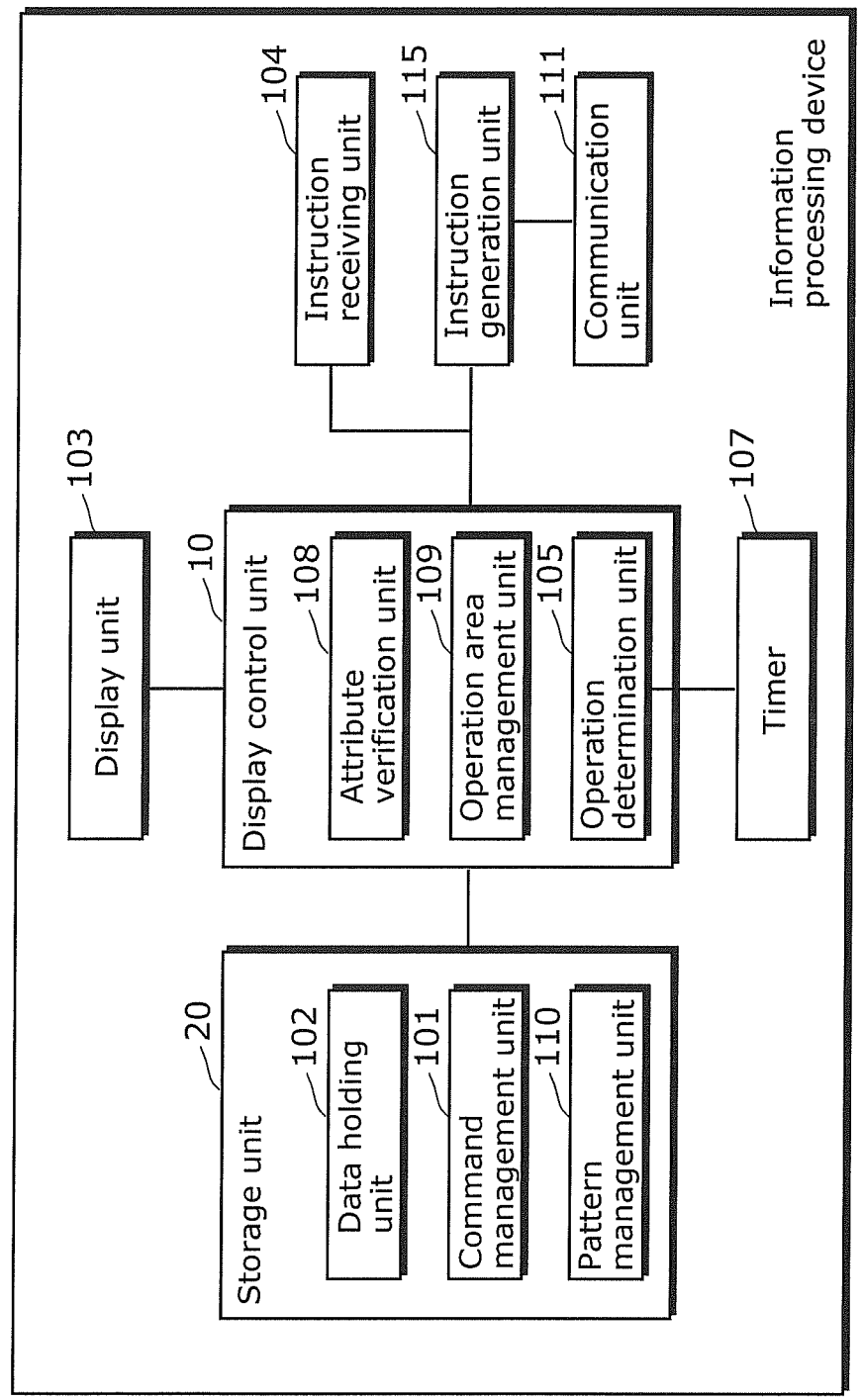
FIG. 14 is a block diagram of an information processing device in the second embodiment of the present invention.

FIG. 14 is a block diagram showing a configuration of the information processing device 100A in the second embodiment of the present invention. The information processing device 100A shown in FIG. 14 includes a communication unit 111 in place of the instruction execution unit 106 of the information processing device 100 shown in FIG. 1. "Objects" used in the second embodiment refer to the external devices connected to the information processing device 100A. Instead of executing a generated instruction, the information processing device 100A functions as a remote control that causes the external device to execute the instruction.

When the command management table held by the command management unit 101 does not store a profile of the external device which is the operation target object, the attribute verification unit 108 obtains the profile from the external device. Here, the profile is obtained via the communication unit 111. It should be noted that, instead of attempting to obtain information on the profile level, the display control unit 10 may obtain, from the external device, the command management table or function list that includes the profile.

The instruction generation unit 115 sends the generated processing sequence data together with a process execution request, to the external device which is the operation target object. Also, the instruction generation unit 115 sends the processing pattern held by the pattern management unit 110 together with the process execution request, to the external device.

The process execution request is sent via the communication unit 111. Note that the external device can exchange information with the information processing device 100A by communication via the network 250, using a standard device-cooperation protocol such as UPnP (Universal Plug and Play) or ECHONET (Energy Conservation and Homecare Network) or using a uniquely designated protocol.

Next, an operation of the system having the configuration described above is explained. The explanation is given, based on the following premise. That is, the user operates the first TV 400 capable of receiving digital terrestrial broadcasting (D) and satellite broadcasting (BS) and the second TV 401 (a set-top box) capable of receiving cablecast (CATV), using the information processing device 100A.

The diagrams and explanations given below describe a case in particular where Channel 8 of digital terrestrial broadcasting is selected in a tuner of the first TV 400, Channel 102 of CATV is selected in a tuner of the second TV 401, and these two received pictures are displayed on the first TV 400 in a dual split-screen mode in a ratio of three to one.

FIGS. 15A to 15C and FIGS. 16A to 16C are diagrams showing examples of the operation screen before the dual screen display is instructed and examples of information to be obtained from the external devices. FIG. 17 is a flowchart showing an attribute verification process in the second embodiment.

Figure 15A:
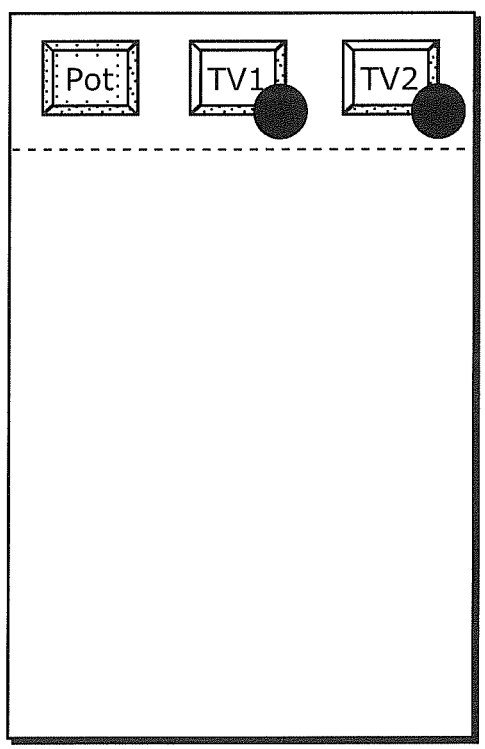
FIG. 15A is a diagram showing that an operation target object is selected.

In FIG. 15A, an icon "TV1" representing the first TV 400, an icon "TV2" representing the second TV 401, and an icon "Pot" representing the electric pot 500 are displayed as a contents list in an area corresponding to the area 201 (Area-1) in FIG. 2A. Here, the present example is based on the premise that when connecting to the surrounding external devices via the network 250, the information processing device 100A obtains in advance basic information (in general, device names, serial numbers, IP addresses, device types (profiles), and the like) of the external devices via the communication unit 111, using a device detecting function implemented in the standard protocol such as UPnP.

Each object icon (also referred to as a "device icon" when the icon represents an external device) displayed in Area-1 represents an external device. In the first embodiment, the contents are the operation target objects. However, in the second embodiment, the external devices are the operation target objects and thus the targets as the operation objects are different. Regardless of the difference, the contents and the external devices can be processed as the operation target objects in the same manner.

More specifically, by touching the device icons (the TV1 and the TV2 in the present example) on the operation screen and performing a drag operation, the user can select and then execute the processing command associated with the operation target objects according to the flowchart shown in FIG. 7. Note that, in FIG. 15A, the device icon "Pot" other than the touched device icons "TV1" and "TV2" is grayed out as an unavailable icon.

FIG. 17 is a flowchart of the attribute verification process performed on the operation target object. The flowchart shown in FIG. 17 is obtained by partially modifying the flowchart shown in FIG. 8. To be more specific, S216 and S217 are added.

In response to the request from the attribute verification unit 108, the command management unit 101 sends a group of executable commands with reference to the command management table shown in FIG. 9 (S203). However, the command management table shown in FIG. 9 does not describe the profile associated with the icon "TV".

Therefore, it is determined that the profile of "TV" does not exist in the command management unit 101 (N in S204).

Here, the attribute verification unit 108 inquires of the external device, via the communication unit 111, whether there is (namely, whether the external device holds) command information corresponding to the profile of "TV" (S216). Then, the attribute verification unit 108 receives a result of the inquiry via the communication unit 111, and registers the received command information into the command management unit 101.

The attribute verification unit 108 determines whether or not the command information corresponding to the desired profile has been obtained (S217). When the command information has been obtained (Y in S217), the attribute verification unit 108 performs the processes from S205. On the other hand, when the command information corresponding to the desired profile has not been obtained (N in S217), the attribute verification unit 108 performs the processes from S209 or from S210.

FIG. 15B shows an example of data on the profile of "TV" that is obtained from the first TV 400 (i.e., "TV1"). Information 1501 in FIG. 15B describes device information and state information regarding the device, which include a profile name of the device (TV), a device name (TV1), a model (IPTV), a model name (GIGA VISION), a serial number (SN0123456789), a unique ID of the device (uuid: giga001_0123456789), and a power state (ON). Here, the state information refers to information indicating a current operating state of the external device, such as a power-on state or a power-off state.

Information 1502 to 1504 describe functions or services provided by the device. At the beginning and end of the information 1502 to 1504, device service tags (Device Services) are described. In other words, it is understood that a section between the device service tags describe the information regarding the functions or services provided by the device. In the present example, there are three elements as the functions and services provided by the device.

The information 1502 describes that: the TV1 has a tuner; the TV1 is capable of receiving digital terrestrial broadcasting; the ID identifying the function is "TV1-T1"; and the channel currently being set to receive in the tuner is "D-081". The information 1503 describes that: the TV1 has a tuner capable of receiving BS broadcasting; the ID identifying the function is "TV1-T2"; and the channel currently being set is "BS-05". The information 1504 describes that: the TV1 has an EPG (Electronic Program Guide) function; the ID identifying the function is "TV1-EPG"; and the current state is "Ready (Standby)".

Information 1505 to 1507 describe information regarding commands that correspond to the functions or services provided by the device. At the beginning and end of the information 1505 to 1507, control list tags (Control List) are described. In other words, it is understood that a section between the control list tags describe the information regarding the processing commands that correspond to the functions or services provided by the device. In the present example, there are three elements as the processing commands that correspond to the functions and services provided by the device.

The information 1505 describes that channel change in ascending order (Channel Up) is provided as a command (action) executable on a target tuner function. To be more specific, the information 1505 describes that "Button: Up" is recommend as a form for displaying this command, and also describes a path required to actually execute the processing command as a URL (Uniform Resource Locator) of the target external device.

The information 1506 describes that channel change in descending order (Channel Down) is provided. To be more specific, the information 1506 describes that "Button: Down" is recommended as a form for displaying this command, and also describes a path required to execute the command. It should be noted that the tuner which is the target here is "Tuner" represented by the function type (Type tag) held by the TV1. Also note that the channel change is applicable to each of the tuners for receiving digital terrestrial broadcasting and BS broadcasting.

The information 1507 does not designate the target, and describes that there is a split-screen display (Dual Display) as a command that corresponds to a basic function of the TV1. To be more specific, the information 1507 describes that "(typical) Button" is recommended as a form and that the property to be displayed on this button is a split rate list (Rate List). Also, a URL required to obtain XML of the split rate list is described.

Moreover, a path required to actually execute the processing command is described as a URL of the target external device. Furthermore, the information 1507 describes how to designate the input sources for the two screens necessary for the dual display and how to designate the split rate.

Figure 15C:
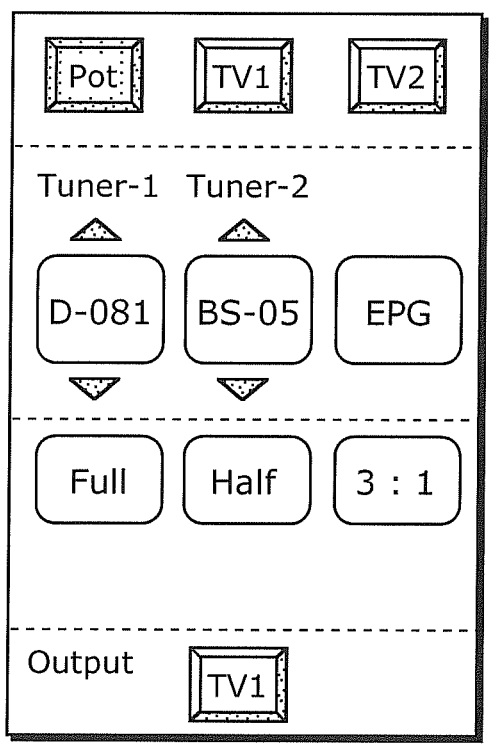
FIG. 15C is a diagram showing an example of display based on the information shown in FIG. 15B

FIG. 15C shows an example of the operation screen displayed on the display unit 103 after the data shown in FIG. 15B is received. After the attribute verification unit 108 analyzes the response data obtained via the communication unit 111, the display unit 103 is caused to display the operation screen.

In FIG. 15C, an area corresponding to the area 202 (Area-2) in FIG. 2A displays three function elements described in the obtained information, and displays the latest state as well (that is, settings for receiving D-081 and BS-05). Also, the buttons provided above and below the tuner icons indicate that the channel changes of the two tuners are available.

By pressing (or touching) these up and down buttons, the user can change the channels of the tuners. Also, in FIG. 15C, an area corresponding to the area 203 (Area-3) in FIG. 2A displays the split rates which can be designated. Moreover, in FIG. 15C, an area corresponding to the area 205 (Area-5) in FIG. 2A displays a device icon (only the TV1 in the present example) which is selectable as an eventual output destination (Output). An area corresponding to the area 205 (Area-5) in FIG. 2A is a reserved area.

FIG. 16A shows an example of data on the profile of "TV" in obtained from the second TV 401 (i.e., "TV2") which is the external device. As in the case of the information 1501 in FIG. 15B, information 1508 in FIG. 16A describes device information regarding "TV2". As can be seen from information 1509 to 1511, there are three elements as the functions or services provided by "TV2". Also, as can be seen from information 1512 to 1514, there are three elements as the processing commands that correspond to the functions or services provided by "TV2".

Figure 16B:
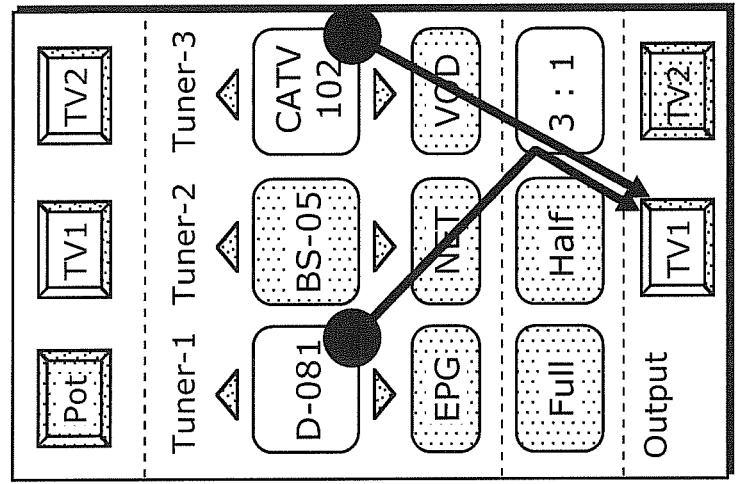
FIG. 16B is a diagram showing an example of display based on the information shown in FIG. 16A.
Figure 17:
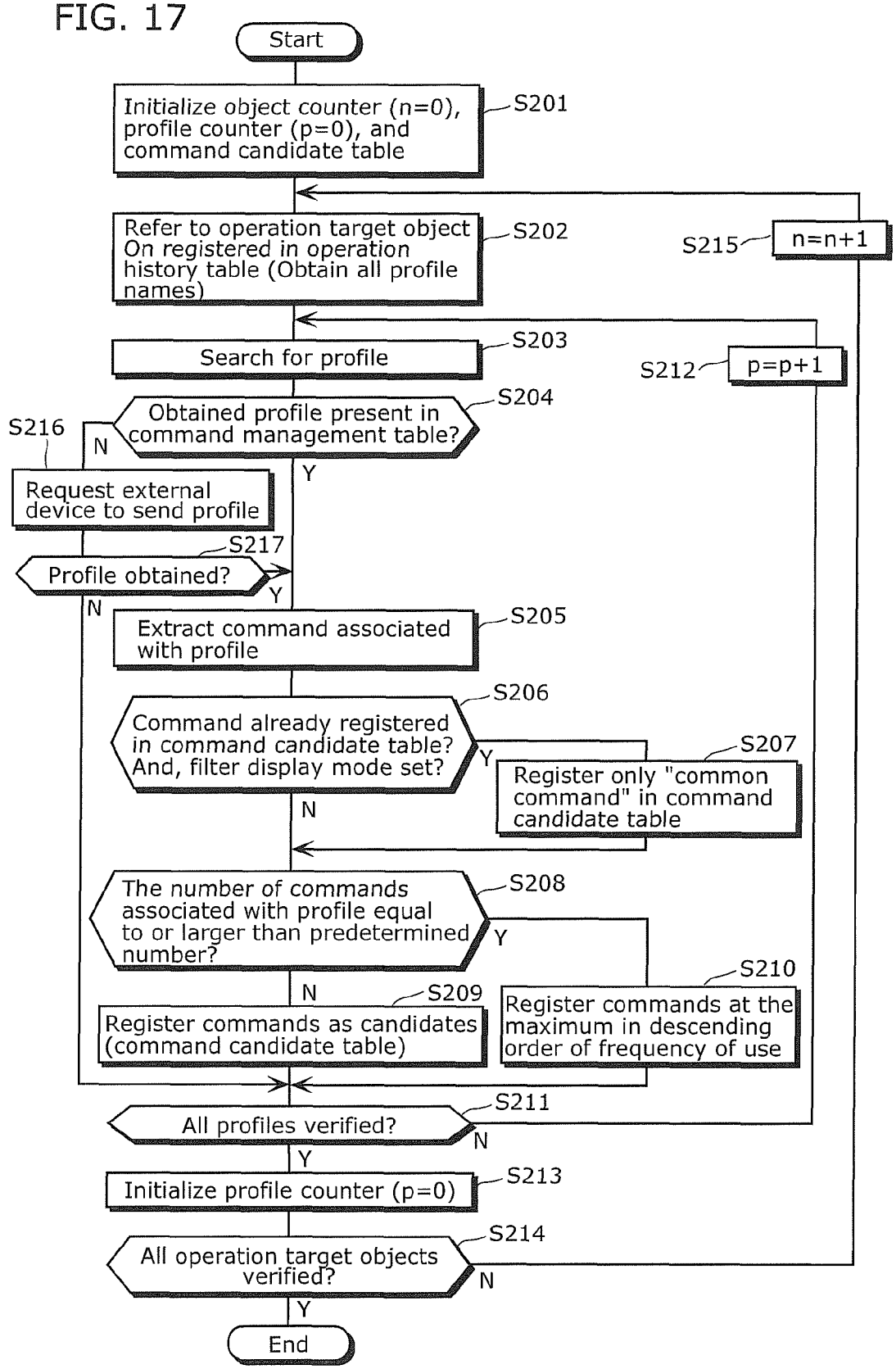
FIG. 17 is a flowchart showing an attribute verification process in the second embodiment.

FIG. 16B shows an example of the operation screen displayed on the display unit 103 after the data shown in FIG. 16A is received.

In FIG. 16B, an area corresponding to the area 202 (Area-2) in FIG. 2A displays a latest state of a tuner in the TV 2 for receiving CATV (that is, a setting for receiving CATV 102), in addition to the three function elements displayed in FIG. 15C. Also, in addition to the "EPG screen display button (EPG)" provided by the TV1, "Internet browser display button (NET)" and "Video-on-demand display button (VOD)" provided by the TV2 are displayed.

In FIG. 16B, an area corresponding to the area 203 (Area-3) in FIG. 2A displays the split rates available to the TV1 and TV2. Moreover, in FIG. 16B, an area corresponding to the area 205 (Area-5) in FIG. 2A, that is, the reserved area, additionally describes "TV2" as a device icon selectable as the eventual output destination.

Figure 16C:
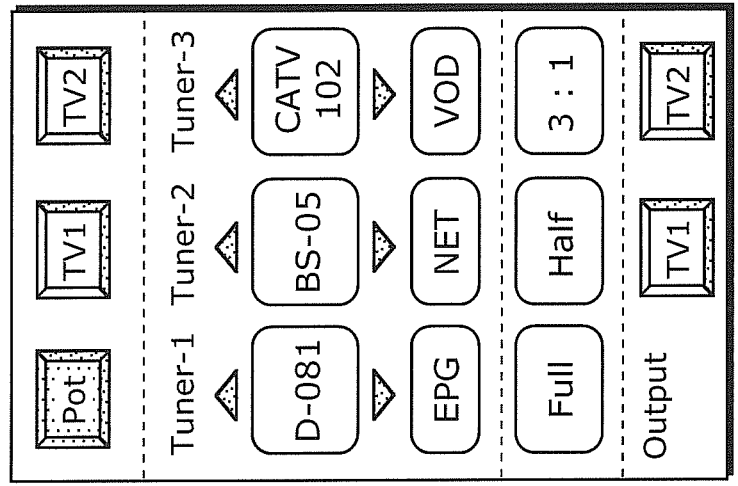
FIG. 16C is a diagram showing an example of an operation performed by the information processing device.

FIG. 16C shows that the operation target objects are selected, that the command is selected, and that the process is executed, on the operation screen. To be more specific, FIG. 16C shows a flow in which the user selects the input sources "D-081 (Tuner 1)" and "CATV 102 (Tuner 2)" desired to be displayed on the split screen using multi-touch, also selects the split rate (3:1) through a drag operation, and then designates the TV1 as the output destination. In this way, the external devices are processed as the operation target objects, and the functions or services provided by the external devices which in are the operation target objects are processed as the processing commands. This allows the external device to execute the processes through the same operation as in the first embodiment.

FIG. 18 is a diagram showing an example of the command is management table held by the command management unit 101 in the second embodiment. When the processing command information corresponding to the profile is obtained from the external device in S217 in FIG. 17, the command management unit 101 can extend the command management table by adding this processing command information to the command management table. FIG. 18 shows the command management table in which the profiles "AV", "TV", "PRV", and "Appliance" are added to the command management table shown in FIG. 9.

FIGS. 19A to 19F show that the operation target objects are selected, that the command is selected, and that the process is executed, on the operation screen. FIGS. 19A to 19F shows a flow in the case where a plurality of devices having different basic functions are selected as the operation target objects.

Figure 19C:
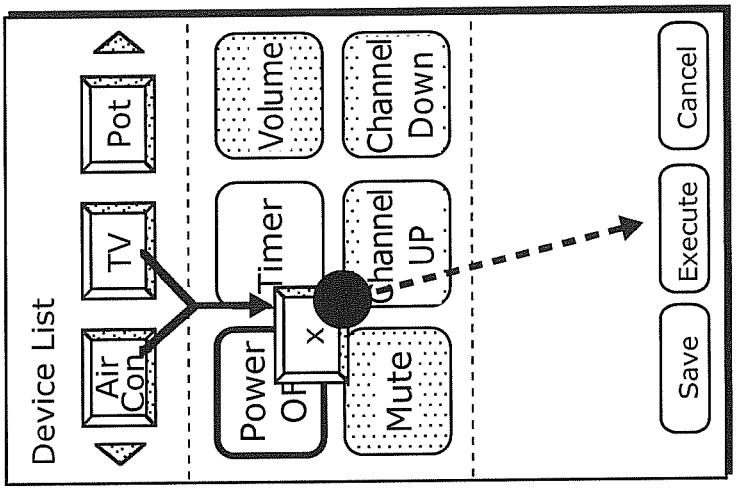
FIG. 19C is a diagram showing an example of generating an instruction for the plurality of operation target objects.
Figure 19B:
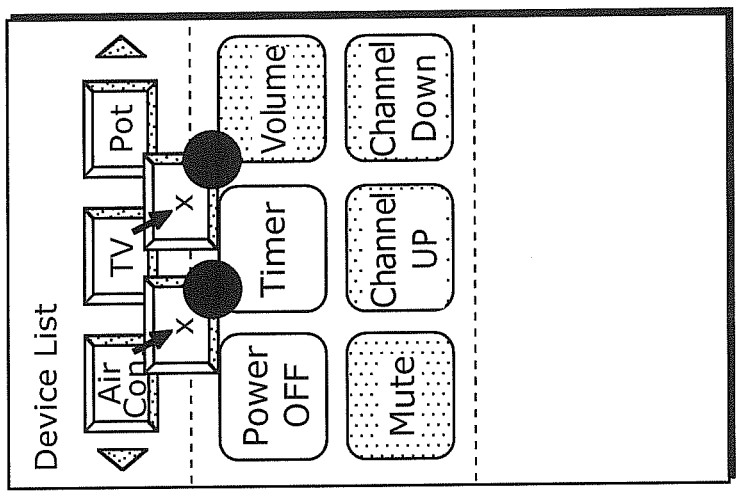
FIG. 19B is a diagram showing that commands which are executable on and common to the plurality of operation target objects are displayed.
Figure 19A:
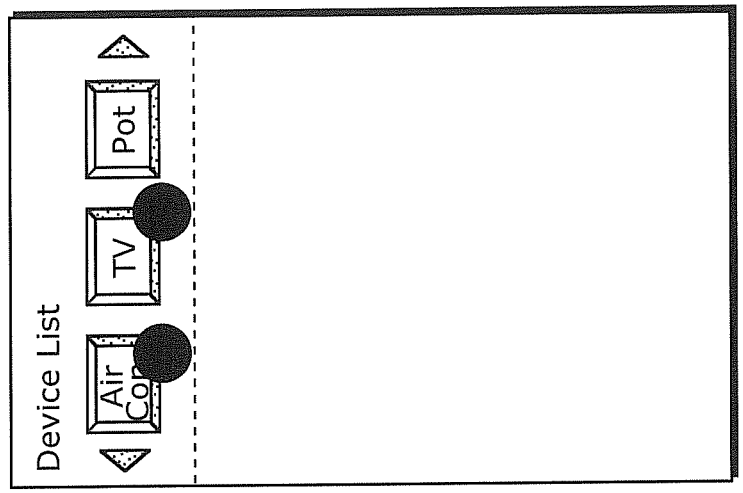
FIG. 19A is a diagram showing that a plurality of operation target objects are selected.

FIG. 19A shows a plurality of object icons in Device List. In the example shown in FIG. 19A, the air conditioner and the TV are being selected. The user makes such a selection when, for example, turning off the air conditioner and the TV before going out.

FIG. 19B shows that the user selects the device icons "Air Con." and "TV" using multi-touch and then drags these device icons beyond the boundary (L1) between the area 201 and the area 202 in FIG. 2A. As explained in the first embodiment, when the device icons representing the selected operation target objects, namely, the air conditioner (Profile: Appliance) and the TV (Profile: AV, TV), are dragged beyond the boundary, the command icons representing their functions are displayed.

In the present example, out of the functions of the air conditioner (Profile: Appliance) and the TV (Profile: AV, TV), the processing commands "Volume", "Mute", "Channel UP", and "Channel Down" which are not common to these operation target objects are deactivated (namely, grayed out).

FIG. 20 is a diagram showing an example of the command candidate table held by the command management unit 101. This command candidate table is created as follows. The attribute verification unit 108 extracts the processing commands for each of the profiles (i.e., AV, TV, and Appliance) with reference to the command management table (see FIG. 18) in the processes of S206 and S207 explained above. Then, the attribute verification unit 108 describes the extracted processing commands into the command candidate table (see FIG. 20) held by the command management unit 101.

A column indicated by "Com." in FIG. 20 shows the number of extraction times (appearance times) the processing command is extracted in the attribute verification process. This number of extraction times is incremented and held every time the same processing command is extracted. Also, this number is managed for each processing command. Here, "Power" and "Timer" represent the commands common to the air conditioner and the TV which are the operation target objects. Thus, each of their numbers of extraction times is "2", as shown in FIG. 20.

Since "Power" and "Timer" represent the commands which are executable on and common to the selected two devices, these commands are determined as common functions when a plurality of devices are selected using, for example, multi-touch. Accordingly, the attribute verification unit 108 activates, for display, the icons "Power" and "Timer" determined as the common functions executable on the selected operation target objects.

Here, in FIG. 19B, the activated command icon is displayed as "Power OFF" instead of "Power". This is realized through the following process using the table.

In the command management table shown in FIG. 18, the processing command "Power" is described for each of the profiles "AV" and "Appliance", and "Power Table" is designated as a reference table (see FIG. 20) associated with the processing command "Power". FIGS. 21A to 21K are diagrams showing examples of the command reference table held by the command management unit 101 in the second embodiment.

The command reference tables shown FIGS. 21A to 21G correspond to the command reference tables shown in FIGS. 10A to 10G, respectively. On the other hand, the command reference tables shown in FIGS. 21H to 21K are obtained from the external device.

FIG. 21H shows "Power Table" which is the reference table associated with "Power" shown in FIG. 19B. A column indicated by "State" in FIG. 21H describes a state of the operation target device. A column indicated by "Exec" describes a processing command that is to be executed, according to the description in "State". A column indicated by "Path" describes a URL required to request the execution of the processing command or a URL or the like required to obtain an image used for display.

Here, the state information of the operation-target air conditioner and TV is described in the reference table by using, for example, the power state tags (Power State) shown in the information 1501 in FIG. 15B. In FIG. 15B, the state information is described as "ON".

Thus, on the basis of the operating state of the operation target object and the description in the command reference table, the attribute verification unit 108 causes the command icon representing the processing command "Power" to be displayed as "Power OFF". In this way, according to the state of the operation target device, the command icons representing the inexecutable processing commands are not displayed, and only the command icons representing the executable processing commands are thus displayed. This can improve the efficiency of the user operation.

Moreover, since the unnecessary command icons can be prevented from being displayed, the command icons can be displayed without using a hierarchical structure. With this, as shown in FIG. 19C for example, the user can select a plurality of device icons using multi-touch or the like and easily implement the operation instruction to turn off the plurality of devices by a single drag operation.

Figure 19F:
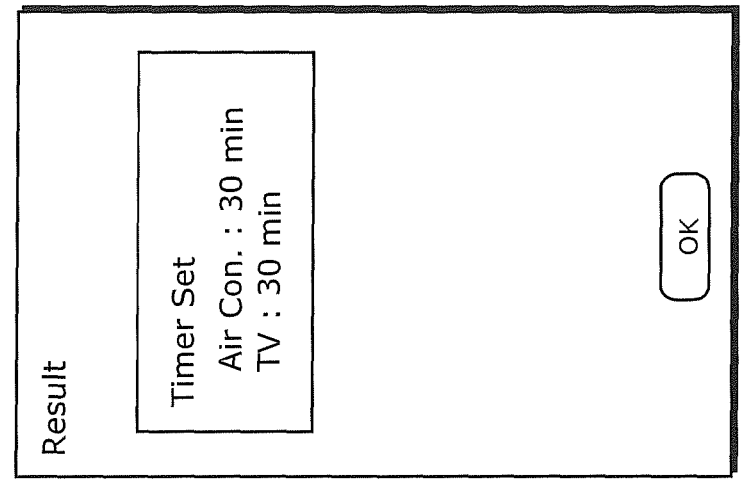
FIG. 19F is a diagram showing an example of a screen showing an execution result of the instruction.
Figure 19E:
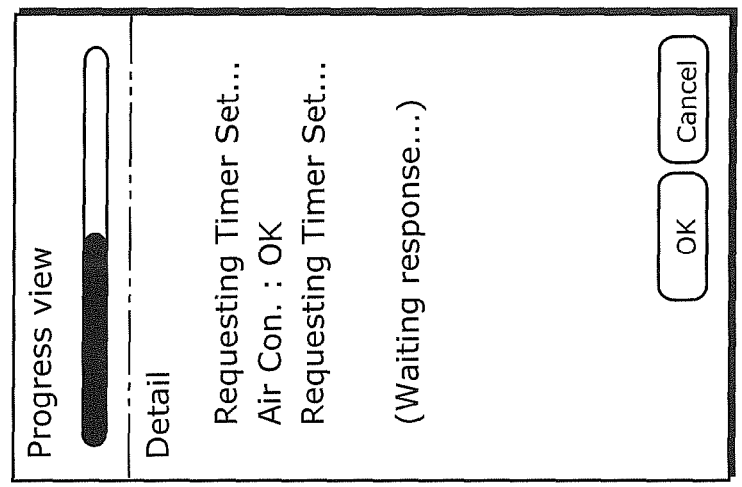
FIG. 19E is a diagram showing an example of a progress view screen.
Figure 19D:
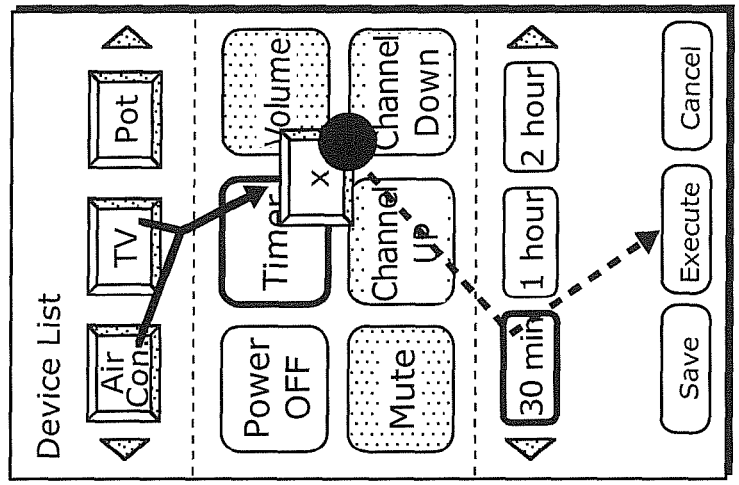
FIG. 19D is a diagram showing another example of generating an instruction for the plurality of operation target objects.

FIG. 19D shows a flow in which the drag operation performed on the plurality of devices is continued from the state shown in FIG. 19B. In the flow, the dragged icons cross the icon "Timer" which is a common processing command, and then cross the icon "30 min" that represents a parameter indicating "30 minutes later". Finally, the drag operation is ended on the execute instruction icon "Execute" at the end of the flow.

Note that, as the parameter icons in FIG. 19D, the properties in "Timer Set Table" shown in FIG. 21J are displayed when the icon "Timer" is selected, according to the layout information managed by the operation area management unit 109.

When the user performs the operation in accordance with the procedure shown in FIG. 19D, the instruction generation unit 115 requests the devices selected as the operation target objects to execute the common processing command registered in the operation history table (S120 in FIG. 7). Here, the instruction generation unit 115 requests the instruction execution unit (omitted in FIG. 14) to execute the command when the operation target device is its own device (that is, the information processing device 100A). On the other hand, when the operation target device is the external device, the instruction generation unit 115 requests the instruction execution unit of the external device, via the communication unit 111, to execute the command.

In the case where the progress view mode is set (Y in S124 in FIG. 7), the progress view screen as shown in FIG. 19E is displayed (S125 in FIG. 7). In FIG. 19E, in addition to a progress notification bar showing the overall progress, a result "Air Con.: OK" in response to the request made of the external device to execute the processing command "Timer Set" and a state of inquiry "(Waiting response)" are displayed as the detailed information of the processing, for example. Then, as shown in FIG. 19F, the execution results of the common processing command are displayed with the names of the external devices, on the operation screen.

Next, the process execution using the registered processing pattern is explained. The explanation is given in particular about a case, as an example, where detailed properties are set for a command execution time and for a command execution.

Figure 22A:
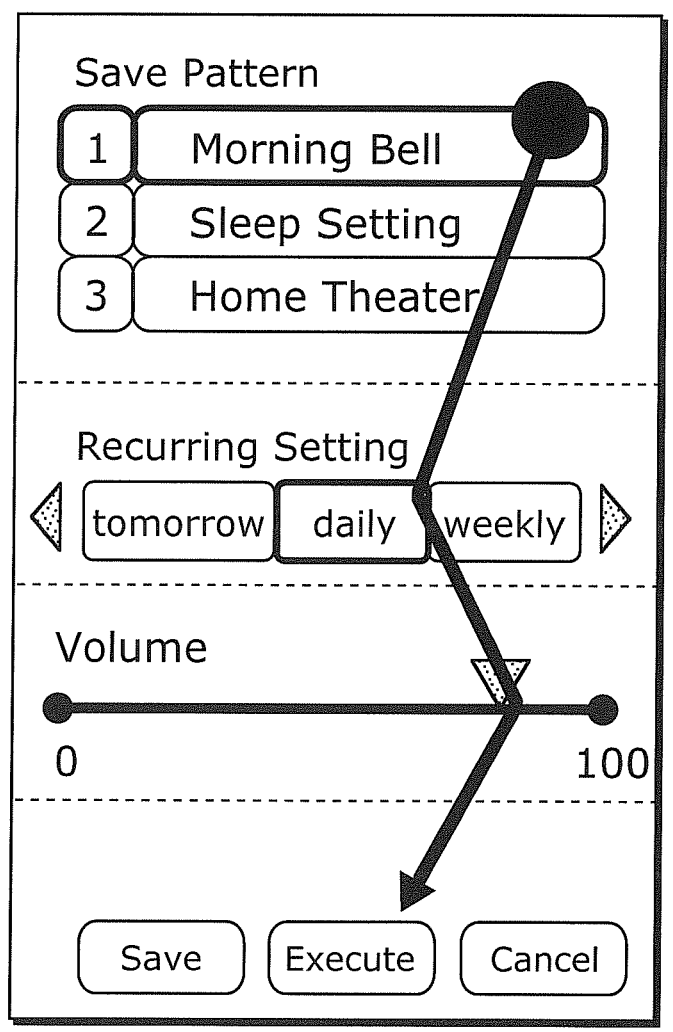
FIG. 22A is a diagram showing that a periodic execution of a registered processing pattern is instructed.

FIGS. 22A to 22C are diagrams explaining the process execution using the registered processing pattern. FIG. 22A shows an operating procedure in which the registered processing pattern is executed by designating the properties of this pattern.

To be more specific, the user selects a desired processing pattern (Morning Bell), as the operation target object, from the list of the registered processing patterns displayed in an area corresponding to the area 201 in FIG. 2A (Area-1), and starts the drag operation.

Then, by the drag operation, the selected object icon: crosses the command icon representing "Daily" in Recurring Setting displayed in an area corresponding to the area 202 in FIG. 2A (Area-2); crosses over a line at a desired volume level (in the present example, the desired volume level is 80) in Volume displayed in an area corresponding to the area 203 in FIG. 2A (Area-3); and then is released at the execute instruction icon "Execute".

FIG. 22B is a diagram showing a pattern management table before the execution is instructed. FIG. 22C is a diagram showing a pattern management table after the execution is instructed. As a result of the operation shown in FIG. 22A, the recurring setting is changed from "OFF" in FIG. 22B to "ON: Daily" in FIG. 22C. Also, the parameter of the command "Volume" for the operation target object "TV" is changed from "50" in FIG. 22B to "80" in FIG. 22C.

In this way, a command whose setting is to be changed is also included as the command associated with the processing pattern, so that the registered processing pattern including a plurality of commands that has been once registered can be changed or modified. Here, the processing pattern can be changed or modified through a drag operation of the user.

It should be noted that, in FIGS. 22B and 22C, the operation target object with the ID 5 is abstracted by the description of "–". This means that the present command is a processing command commonly set to all the objects with the IDs 1 to 4. More specifically, the processing command with the ID 5 shown in FIGS. 22B and 22C is a request made of the three devices, namely, the TV, the air conditioner, and the pot, to turn on their power all together at 7:30 a.m.

According to the second embodiment as described thus far, at least one of the plurality of operation target objects is an external device of the information processing device 100A. The information processing device 100A has the communication unit 111 which communicates with the external device. When the external device is selected as the operation target object, the attribute verification unit 108 sends, via the communication unit 111, a message requesting the selected external device to send the corresponding processing command.

With this, the external device can be processed as is the case with the operation objects (contents) held by the information processing device 100A.

When the processing sequence data includes the identification information of the processing command to be executed by the external device, the instruction generation unit 115 sends this identification information to the external device via the communication unit 111.

Third Embodiment

Figure 23:
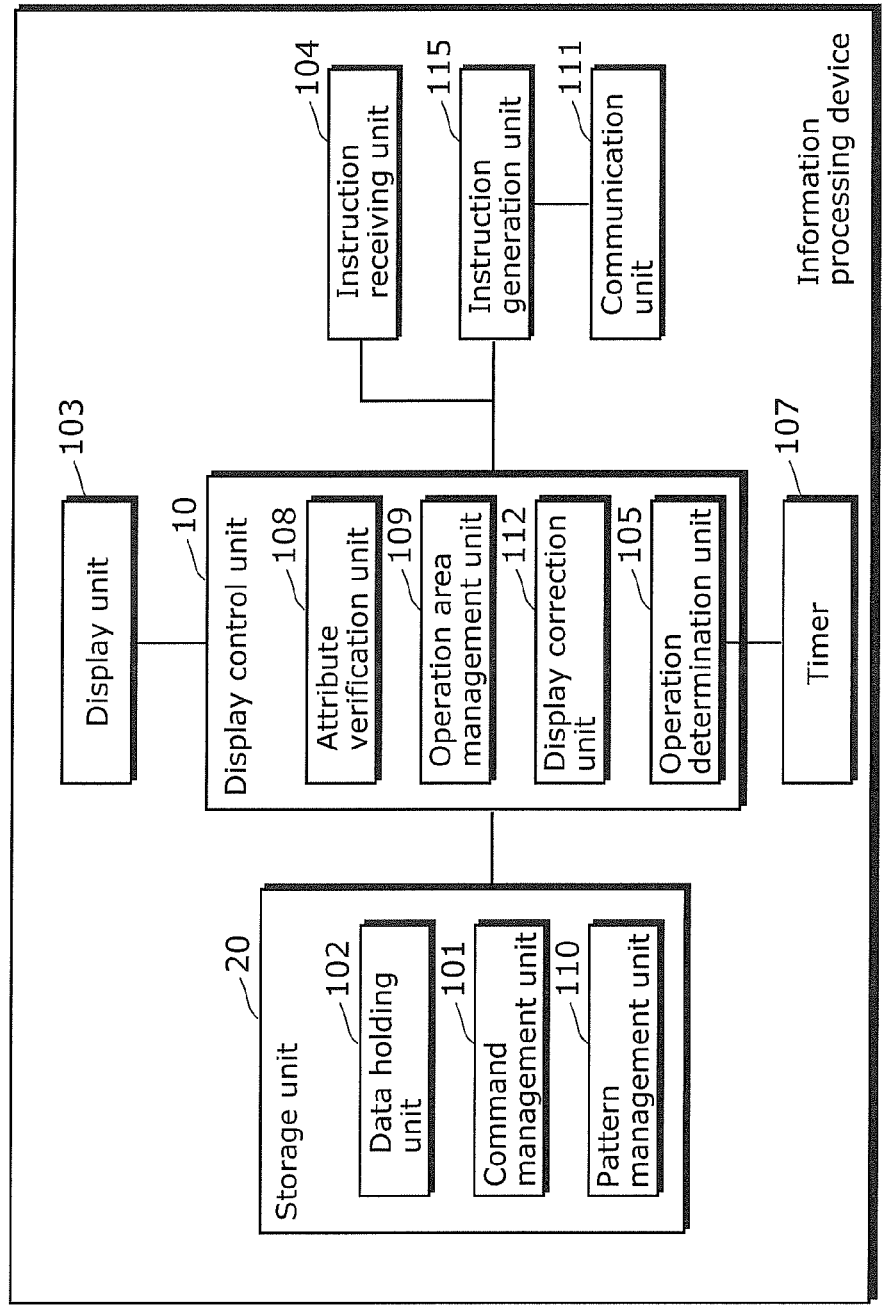
FIG. 23 is a block diagram showing an information processing device in a third embodiment of the present invention.

FIG. 23 is a block diagram showing a configuration of an information processing device 100B in the third embodiment of the present invention. In FIG. 23, the information processing device 100B includes a display correction unit 112 in addition to the components included in the information processing device 100A shown in FIG. 14. The configuration in the present embodiment is based on the premise that the external devices are processed as the operation target objects as described in the second embodiment. However, the configuration is not limited to this, and may be based on the premise that the communication unit 111 described in the first embodiment is not included.

The display correction unit 112 corrects displayed details according to an area which has yet to be used for displaying the operation target objects, the processing commands, or the like on the display screen (namely, this area is blank). To be more specific, the display correction unit 112 corrects spaces between a plurality of icons displayed on the display unit 103, according to the size of an area that remains unused for displaying icons on the display unit 103.

FIGS. 24A to 24D are diagrams explaining a process of correcting the displayed details according to a blank space on the display screen. FIG. 25 is a flowchart showing a displayed-detail correction process. With this flowchart, the displaying process performed in S111 in FIG. 7 is modified.

In the present example, the explanation is given based on the following premise. That is, the information processing device 100B can display icons representing external devices, namely, a hard disk recorder (PVR), a television (TV), and an electric pot (Pot), which are connected via a network 250.

Also, the explanation is based on the following premise. The user captures a recipe from a cooking program currently being shown on the TV as a snapshot (here, suppose that the TV is in a dual screen mode, and that the recipe is displayed on the left-hand screen (Tuner 1) out of the two screens). Then, when sending an email message with the captured image attached, the user resizes the image to QCIF size and selects "User C" as a destination.

Figure 24A:
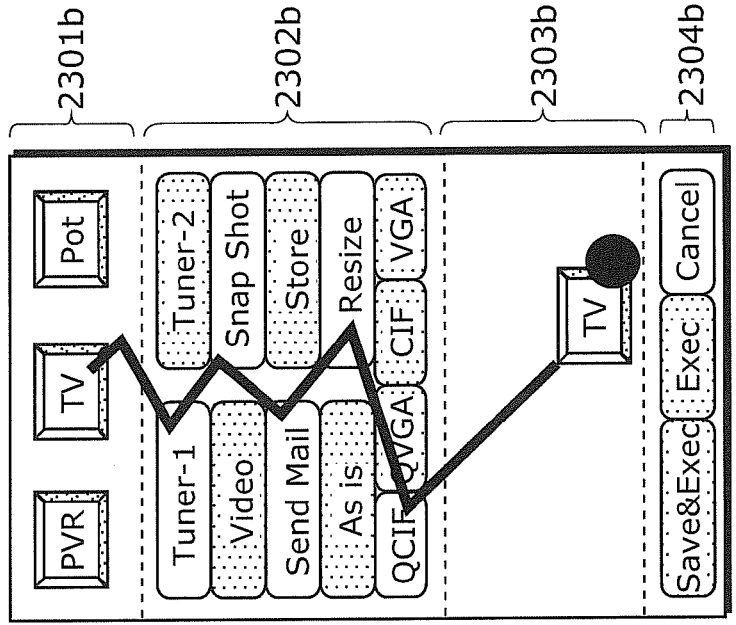
FIG. 24A is a diagram showing an example of display in the case where a display correction level is "0".
Figure 25:
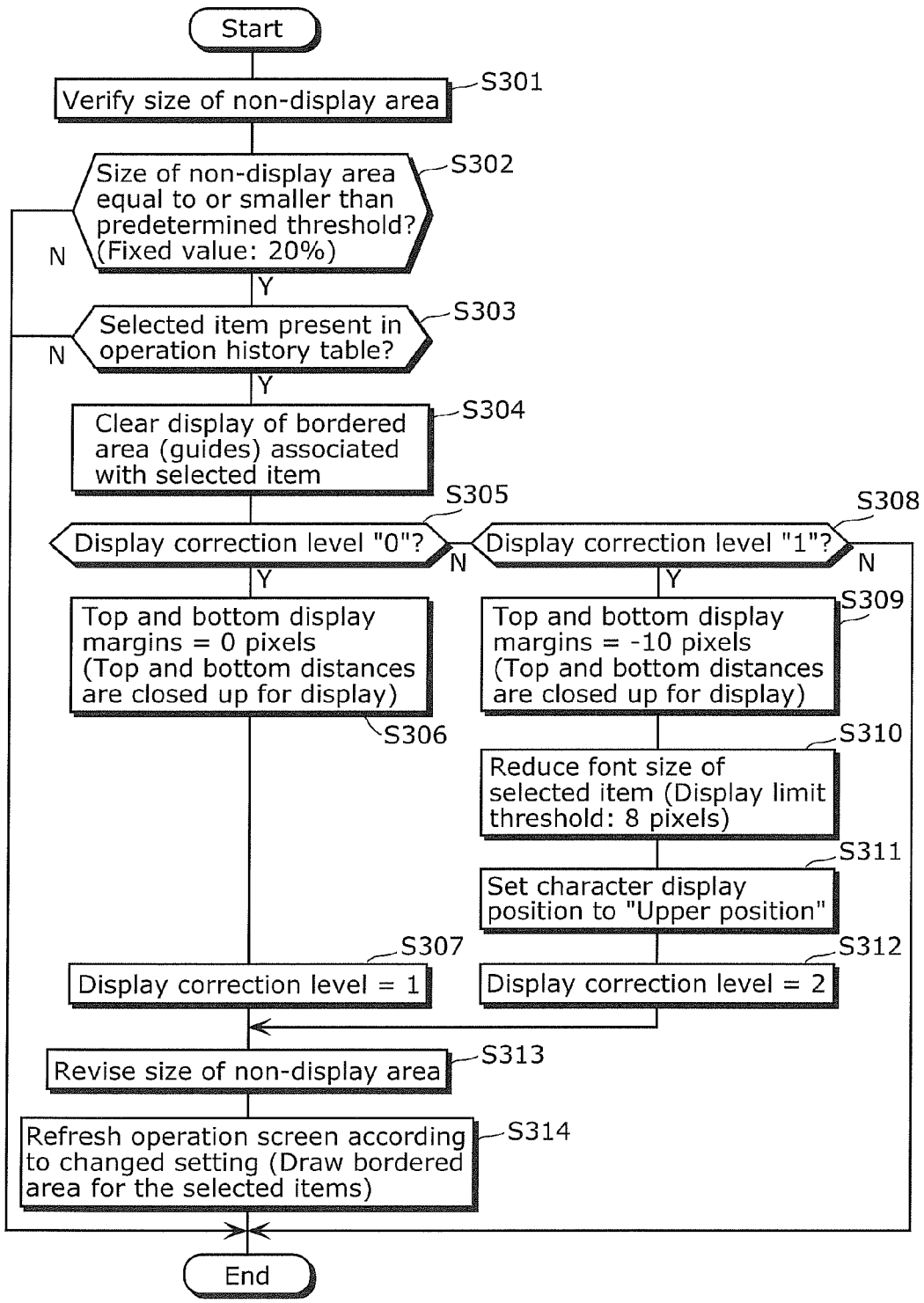
FIG. 25 is a flowchart showing a displayed-detail correction process.

The display control unit 10 causes the display unit 103 to display an operation screen as shown in the top portion of FIG. 24A. An area 2301a in FIG. 24A displays a list (Device List) of device icons which represent the operation target devices. An area 2302a displays a list (Functions) of icons which represent processing commands and parameters. An area 2303a is an area unused for displaying (Blank). An area 2304a is a reserved area (Reserved).

A table shown in the bottom portion of FIG. 24A shows an occupation rate (Occupation) and a compression availability flag (Compressible) for each display area. Here, the occupation rate refers to a level of occupancy for each area in the entire screen. The compression availability flag indicates whether the display correction is possible or impossible (true: possible, false: impossible). A number appended to the compression availability flag indicates a display correction level (in the present example, values 0 to 2) managed by the display correction unit 112.

The following is a description about the process of correcting the displayed details, with reference to FIGS. 24A to 24D and 25.

The display correction unit 112 corrects each size of the display areas currently being displayed on the display unit 103 while the instruction receiving unit 104 is receiving an operation instruction from the user, so as to enhance ease-of-use for the user. The display correction unit 112 monitors the aforementioned occupation rate for each display area, and verifies the current size of the area unused for displaying (S301). This verification is performed when, for example, the user selects a command from the command area.

For example, when the user selects a detailed property (QCIF) of Resize for the image as shown in FIG. 24A, the occupation rate of the area unused for displaying (i.e., the aforementioned blank area) is 8% of the entire screen.

Here, the display correction unit 112 determines whether the current occupation rate of the area unused for displaying is equal to or smaller than a predetermined threshold (in the present example, 20% as a fixed value) (S302). When the occupation rate is larger than the threshold (N in S302), the display correction unit 112 terminates the displayed-detail correction process.

On the other hand, when the occupation rate is equal to or smaller than the threshold (Y in S302), the display correction unit 112 determines whether a selected item (i.e., a part visible to the user that is displayed in the processing command area or the subcommand area) exists in the operation history table (S303). When the selected item does not exist (N in S303), the display correction unit 112 terminates the displayed-detail correction process. On the other hand, when the selected item exists (Y in S303), the display correction unit 112 clears the display of the bordered area (with guides indicated by dotted lines in FIG. 24A) that corresponds to the area 2302a (Functions) including the selected item (S304).

Moreover, when the display correction level of the area that corresponds to the area 2302a (Functions) is "0" (Y in S305), the display correction unit 112 sets each display margin above and below is the command icons or parameter icons at "0 (pixel)" (S306).

Then, the display correction unit 112 changes the display correction level of the display-corrected area 2302a to "1" (S307), revises the size and occupation rate of the area unused for displaying (S313), and then refreshes the operation screen according to the changed setting (S314). As a result of this, an area 2302b shows the compressed representation of the area for the selected items.

Figure 24B:
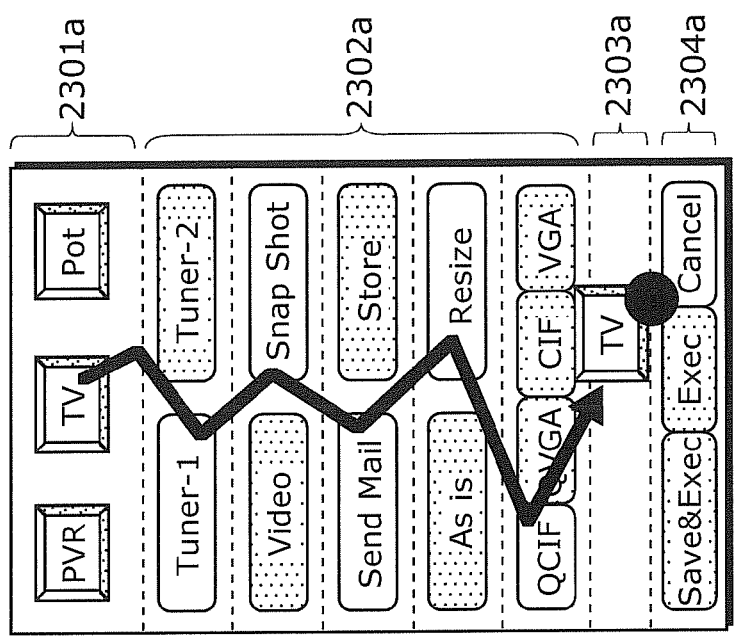
FIG. 24B is a diagram showing an example of display in the case where the display correction level is "1".

To be more specific, as shown in the top portion of FIG. 24B, a changed display screen shows that separation distances above and below the processing commands are closed up. Accordingly, as shown in the bottom portion of FIG. 24B, the occupation rate of the area 2303b as the area unused for displaying becomes 30%, meaning that an area for displaying next command icons is secured. As a result, command icons or parameter icons can be displayed in a new area 2303c in an easy-to-see manner for the user.

On the other hand, when the display correction level is not "0" (N in S305), the display correction unit 112 determines whether the display correction level is "1" (S308). When the display correction level is not "1" (N in S308), the display correction unit 112 determines that the display correction is impossible and thus terminates the displayed-detail correction process.

Figure 24D:
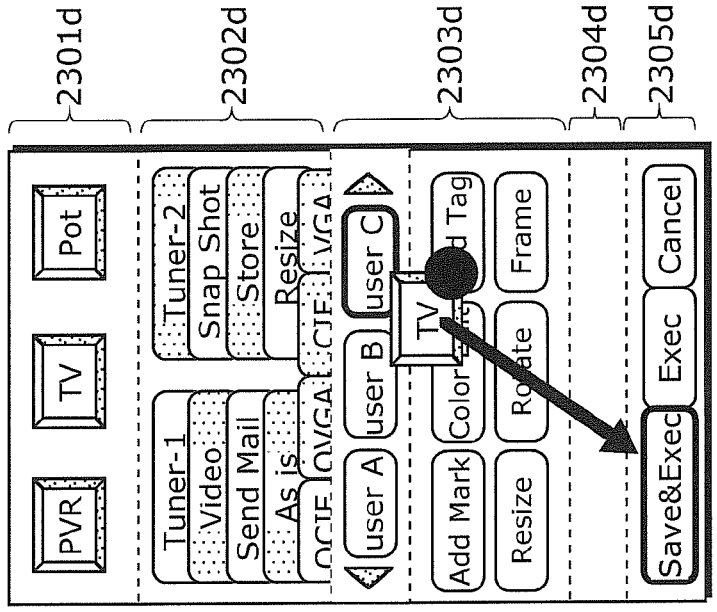
FIG. 24D is a diagram showing an example of display in the case where the display correction level is "2".
Figure 24C:
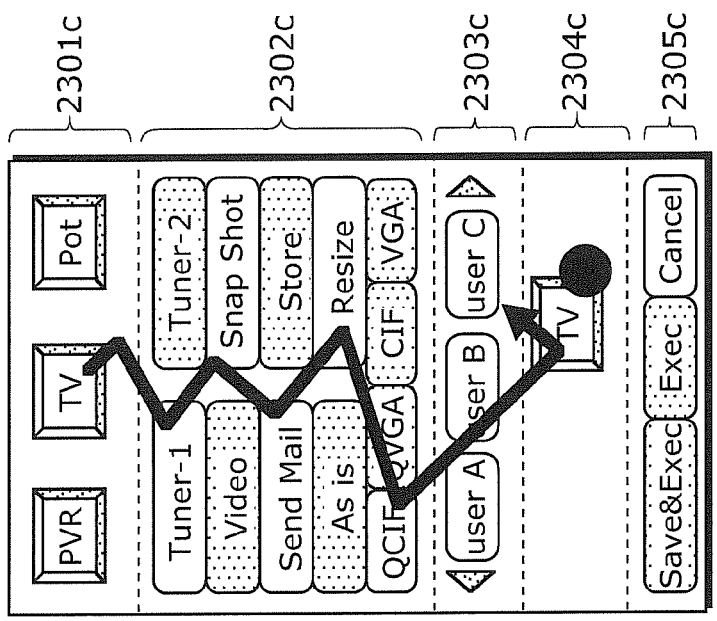
FIG. 24C is a diagram showing an example of display in the case where new display items are added to the display shown in FIG. 24B.

The top portion of FIG. 24C shows the screen on which parameter icons are displayed in the new area 2303c in order for the user to select a destination of the email message. On the screen shown in the top portion of FIG. 24C, the user can continue to select the item by further dragging the device icon, which is currently being dragged, to a parameter icon "User C".

Here, the occupation rate (18% in the present example) of an area-unused-for-displaying 2304c in FIG. 24C is below the verification threshold (20% as the fixed value in the present example) (N in S302). For this reason, the displayed-detail correction process is performed again. Here, the current display correction level of the area 2302c (Functions) is "1". Therefore, with the display correction level of "1" (N in S305 and Y in S308), subsequent processes are performed.

For example, the display correction unit 112 sets each display margin above and below the command icons or parameter icons at "−10 (pixels)" (S309). As a result, as shown in the top portion of FIG. 24D, the display screen is changed such that the separation distances above and below the icons are further closed up and that the icons partially overlap one another. Moreover, the display correction unit 112 reduces the font size of the character string displayed in each selected items (to 8 pixels, in the present example) (S310), and changes the display position of the character string from "Center position" to "Upper position" (S311).

Then, the display correction unit 112 changes the display correction level of the display-corrected area 2302c to "2" (S312) and performs the above-described processes from S313. As a result, an area 2302d of FIG. 24D shows a more compressed representation of the area for the selected items than the area 2302c. Therefore, the occupation rate of an area for displaying next selection-target icons (that is, an area shown by the areas 2303d and 2304d) can be increased. Also, the icons of this area can be displayed in an easy-to-see manner for the user.

According to the third embodiment described thus far, when new icons are displayed, the display correction unit 112 of the information processing device 100B corrects the display form of the icons currently being displayed to a compressed form, according to the size of the area that remains unused for displaying on the display screen.

With this, even on a narrow screen, a menu from which a next selection is to be made by a drag operation can be displayed. Thus, the drag operation can be performed continuously, thereby improving the operability.

The compressed form refers to a form in which the displayed icons are reduced in size or a form in which the displayed icons partially overlap one another.

Fourth Embodiment

Figure 26:
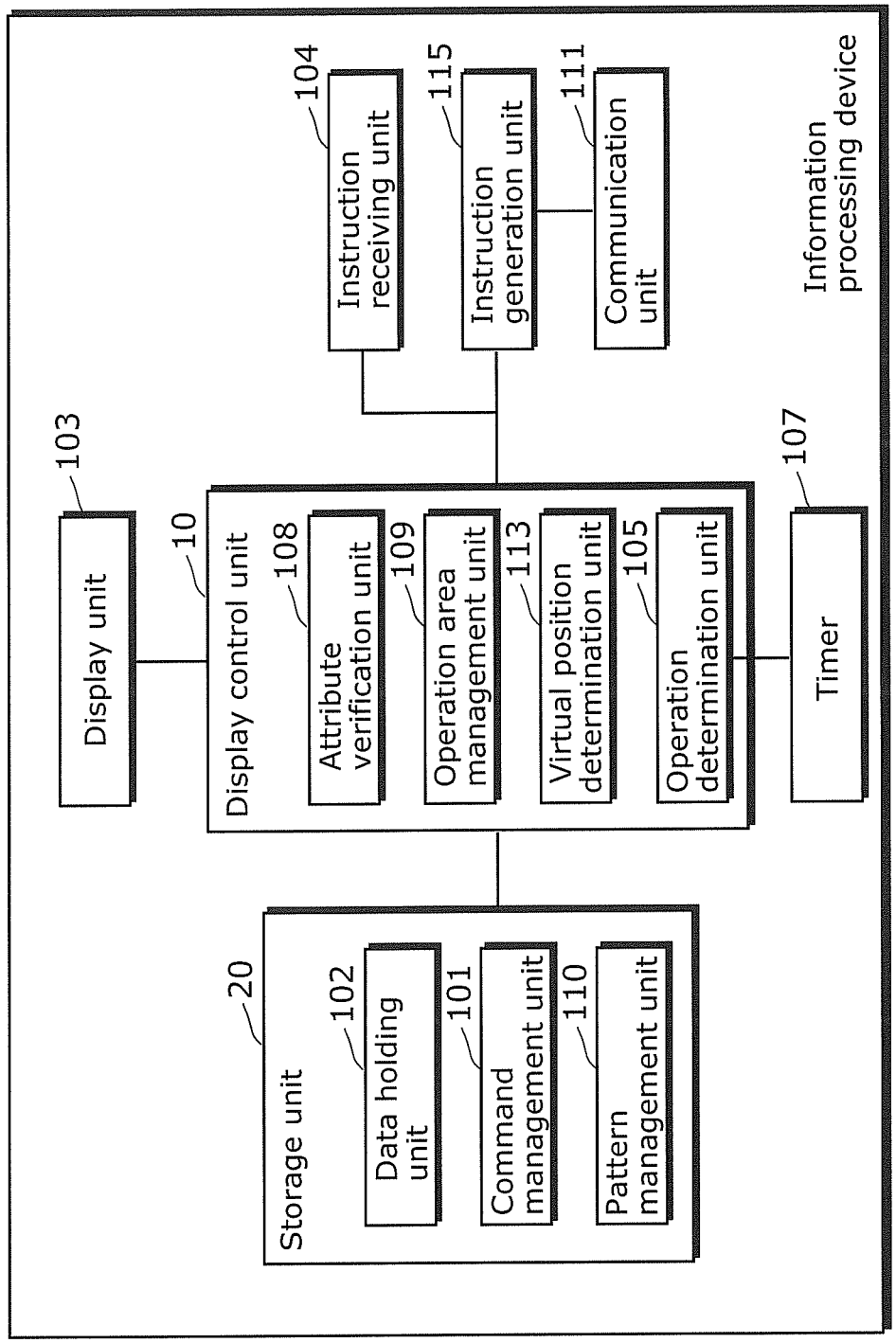
FIG. 26 is a block diagram showing an information processing device in a fourth embodiment of the present invention.

FIG. 26 is a block diagram showing a configuration of an information processing device 100C in the fourth embodiment of the present invention. In FIG. 26, the information processing device 100C includes a virtual position determination unit 113 in addition to the components included in the information processing device 100A shown in FIG. 14.

The virtual position determination unit 113 allows an operation to be performed on an external device by imitating a display screen of the external device on the operation screen. To be more specific, the virtual position determination unit 113 receives display layout information indicating details displayed on the display screen of the external device from this operation target object via the communication unit 111. Then, the virtual position determination unit 113 causes the display details indicated by the received display layout information to be displayed on a virtual screen in a virtual screen display area which is different from the first, second, and third display areas of the display unit 103.

When the selected object icon is released inside the virtual screen, for example, the virtual position determination unit 113 detects this release position on the virtual screen. Also, the virtual position determination unit 113 converts release position information corresponding to the virtual screen into position information corresponding to the display screen of the external device. Although the above explanation is based on the premise that the object icon is dragged, the present invention is not limited to this. When a specific position on the virtual screen is selected with a click for example, the selected position on the virtual screen may be detected and also information about this selected position on the virtual screen may be converted into information about a position on the display screen of the external device. The same is applied to a fifth embodiment described later.

FIGS. 27A to 27D are diagrams explaining a process executed using the virtual screen display area. In the present example, the explanation is given based on the premise that the following processing is performed. That is, the information processing device 100C which is a mobile terminal designates a television (TV), as the operation target device, that is an external device connected via the network 250.

Also, the explanation is based on the following premise. The user selects an image (such as a family photograph) saved in the mobile terminal close at hand and has the selected image displayed on an arbitrary position on a screen of the TV. In doing so, the user adds, to the selected image, a message made up of a character string visible to other users (such as "Enjoy!") and designates an expiration period (a month, for example) after which the display of the image and added message is canceled.

FIG. 27A shows structural information of the virtual screen. FIG. 27B shows an example of the structure of the operation screen. For example, the size of a presentation area (Full Screen) of the screen included in the information processing device 100C (Source Device) is 320 pixels in width and 480 pixels in height. Also, X and Y coordinates represented as (0, 0) on coordinate axes X and Y of the screen is a starting point of the presentation area.

To be more specific, an area 2600 in FIG. 27B corresponds to the presentation area. On the other hand, the size of the virtual screen of the operation target device managed by the information processing device 100C is 320 pixels in width and 180 pixels in height. Also, X and Y coordinates represented as (0, 300) on coordinate axes X and Y of the screen is a starting point of the virtual screen display area. More specifically, an area 2604 (Area-4) in FIG. 27B corresponds to the virtual screen display area.

Moreover, the size of a presentation area (Full Screen) of the screen actually included in the operation target device (Target Device) is 960 pixels in width and 540 pixels in height. Also, X and Y coordinates represented as (0, 0) on coordinate axes X and Y of the screen is a starting point of this presentation area.

The structural information (i.e., the display layout information) of the virtual screen shown in FIG. 27A describes a scaling rate (in the present example, Rate is 33%) of the virtual screen display area with respect to the presentation area of the operation target device. It should be noted that the screen size and the like of the operation-target external device (TV) can be obtained according to a standard protocol or a unique protocol, via the communication unit 111.

Figure 27C:
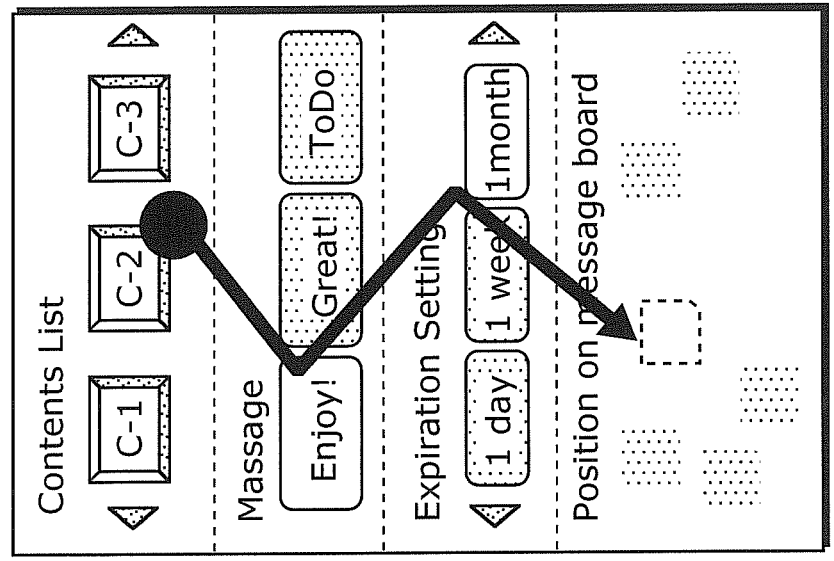
FIG. 27C is a diagram showing an example of an operation performed using a virtual screen.
Figure 27B:
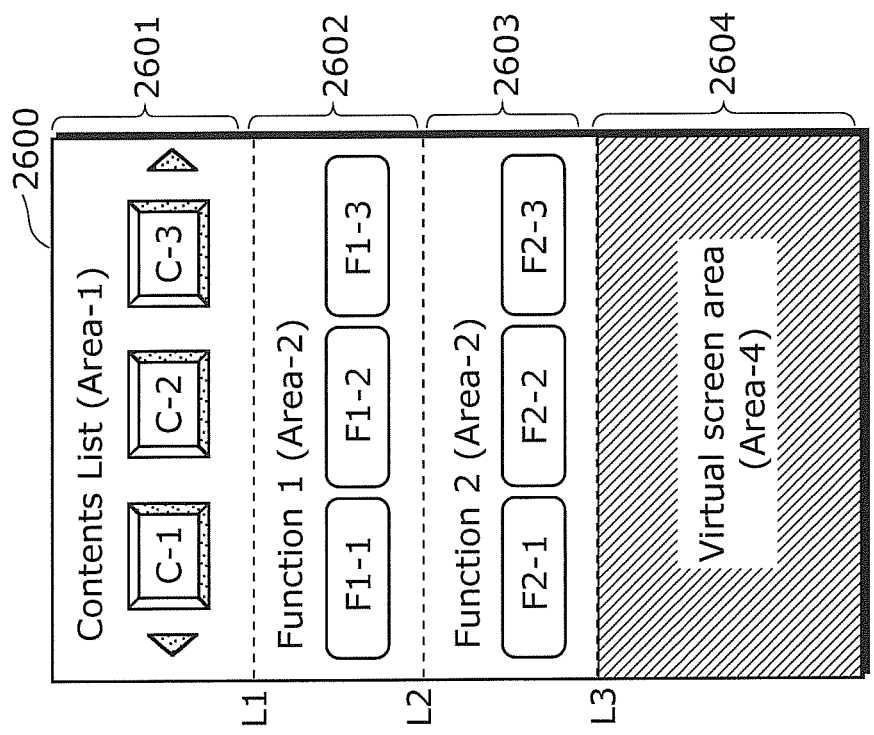
FIG. 27B is a diagram showing an example of display that includes the virtual screen display area.

FIG. 27C is a diagram showing an example of the operation screen. The user selects a desired content (an image in the present example) as the operation target object from a contents list displayed in an area 2601 (Area-1).

Then, by the drag operation, the selected object icon: crosses the message icon ("Enjoy!" in the present example) desired by the user from the message list displayed in an area 2602 (Area-2); crosses an icon representing the expiration period ("1 month" in the present example) desired by the user from properties of the display expiration periods displayed in an area 2603 (Area-3); and is finally released at an arbitrary position in the virtual screen display area (called "Position on message board") of the operation target device, the virtual screen display area being considered as the execute instruction icon.

Here, the instruction receiving unit 104 of the information processing device 100C obtains drag-operation-end coordinates (104, 368) at which the drag operation is ended in the virtual screen display area. Then, the instruction receiving unit 104 sends information regarding the drag-operation-end coordinates together with the instruction for the drag operation, to the operation determination unit 105. The operation determination unit 105 determines that the drag operation is ended on the execute instruction icon (S120 in FIG. 7).

The virtual position determination unit 113 connected to the operation determination unit 105 adjusts the information regarding the coordinates in the virtual screen display area that are obtained at the end of the drag operation, according to the display position or scaling rate of the virtual screen. Then, the virtual position determination unit 113 sends the adjusted coordinate information to the operation determination unit 105. In this coordinate information adjustment process, since the Y coordinate of the starting point in the virtual screen display area is 300, 300 is subtracted from the drag-operation-end coordinate in the direction of the Y-axis. Moreover, in this adjustment process, the coordinates are converted according to the scaling rate.

Accordingly, as the coordinate information after the adjustment process, the coordinates (312, 204) to be used eventually on the screen of the operation target device are obtained. The operation determination unit 105 sends the pre-adjustment coordinate information and the post-adjustment coordinate information, to the instruction generation unit 115. Then, the instruction generation unit 115 sends an operation instruction message with the post-adjustment coordinate information attached, to the operation target device via the communication unit 111.

Figure 27D:
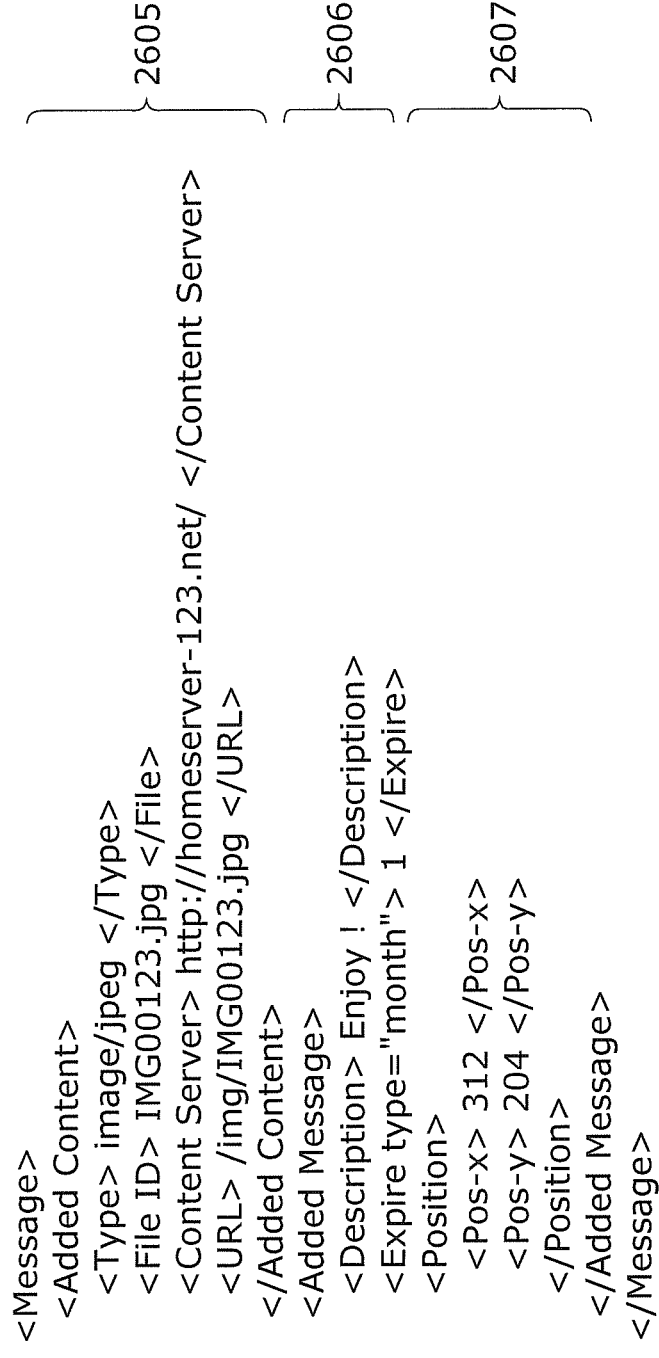
FIG. 27D is a diagram showing an example of an operation instruction message.

FIG. 27D is a diagram showing an example of a structure of the operation instruction message. FIG. 27D shows, as an example, the operation instruction message to be sent to the external device (TV) which is the operation target device. In order to open the image held in the information processing device 100C to the public using a server function, information 2605 describes an instruction to add the present image to the operation target device.

Information 2606 and information 2607 describe additional information regarding the added image. To be more specific, in the information 2606, the message "Enjoy!" selected on the operation screen is designated between text tags (Description). Moreover, in the information 2606, information indicating the display expiration period "1 month" also selected on the operation screen is designated between display expiration tags (Expire).

In the information 2607, the coordinates (312, 204) calculated by the virtual position determination unit 113 for the operation target device are designated between display position tags (Position). When receiving this operation instruction message, the operation target device obtains the image according to the operation instruction and displays the image with the designated message. Also, the operation target device clears the display according to the designated display expiration period.

FIG. 27C shows an example where other contents (such as an image, a memo, a link to Internet video) currently set to be displayed on the screen of the operation target device are displayed in the area 2604, that is, the virtual screen display area. Note that the display positions of these contents are obtained according to an arbitrary protocol determined between the operation target device and the information processing device 100C.

With the display like this, the positions of the contents currently being displayed can be recognized. Therefore, an operation mistake, such as overlaying new contents on the already-displayed contents and thus hiding these already-displayed contents, can be avoided.

According to the fourth embodiment described thus far, the virtual position determination unit 113 of the information processing device 100C displays, within the operation screen, the virtual screen that corresponds to the display screen of the external device. When the selected object icon is released inside the virtual screen display area, the virtual position determination unit 113 detects the release position on the virtual screen and also converts the release position information corresponding to the virtual screen into the position information corresponding to the display screen of the external device. Moreover, the virtual position determination unit 113 sends the position information together with the identification information of the processing command to be executed by the external device.

With this, a process to be executed by the external device connected via the network, such as pasting memo information on the display screen of the external device, can be designated on the display unit 103 of the information processing device 100C close at hand. Also, a position at which this designated process is to be executed on the display screen of the external device can be designated.

Fifth Embodiment

Figure 28:
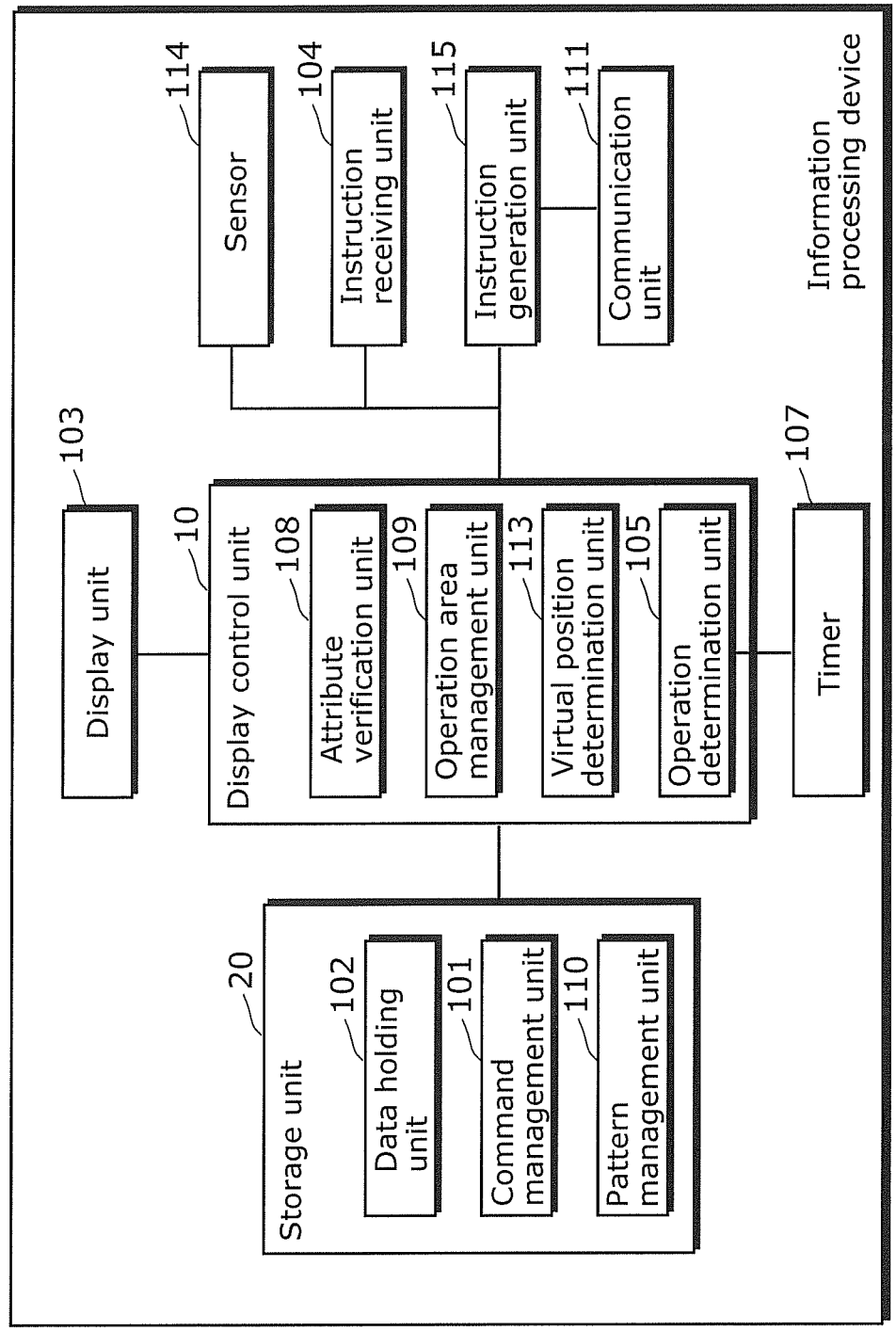
FIG. 28 is a block diagram showing an information processing device in a fifth embodiment of the present invention.

FIG. 28 is a block diagram showing a configuration of an information processing device 100D in the fifth embodiment of the present invention. In FIG. 28, the information processing device 100D includes a sensor 114 in addition to the components included in the information processing device 100C shown in FIG. 26.

The sensor 114 detects held-state information that indicates a state (typically, the orientation of the display unit 103) of how the information processing device 100D is currently being held. The sensor 114 sends the detected held-state information to the display control unit 10. The sensor 114 may send the held-state information in response to a request from the display control unit 10, or may automatically send the held-state information whenever detecting a change in the orientation of the information processing device 100D. Receiving the held-state information, the display control unit 10 changes the display positions (namely, the layout) of the icons displayed on the display unit 103, according to the orientation of the display unit 103.

FIGS. 29A to 29E are diagrams explaining a process of making a change to the operation screen according to the held-state information. In the present example, the explanation is given based on the premise that the following processing is performed. That is, the information processing device 100D which is a mobile terminal designates a television (TV), as the operation target device, that is an external device connected via the network 250.

Also, the explanation is based on the following premise. The user selects a desired image from a plurality of images displayed on the TV which is the external device. Then, using the information processing device 100D at hand, the user adds a message ("Great!") to the selected image and sets the display expiration period ("1 month"). After this, the user re-pastes the image at an arbitrary position on the display screen of the TV.

Figure 29C:
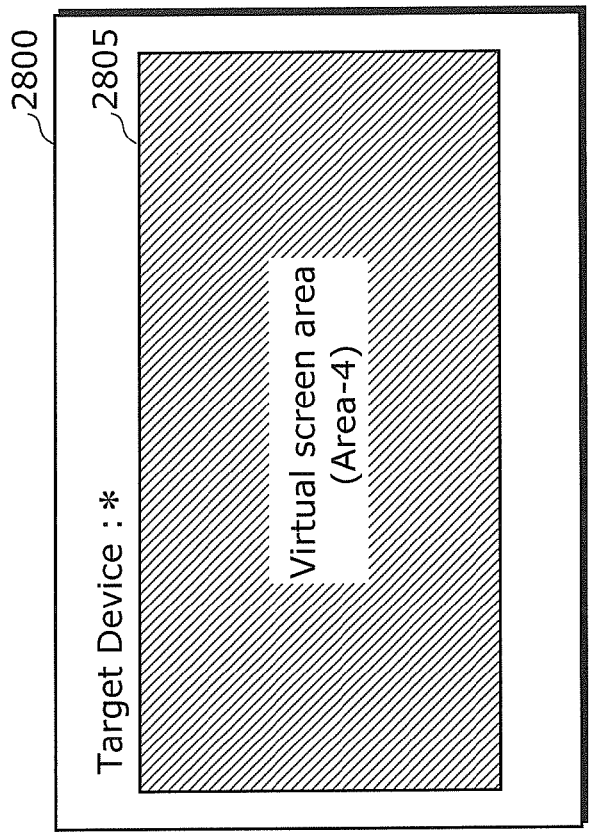
FIG. 29C is a diagram showing an example of a virtual screen displayed on the display unit which is horizontally oriented.
Figure 29B:
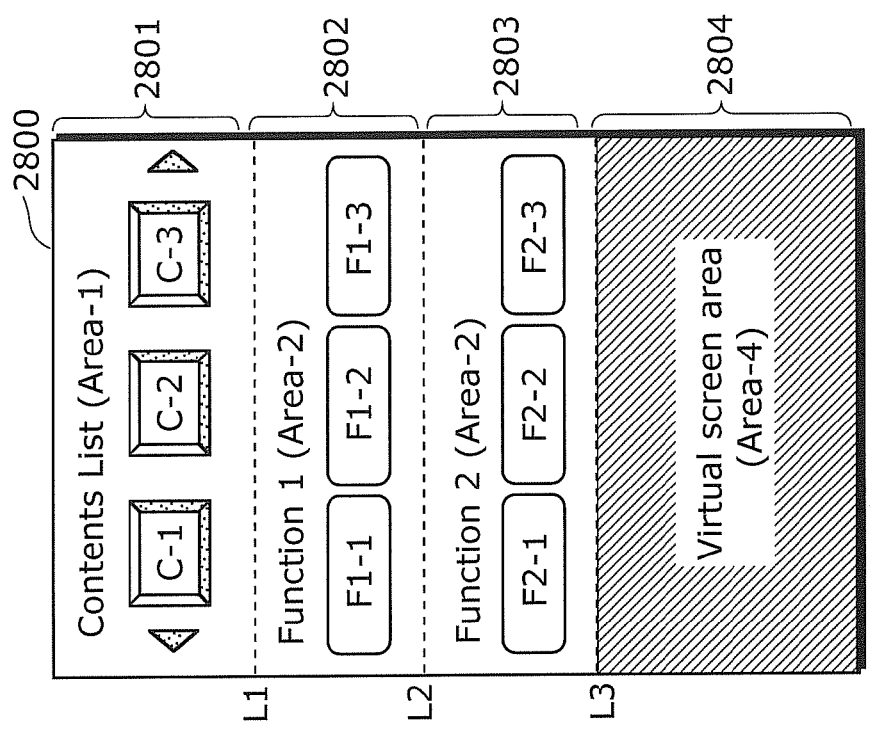
FIG. 29B is a diagram showing an example of a virtual screen displayed on a display unit which is vertically oriented.

FIG. 29A shows structural information of the virtual screen and the layout information of display elements (such as a contents list and a function list). FIG. 29B shows an example of the structure of the operation screen when a display mode is "Vertical". FIG. 29C shows an example of the structure of the operation screen when the display mode is "Horizontal".

For example, the size of a presentation area (Full Screen) of the screen included in the information processing device 100D (Source Device) is 320 pixels in width and 480 pixels in height. Also, X and Y coordinates represented as (0, 0) on coordinate axes X and Y of the screen is a starting point of the presentation area.

To be more specific, an area 2800 in FIG. 29B corresponds to the presentation area. On the other hand, the size of the virtual screen display area (Virtual Screen) of the operation target device managed by the information processing device 100D is 320 pixels in width and 180 pixels in height in the case of "Vertical mode". Also, X and Y coordinates represented as (0, 300) on coordinate axes X and Y of the screen in FIG. 29B is a starting point of the virtual screen display area. In the case of "Horizontal mode", the size of the virtual screen display area (Virtual Screen) is 420 pixels in width and 236 pixels in height. Also, X and Y coordinates represented as (30, 42) on coordinate axes X and Y of the screen in FIG. 29C is a starting point of the virtual screen display area.

Each of an area 2804 (Area-4) in FIG. 29B and an area 2805 (Area-4) in FIG. 29C corresponds to the virtual screen display area.

The size of a presentation area (Full Screen) of the screen actually included in the operation target device (Target Device) is 960 pixels in width and 540 pixels in height. Also, X and Y coordinates represented as (0, 0) on coordinate axes X and Y of the screen is a starting point of this presentation area.

The structural information of the virtual screen shown in FIG. 29A describes a scaling rate (Rate) of the virtual screen display area with respect to the presentation area of the operation target device (in the present example, 33% in the vertical mode and 43% in the horizontal mode). It should be noted that the screen size and the like of the operation-target external device (TV) can be obtained according to a standard protocol or a unique protocol, via the communication unit 111.

Before the display control unit 10 causes the display unit 103 to present the operation screen, the sensor 114 detects the held-state information (including the orientation, bearing, tilt against gravity called device orientation) of the information processing device 100D in response to a request from the display control unit 10.

Then, the sensor 114 sends the detected current held-state information (the device orientation, in the present example) to the display control unit 10. On the basis of the held-state information received from the sensor 114, the display control unit 10 changes the display mode. In other words, the display control unit 10 determines the held state of the information processing device 100D according to the held-state information received from the sensor 114.

When determining that the current device orientation is "Vertical" as a result of the held-state determination, the display control unit 10 switches the mode of the operation screen to "Vertical mode". More specifically, the operation screen in "Vertical mode" as shown in FIG. 29B is displayed. On the other hand, when determining that the current device orientation is "Horizontal", the display control unit 10 switches the mode of the operation screen to "Horizontal mode". More specifically, the operation screen in "Horizontal mode" as shown in FIG. 29C is displayed.

Figure 29E:
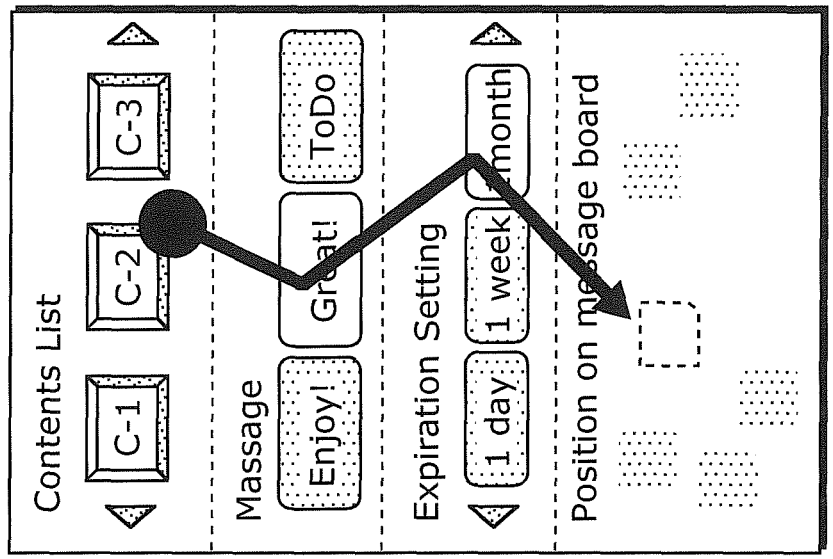
FIG. 29E is a diagram showing an example of an operation performed using the virtual screen.
Figure 29D:
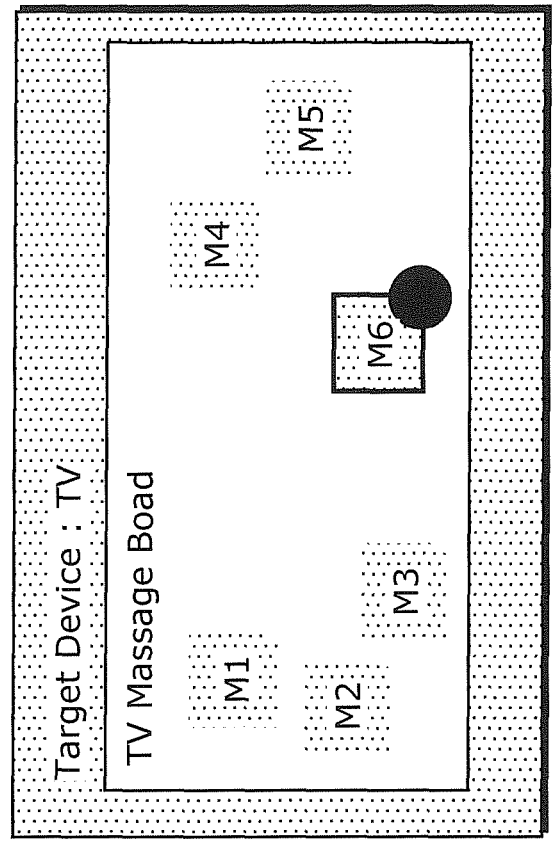
FIG. 29D is a diagram showing an example displayed on the display screen of the external device.

FIGS. 29D and 29E are diagrams showing examples of the operation screens in "Horizontal mode" and "Vertical mode", respectively. Here, the initial state of the mobile terminal is in "Horizontal mode" to present the operation screen of the connected device.

In the case of the operation screen in "Horizontal mode", the user can, for example, visually check the screen as shown in FIG. 29D that is the same as a message board of the TV (that is an application implemented on the TV side, with which images and text can be pasted on a message board) displayed in the area 2805 (Area-4). Moreover, by a touch operation or the like, the user can select an image (M6, in the present example) to which the user wishes to add a comment or message, from among the images displayed on the operation screen.

Here, when the user turns the mobile terminal during the operation into a vertical position after selecting the image (that is, the user turns the terminal into a position where the aspect ratio of the screen is different), the sensor 114 detects a change in the device orientation of the mobile terminal. Then, as shown in FIG. 29E, the display control unit 10 causes the operation screen to be displayed in "Vertical mode", on which the selected content is edited and processed.

Then, by a drag operation of the user, the desired content (the image M6 in the present example): crosses the message icon ("Great!" in the present example) desired by the user from the message list displayed in an area 2802 (Area-2); crosses an icon representing the expiration period ("1 month" in the present example) desired by the user from properties of the display expiration periods displayed in an area 2803 (Area-3); and is finally released to end the drag operation at an arbitrary position in the virtual screen display area (namely, "Position on message board" in FIG. 29E) that is considered as the execute instruction icon. Subsequent processes, including the coordinate conversion process, are the same as those explained in the fourth embodiment.

In the present embodiment, the explanation has been given about the case where the display mode is switched according to the held-state information. However, note that the present invention is not limited to this. For instance, the display mode may be switched according to external temperature, body temperature, location information, and state information such as the remaining charge of the battery. The state information includes the held-state information as well. For example, a menu that encourages healthcare (such as a menu for setting humidification or temperature of an air conditioner) can be displayed preferentially according to the external temperature or body temperature. Moreover, a map to be displayed during the drag operation can be changed to a neighborhood map according to the location information. Furthermore, according to the remaining charge of the battery, nearby shops that provide battery-charging service can be displayed. The state information other than the held-state information is also detected by the sensor 114.

In the present embodiment, the explanation has been given about the case where the layout of the operation screen is changed when the display mode is switched. However, the present invention is not limited to this. The overall function of the operation menu or the displayed details and presentation manner of various functions may be changed according to the orientation of the terminal. For example, the operation screen may be changed following that "Device at hand is operated in the vertical mode" and "Connected device is so operated in the horizontal mode".

According to the fifth embodiment described thus far, the sensor 114 of the information processing device 100D detects the state of the information processing device 100D. Then, on the basis of the state information detected by the sensor 114, the display control unit 10 switches the display mode.

With this, the operation screen is switched according to the state of the information processing device 100D, thereby improving the operability of the user.

Other Embodiments (1) On each of the operation screens of the information processing devices 100, 100A, 100B, 100C, and 100D in the first to fifth embodiments, the object icons, command icons, and parameter icons which are not being displayed due to the screen layout can be displayed by touching the arrow button areas.

In the second to fifth embodiments in which the information is processing devices 100A, 100B, 100C, and 100D are connected to the external devices, the icons which are being displayed may be displayed on a large screen included in the external device.

Figure 30A:
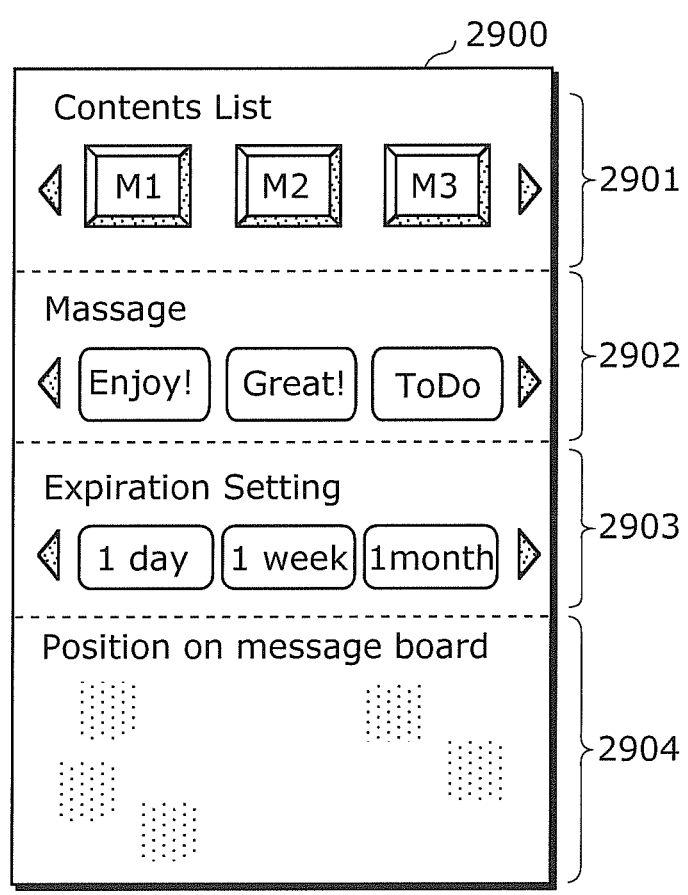
FIG. 30A is a diagram showing an example of a layout of an operation screen displayed on the display unit which is vertically oriented.

FIGS. 30A and 30B are diagrams showing the operation screen of the information processing device 100C or 100D and showing the operation screen of the external device, respectively. A frame 2900 in FIG. 30A represents the operation screen of the operation-target information processing device 100C or 100D, that is currently being manipulated by the user. In each of areas 2901 to 2903 in FIG. 30A, the presence of menu items that are not being displayed due to the screen layout (namely, options which appear when the drag operation is performed up to the arrow button area or when the terminal is physically tilted in a direction of arrow) is represented by the arrows. These hidden menu items can be displayed one by one according to the operation instruction given from the user on the operation screen. However, unless performing the operation, the user cannot find out what kinds of items are hidden.

A frame 2910 in FIG. 30B is shown as an example of the screen displayed by the external device (such as a TV) connectable to the information processing device 100C or 100D. A frame 2911 shows a display area presentable by the information processing device 100C or 100D (Mobile A) which is the connection source. A frame 2912 shows a screen which is presented on the screen of the external device by reproducing the screen currently being displayed by the information processing device 100C or 100D serving as the connection source. Areas 2913 to 2916 correspond to the areas 2901 to 2904, respectively.

In the frame 2911, the menu items which are hidden in the information processing device 100C or 100D whose screen is smaller than the screen of the external device are displayed. This allows the user to visually check the hidden menu items on the screen of the TV which is the external device, while manipulating the information processing device 100C or 100D close at hand. Therefore, when a desired menu item is not displayed on the operation screen of the information processing device 100C or 100D, the user can execute the operation to display the desired menu item (such as "Memo" in the area 2914) checked on the screen of the external device, through the shortest process (For displaying "Memo", the number of times the screen needs to be refreshed is less when scrolling leftward instead of rightward).

In the present example, the menu items to be selected are text and emoticons (which are character strings representing facial expressions using certain character combinations because of their physical appearances). Note that the menu items may be still images, moving images, and symbols. Although the scroll operation is performed leftward and rightward, the operation may be performed upward and downward or the 3D representation may be used for presenting the display. Moreover, as shown in the area 2916, hidden picture objects, instead of the menu items, may be displayed supplementarily (for example, the object may be a resident pasting-type application called a widget including a weather forecast, a clock, and a calendar, or may be a memo or video message pasted on a message board).

The hidden menu items can be displayed on the external device at the following timings. As a first example, in the case where the user is to perform a continuous drag operation, the hidden menu items may be displayed until the drag operation is started. As a second example, the hidden menu items may be displayed whenever the drag operation progresses (such as whenever the selected object icon crosses the boundary between the adjacent areas). As a third example, the hidden menu items may be displayed when the sensor detects a movement, such as a tilt of the information processing device 100D intentionally caused by the user.

(2) In the first to fifth embodiments, the path taken by the object icon in the drag operation is shown by the solid-line arrow on the operation screen displayed on the display unit 103. However, the method of displaying the path is not limited to this. For example, an operational guidance for assisting the operation may be displayed.

(3) In the first to fifth embodiments, whether the object icon and the command icon overlap one another is determined based on whether the center point of the object icon overlaps with the command icon. The base for the determination is not limited to this. For example, the determination may be made based on whether an edge (that is, a border) of the object icon has come into contact with the command icon.

(4) In the second to fifth embodiment, information sent to and received from the external device is abstracted and expressed using XML (Extensible Markup Language) format. The number of elements may be increased or decreased. Also, the description format may be a different format, such as binary format.

(5) In the first to fifth embodiments, the explanation has been given on the premise that two icons are dragged continuously to the execute instruction area using two fingers. However, after the two icons start moving due to the drag operation, the two icons may be unified and thus the drag operation can be continued even when the user moves one of the fingers off the screen.

(6) Each of the information processing devices 100, 100A, 1006, 100C, and 100D in the first to fifth embodiments has the screen for displaying the operation candidates corresponding to the various kinds of functions (including: editing and processing of a target image or target video; adjustments to image quality, sound quality, volume of sound in broadcasting and image reproduction; management, entry, reference, and display expiration period setting for the schedule; setting of timer viewing and recording; switching of the recording mode; and creation of mail text and address specification).

The information processing device can be applied to a device, such as a mobile terminal, a personal computer, or a car navigation system, that executes, on a standalone basis, a process selected according to an operation instruction via an input device included in the device. Or, the information processing device can be applied to a remote control (referred to as the remote hereafter) of a TV set, a hard disk recorder, an air conditioner, or the like that executes a process selected according to an operation instruction via the remote provided separately from the information processing device.

Also, to be more specific, each of the information processing devices 100, 100A, 100B, 100C, and 100D in the first to fifth embodiments is a computer system configured by a microprocessor, a ROM, a RAM, a hard disk unit, a display unit, a keyboard, a mouse, and so forth. The RAM or the hard disk unit stores computer programs. The microprocessor operates according to the computer programs, so that the functions of the components included in the computer system are carried out. A computer program includes a plurality of instruction codes indicating instructions to be given to the computer so as to achieve a specific function.

(7) Some or all of the components included in each of the information processing devices 100, 100A, 1008, 100C, and 100D in the first to fifth embodiments may be realized as a single system LSI (Large Scale Integration). The system LSI is a super multifunctional LSI manufactured by integrating a plurality of components onto a signal chip. To be more specific, the system LSI is a computer system configured by a microprocessor, a ROM, a RAM, and so forth. The RAM stores computer programs. The microprocessor operates according to the computer programs, so that the functions of the system LSI are carried out.

(8) Some or all of the components included in each of the information processing devices 100, 100A, 100B, 100C, and 100D in the first to fifth embodiments may be implemented as an IC card or a standalone module that can be inserted into and removed from the main body of the information processing device 100, 100A, 1008, 100C, or 100D. The IC card or the module is a computer system configured by a microprocessor, a ROM, a RAM, and so forth. The IC card or the module may include the aforementioned super multifunctional LSI. The microprocessor operates according to the computer programs, so that the functions of the IC card or the module are carried out. The IC card or the module may be tamper resistant.

(9) The first to fifth embodiments describe the example where the present invention is configured by hardware. However, the present invention can be implemented as software.

INDUSTRIAL APPLICABILITY

The information processing device according to the present invention is capable of executing a plurality of processes with intuitive operability, and is useful when applied to a remote control used for operating a device, such as a mobile terminal, a personal computer, a car navigation system, a digital TV set, a digital video disk recorder, a set-top box, a projector, or an external monitor.

REFERENCE SIGNS LIST

10 Display control unit
20 Storage unit
100, 100A, 100B, 100C, 100D Information processing device
101 Command management unit
102 Data holding unit
103 Display unit 104 Instruction receiving unit
105 Operation determination unit
106 Instruction execution unit
107 Timer
108 Attribute verification unit
109 Operation area management unit
110 Pattern management unit
111 Communication unit
112 Display correction unit
113 Virtual position determination unit
114 Sensor
115 Instruction generation unit
200, 210 Operation screen area
201, 202, 203, 204, 205 Area
250 Network
300 Air conditioner
400, 401 TV
500 Electric pot
2304c Area-unused-for-displaying
2900, 2910, 2911, 2912 Frame

The invention claimed is:

1. An information processing device which generates an instruction specifying an operation of a device, in response to a user operation performed on an icon displayed on a display screen, said information processing device comprising:
   a microprocessor;
   at least one memory;
   a storage unit including a command management unit configured to store at least one command in association with at least one parameter, the command indicating a process to be executed on an object and the parameter specifying a detail of the process;
   an instruction receiving unit configured to receive the user operation performed on the icon displayed on the display screen;
   a display control unit configured to cause at least one object icon, which identifies the object to be displayed in a first display area of the display screen; and
   an instruction generation unit configured to generate an instruction which is a group of the command and the parameter stored in said command management unit, according to the user operation received by said instruction receiving unit,
   wherein, when said instruction receiving unit receives an operation in which at least one of the at least one object icon displayed in the first display area is selected, said display control unit is further configured to extract, from said command management unit, the command executable on an operation target object identified by the selected object icon and to cause at least one command icon identifying the extracted command to be displayed in a second display area different from the first display area, without changing a detail displayed in the first display area of the display screen,
   wherein, when said instruction receiving unit receives an operation in which at least one of the at least one command icon displayed in the second display area is selected, said display control unit is further configured to extract, from said command management unit, the parameter associated with the command identified by the selected command icon and to cause at least one parameter icon identifying the extracted parameter to be displayed in a third display area different from the first and second display areas, without changing details displayed in the first and second display areas of the display screen,
   wherein, when at least two command icons are selected, said instruction generation unit is configured to generate an instruction such that at least two commands identified by the at least two command icons respectively are executed in an order in which the at least two command icons are selected,
   wherein said display control unit is configured to, according to a user operation, select an object icon displayed in the first display area of the display screen, and drag the selected object icon,
   wherein, when the object icon that is selected and dragged overlays the at least one command icon displayed in the second display area, said instruction receiving unit is configured to measure a first time period for which the selected object icon overlays the at least one command icon displayed in the second display area, and receive, upon detecting that the first measured time period has reached a first predetermined threshold or higher, an operation in which the at least one command icon displayed in the second display area is selected, and
   wherein, when the object icon that is selected and dragged moves from the selected at least one command icon displayed in the second display area and overlays the at least one parameter icon displayed in the third display area, said instruction receiving unit is configured to measure a second time period for which the selected object icon overlays the at least one parameter icon displayed in the third display area, and receive, upon detecting that the second measured time has reached a predetermined threshold or higher, an operation in which the at least one parameter icon displayed in the third display area is selected.

2. The information processing device according to claim 1, further comprising an instruction execution unit configured to execute the instruction generated by said instruction generation unit on the operation target object.

3. The information processing device according to claim 1, wherein, when at least two operation target objects are selected, said display control unit is configured to extract the command that is executable on and common to the at least two operation target objects.

4. The information processing device according to claim 1, wherein said display control unit is configured to correct spaces between a plurality of icons displayed on the display screen, according to a size of an area that remains unused for displaying an icon on the display screen.

5. The information processing device according to claim 1, wherein said instruction generation unit is further configured to register the generated instruction as a processing pattern in a pattern management unit included in said storage unit, and
   wherein said display control unit is further configured to extract, from said pattern management unit, the processing pattern executable on the object identified by the selected object icon and to cause a processing pattern icon identifying the extracted processing pattern to be displayed in a pattern display area different from the first, second, and third display areas.

6. The information processing device according to claim 1, further comprising:
   the display screen; and
   a detection unit configured to detect an orientation of the display screen,
   wherein said display control unit is configured to change a position at which the icon is displayed on the display screen, according to the orientation of the display screen detected by said detection unit.

7. The information processing device according to claim 1,
wherein the object is an external device connected to said information processing device, and
wherein said information processing device further comprises a communication unit configured to send the instruction generated by said instruction generation unit to the external device that is the operation target object.

8. The information processing device according to claim 7,
wherein said communication unit is further configured to receive, from the operation target object, state information indicating a current operating state of the operation target object, and
wherein said display control unit is configured to extract, from said command management unit, the command that is executable on the operation target object in the current operating state indicated by the state information.

9. The information processing device according to claim 7,
wherein, when the operation target object includes a display screen,
wherein said communication unit is configured to receive, from the operation target object, display layout information indicating a detail displayed on the display screen of the operation target object, and
wherein said display control unit is further configured to cause the detail indicated by the display layout information to be displayed in a virtual screen display area different from the first, second, and third display areas of the display screen.

10. An information processing method of an information processing device which generates an instruction specifying an operation of a device in response to a user operation performed on an icon displayed on a display screen and which includes a storage unit having a command management unit that stores at least one command in association with at least one parameter, the command indicating a process to be executed on an object and the parameter specifying a detail of the process, said information processing method comprising:
  receiving the user operation performed on the icon displayed on the display screen;
  performing control to cause at least one object icon, which identifies the object, to be displayed in a first display area of the display screen; and
  generating an instruction which is a group of the command and the parameter stored in the command management unit, according to the user operation received in said receiving,
  wherein, in said performing of the control, when an operation, in which at least one of the at least one object icon displayed in the first display area is selected, is received in said receiving, the command executable on an operation target object identified by the selected object icon is extracted from the command management unit and at least one command icon identifying the extracted command is caused to be displayed in a second display area different from the first display area, without changing a detail displayed in the first display area of the display screen,
  wherein, in said performing of the control, when an operation, in which at least one of the at least one command icon displayed in the second display area is selected, is received in said receiving, the parameter associated with the command identified by the selected command icon is extracted from the command management unit and at least one parameter icon identifying the extracted parameter is caused to be displayed in a third display area different from the first and second display areas, without changing details displayed in the first and second display areas of the display screen,
  wherein, in said generating, when at least two command icons are selected, an instruction is generated such that at least two commands identified by the at least two command icons respectively are executed in an order in which the at least two command icons are selected,
  wherein, said performing of the control includes selecting, according to a user operation, an object icon displayed in the first display area of the display screen, and dragging the selected object icon,
  wherein, when the object icon that is selected and dragged overlays the at least one command icon displayed in the second display area, said receiving measures a first time period for which the selected object icon overlays the at least one command icon displayed in the second display area, and receives, upon detecting that the first measured time period has reached a first predetermined threshold or higher, an operation in which the at least one command icon displayed in the second display area is selected, and
  wherein, when the object icon that is selected and dragged moves from the selected at least one command icon displayed in the second display area and overlays the at least one parameter icon displayed in the third display area, said receiving unit measures a second time period for which the selected object icon overlays the at least one parameter icon displayed in the third display area, and receives, upon detecting that the second measured time has reached a redetermined threshold or higher, an operation in which the at least one parameter icon displayed in the third display area is selected.

11. A non-transitory computer-readable recording medium having a program recorded thereon for causing an information processing device to generate an instruction specifying an operation of a device in response to a user operation performed on an icon displayed on a display screen, the information processing device including a storage unit having a command management unit that stores at least one command in association with at least one parameter, the command indicating a process to be executed on an object, and the parameter specifying a detail of the process, the program causing a computer to execute a method comprising:
  receiving the user operation performed on the icon displayed on the display screen;
  performing control to cause at least one object icon, which identifies the object, to be displayed in a first display area of the display screen; and
  generating an instruction which is a group of the command and the parameter stored in the command management unit, according to the user operation received in said receiving,
  wherein, in said performing of the control, when an operation, in which at least one of the at least one object icon displayed in the first display area is selected, is received in said receiving, the command executable on an operation target object identified by the selected object icon is extracted from the command management unit and at least one command icon identifying the extracted command is caused to be displayed in a second display area different from the first display area, without changing a detail displayed in the first display area of the display screen,
  wherein, in said performing of the control, when an operation, in which at least one of the at least one command icon displayed in the second display area is selected, is received in said receiving, the parameter associated with the command identified by the selected command icon is extracted from the command management unit and at least one parameter icon identifying the extracted parameter is caused to be displayed in a third display area different from the first and second display areas, without changing details displayed in the first and second display areas of the display screen, wherein, in said generating, when at least two command icons are selected, an instruction is generated such that at least two commands identified by the at least two command icons respectively are executed in an order in which the at least two command icons are selected, wherein, said performing of the control includes selecting, according to a user operation, an object icon displayed in the first display area of the display screen, and dragging the selected object icon, wherein, when the object icon that is selected and dragged overlays the at least one command icon displayed in the second display area, said receiving measures a first time period for which the selected object icon overlays the at least one command icon displayed in the second display area, and receives, upon detecting that the first measured time period has reached a first predetermined threshold or higher, an operation in which the at least one command icon displayed in the second display area is selected, and wherein, when the object icon that is selected and dragged moves from the selected at least one command icon displayed in the second display area and overlays the at least one parameter icon displayed in the third display area, said receiving unit measures a second time period for which the selected object icon overlays the at least one parameter icon displayed in the third display area, and receives, upon detecting that the second measured time has reached a predetermined threshold or higher, an operation in which the at least one parameter icon displayed in the third display area is selected.

12. An integrated circuit implemented on an information processing device which generates an instruction specifying an operation of a device in response to a user operation performed on an icon displayed on a display screen and which includes a storage unit having a command management unit that stores at least one command in association with at least one parameter, the command indicating a process to be executed on an object and the parameter specifying a detail of the process, said integrated circuit comprising:

an instruction receiving unit configured to receive the user operation performed on the icon displayed on the display screen;

a display control unit configured to cause at least one object icon, which identifies the object, to be displayed in a first display area of the display screen; and an instruction generation unit configured to generate an instruction which is a group of the command and the parameter stored in said command management unit, according to the user operation received by said instruction receiving unit, wherein, when said instruction receiving unit receives an operation in which at least one of the at least one object icon displayed in the first display area is selected, said display control unit is further configured to extract, from said command management unit, the command executable on an operation target object identified by the selected object icon and to cause at least one command icon identifying the extracted command to be displayed in a second display area different from the first display area, without changing a detail displayed in the first display area of the display screen, wherein, when said instruction receiving unit receives an operation in which at least one of the at least one command icon displayed in the second display area is selected, said display control unit is further configured to extract, from said command management unit, the parameter associated with the command identified by the selected command icon and to cause at least one parameter icon identifying the extracted parameter to be displayed in a third display area different from the first and second display areas, without changing details displayed in the first and second display areas of the display screen, wherein, when at least two command icons are selected, said instruction generation unit is configured to generate an instruction such that at least two commands identified by the at least two command icons respectively are executed in an order in which the at least two command icons are selected, wherein said display control unit is configured to, according to a user operation, select an object icon displayed in the first display area of the display screen, and drag the selected object icon, wherein, when the object icon that is selected and dragged overlays the at least one command icon displayed in the second display area, said instruction receiving unit is configured to measure a first time period for which the selected object icon overlays the at least one command icon displayed in the second display area, and receive, upon detecting that the first measured time period has reached a first predetermined threshold or higher, an operation in which the at least one command icon displayed in the second display area is selected, and wherein, when the object icon that is selected and dragged moves from the selected at least one command icon displayed in the second display area and overlays the at least one parameter icon displayed in the third display area, said instruction receiving unit is configured to measure a second time period for which the selected object icon overlays the at least one parameter icon displayed in the third display area, and receive, upon detecting that the second measured time has reached a predetermined threshold or higher, an operation in which the at least one parameter icon displayed in the third display area is selected.

* * * * *